United States Patent
Matus et al.

(10) Patent No.: US 11,944,032 B2
(45) Date of Patent: Apr. 2, 2024

(54) AUTONOMOUS VEHICLE SYSTEMS AND METHODS

(71) Applicant: Renu Robotics Corporation, San Antonio, TX (US)

(72) Inventors: Tim Alan Matus, San Antonio, TX (US); Michael Odell Blanton, Jr., San Antonio, TX (US); Kristopher Charles Kozak, San Antonio, TX (US); Marc Christopher Alban, San Antonio, TX (US)

(73) Assignee: RENU ROBOTICS CORPORATION, San Antonio, TX (US)

( * ) Notice: Subject to any disclaimer, the term of this patent is extended or adjusted under 35 U.S.C. 154(b) by 11 days.

(21) Appl. No.: 17/029,992

(22) Filed: Sep. 23, 2020

(65) Prior Publication Data

US 2021/0084812 A1   Mar. 25, 2021

Related U.S. Application Data

(60) Provisional application No. 62/904,451, filed on Sep. 23, 2019.

(51) Int. Cl.
*G05D 1/02* (2020.01)
*A01D 34/00* (2006.01)
*G05D 1/00* (2006.01)

(52) U.S. Cl.
CPC ......... *A01D 34/008* (2013.01); *G05D 1/0217* (2013.01); *G05D 1/0219* (2013.01); *G05D 1/0274* (2013.01); *G05D 2201/0208* (2013.01)

(58) Field of Classification Search
CPC .. A01D 34/008; G05D 1/0217; G05D 1/0274; G05D 2201/0208; G05D 1/0005;
(Continued)

(56) References Cited

U.S. PATENT DOCUMENTS 5,815,880 A * 10/1998 Nakanishi ........... A47L 11/4044
15/340.1
2004/0068352 A1 * 4/2004 Anderson ............ G05D 1/0219
701/25

(Continued)

OTHER PUBLICATIONS

Transit Definition & Meaning—Merriam-Webster.pdf (Transit Definition & Meaning—Merriam-Webster, Mar. 31, 2023, https://www.merriam-webster.com/dictionary/transit, pp. 1-8) (Year: 2023).*

*Primary Examiner* — Bao Long T Nguyen
(74) *Attorney, Agent, or Firm* — Sprinkle IP Law Group

(57) ABSTRACT

An autonomous mowing system comprising: a memory configured to hold a set of path data defining a set of paths, the set of paths comprising a transit path to a maintenance area and a set of mow paths to cover the maintenance area; a processor coupled to the memory; a computer-readable medium coupled to the processor, the computer-readable medium storing a set of instructions executable by the processor, the set of instructions comprising instructions for: using the set of path data, determining a plurality of candidate routes that traverse the transit path and fully cover the maintenance area and a total cost for each of the plurality of candidate routes; determining a least cost route from the plurality of candidate routes; and configuring an autonomous mower to follow the least cost route to mow the maintenance area.

24 Claims, 36 Drawing Sheets

(58) Field of Classification Search
CPC ........ G05D 1/0212–0219; G01C 21/34; G01C 21/3453; G01C 21/3469
See application file for complete search history.

(56) References Cited

U.S. PATENT DOCUMENTS

2005/0197766 A1* 9/2005 Flann ................... G05D 1/0219
340/995.19
2017/0108867 A1 4/2017 Franzius et al.

* cited by examiner

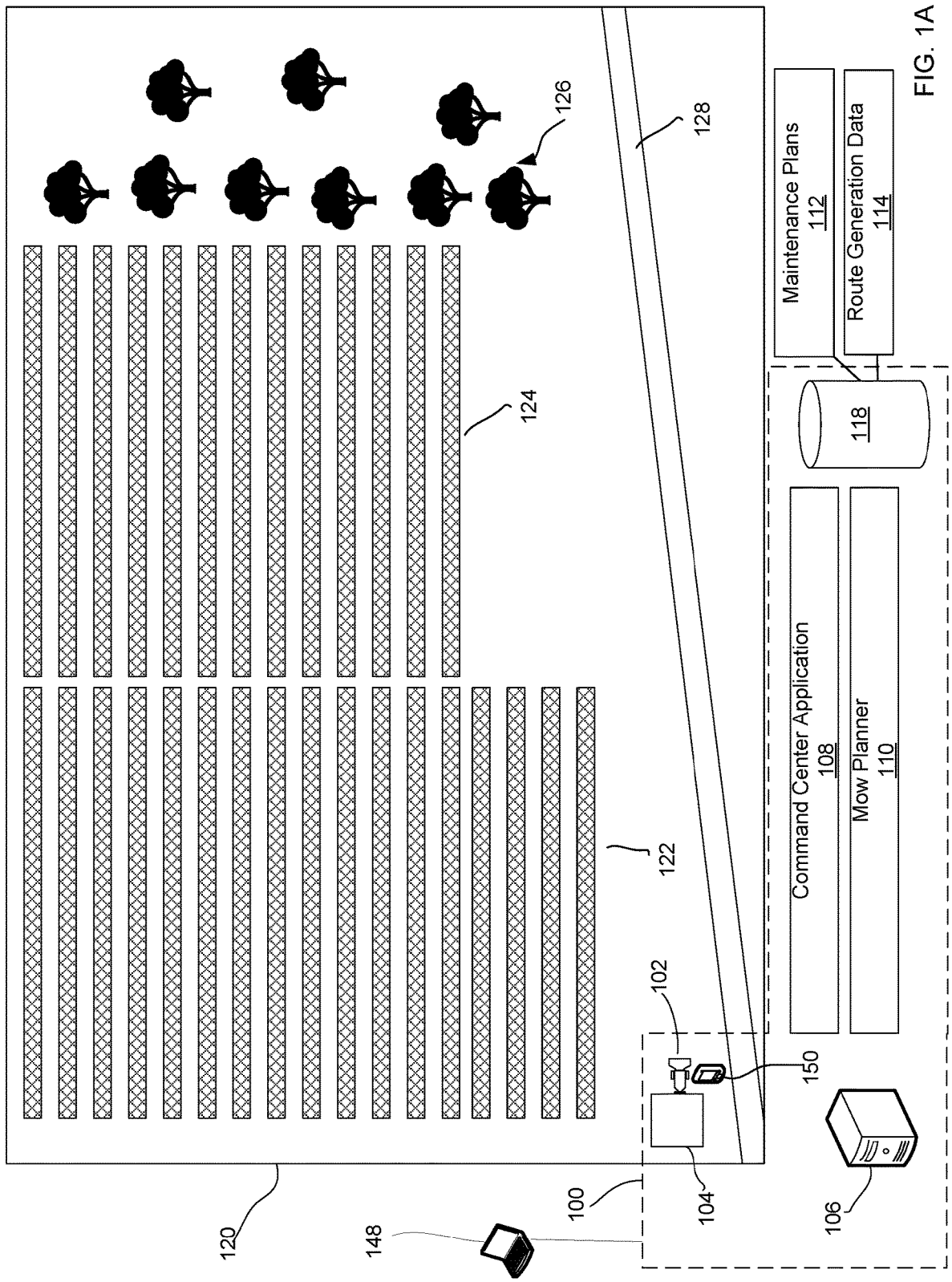

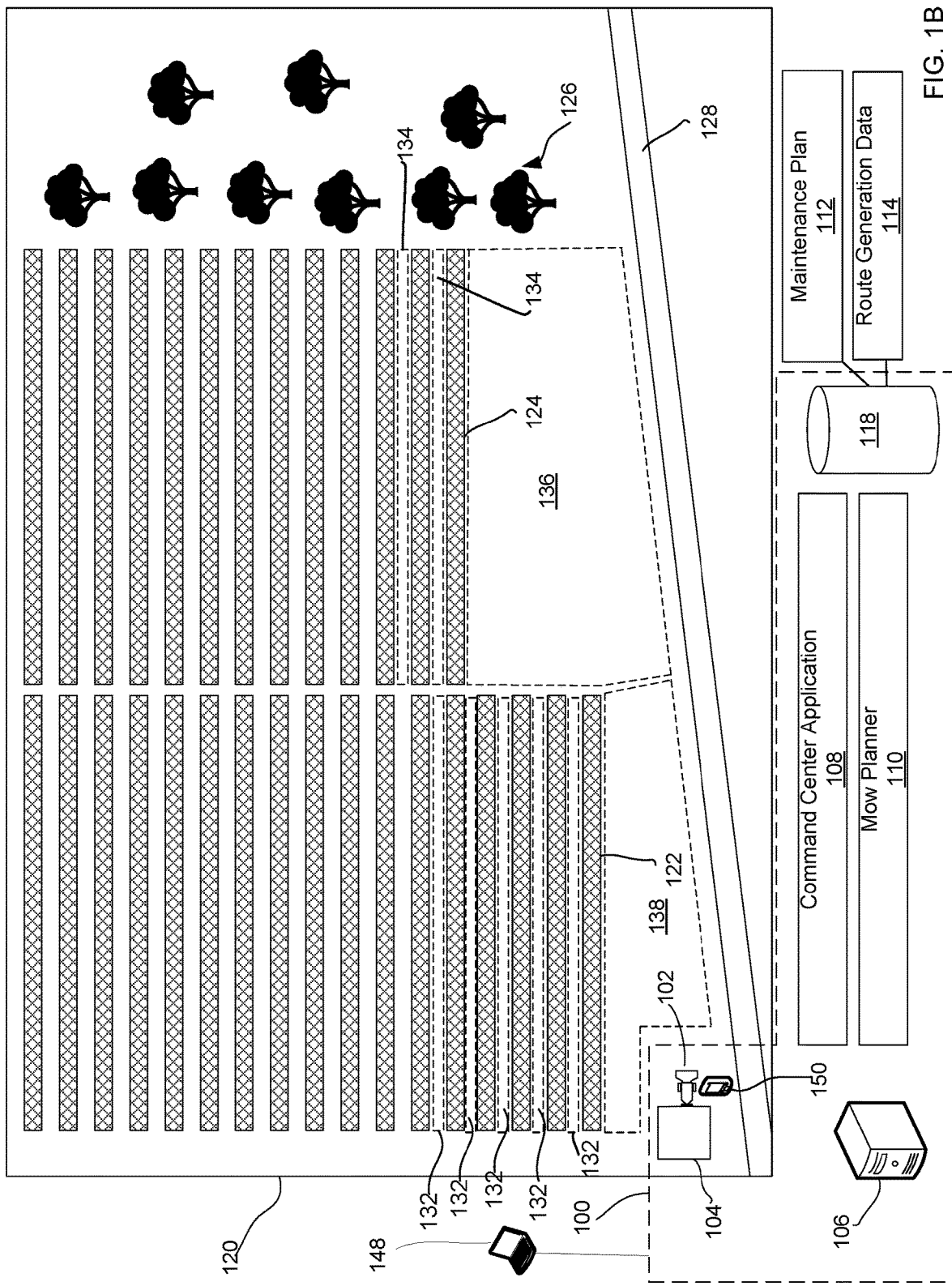

AUTONOMOUS VEHICLE SYSTEMS AND METHODS

RELATED APPLICATIONS

This application claims the benefit of priority under 35 U.S.C. § 119(e) to U.S. Provisional Patent Application No. 62/904,451, filed Sep. 23, 2019, entitled "Autonomous Vehicle Systems and Methods," by Matus, et al., which is hereby fully incorporated herein by reference for all purposes.

TECHNICAL FIELD

The present application relates in general to autonomous mobile maintenance robots. More specifically, embodiments relate to computer controlled, autonomous mobile maintenance robots and methods for automated maintenance. Even more particularly, embodiments of this application relate route planning for autonomous mobile maintenance robots and methods that perform automated maintenance with respect to renewable energy installations.

BACKGROUND

Renewable energy is becoming a larger and larger component of energy production across the world. Renewable energy farms are typically located on large plots of lands, often in rural or remote areas. In general, it is desirable to have substantial ground cover on renewable energy farms, both for aesthetic reasons and to resist ground erosion. Wth ground cover, however, comes the attendant problem of managing vegetation. Improper maintenance of the grounds can lead to overgrown vegetation, weed infestations, reduced production, unsafe working conditions, and increased fire risk.

In recent years, it has become possible to use autonomous vehicles to perform some maintenance tasks, such as mowing vegetation. When implementing autonomous maintenance systems, it is often desirable that the autonomous vehicle achieve complete coverage of an area—for example, it may be desirable that an autonomous mower achieve complete coverage of a mow area.

One way of establishing a route for an autonomous vehicle to follow to achieve complete coverage is to manually drive the route with the vehicle. The autonomous vehicle records the route and can later replay the route. This method of training relies on the operator to select the route that the vehicle will follow. The operator selected route, however, may not be the most efficient route for the vehicle overall or in certain conditions. Moreover, training autonomous vehicles in this manner is extremely time consuming, particularly when the route is long or there are multiple routes or vehicles to train.

Some routing techniques are based on simultaneous localization and mapping (SLAM) techniques. SLAM provides the capability to generate a map without human intervention combined with the ability to localize within this map. The self-localization of the autonomous vehicle can be performed even if the process of generating the map is still in progress. SLAM techniques work well in indoor environments where there are a lot of features, such as walls and furniture, in the environment for which SLAM data can be generated, leading to robust SLAM results. In outdoor environments, particularly in large open areas, there are fewer features for SLAM to reference.

To help compensate for the shortcomings of SLAM, some autonomous mowing systems utilize a boundary wire to surround a mowing area. The boundary wire emits a weak electromagnetic signal that can be detected by the autonomous mower. While systems that use boundary wires may help increase the efficacy of SLAM, they have their own shortcomings. As one such shortcoming, the autonomous mower generally will not cross the boundary wire and is thus limited to a single mowing area unless manually controlled to cross mowing areas. As another problem, defining a mowing area requires installing the boundary wire, which may be impractical for the large, remote areas on which renewable energy farms are often located. Similarly, redefining existing mowing areas requires digging up or otherwise uninstalling existing wire and laying out the wire in a new pattern, which again is impractical for many renewable energy farms. While the use of a boundary wire may be suitable for residential and small business settings, it may not be suitable for many installations.

SUMMARY

According to one aspect, an autonomous mowing system is provided. The autonomous mowing system may comprise a memory configured to hold a set of path data defining a set of paths, the set of paths comprising a transit path to a maintenance area and a set of mow paths to cover the maintenance area, the set of path data comprising a set of node data for a set of nodes that defines a set of intersections for the set of paths. The autonomous mowing system may further include a processor and a computer-readable medium coupled to the processor. The computer-readable medium may store a set of instructions executable by the processor for using the set of path data to determine a plurality of candidate routes that traverse the transit path and fully cover the maintenance area and to determine a total cost for each of the plurality of candidate routes. The computer-readable medium may further include instruction executable for determining a least cost route from the plurality of candidate routes and configuring an autonomous mower to follow the least cost route to mow the maintenance area.

According to one embodiment, the set of path data includes an estimated energy draw for each path in the set of paths. The set of instructions may further comprise instructions for determining a total estimated energy draw for each candidate route from the plurality of candidate routes. According to one embodiment, the least cost route has a lowest total estimated energy draw of the plurality of candidate routes.

According to one embodiment, the memory is configured to store a set of configuration data. The set of instructions may include instructions for: receiving a definition of a mow rectangle; using the set of configuration data to determine a number of mow paths to fully cover the mow rectangle; and generating a plurality of mow paths based on the number of mow paths determined. The set of path data used to determine the plurality of candidate routes comprises path data defining the plurality of mow paths.

According to one embodiment, the set of instructions comprises instructions for: terminating the plurality of mow paths within the mow rectangle and generating an intermediate path to connect the plurality of mow paths based on a determination that the mow rectangle is designated as a single-ended rectangle. Generating the intermediate path to connect the plurality of mow paths may include generating a plurality of intermediate paths, the plurality of intermediate paths selected to cause the autonomous mower to reverse from a first of the plurality of mow paths and move forward to a second of the plurality of mow paths.

According to one embodiment, the set of instructions comprises instructions for extending the plurality of mow paths from a first side of the mow rectangle, through the mow rectangle, to an intermediate path that connects the plurality of mow paths.

According to one embodiment, the set of instructions comprises instructions for receiving data for a geometric shape defining the maintenance area and generating the set of mow paths. Generating the set of mow paths comprises edge following the geometric shape.

According to one embodiment, generating the set of mow paths comprises: starting with a start node of a first mow path polygon, iteratively generating mow path polygons, each mow path polygon following an adjacent, larger mow path polygon and spaced from the adjacent, larger mow path polygon based on a mow deck size and a specified percentage overlap. Embodiments may further include defining a path from each mow path polygon to the adjacent larger mow path polygon.

Embodiments also include related methods and computer program products.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 1A is a diagrammatic representation of one embodiment of an autonomous mowing system for mowing a site;

FIG. 1B is a diagrammatic representation of one embodiment of example maintenance areas defined for the site;

DETAILED DESCRIPTION

Figure 1C:
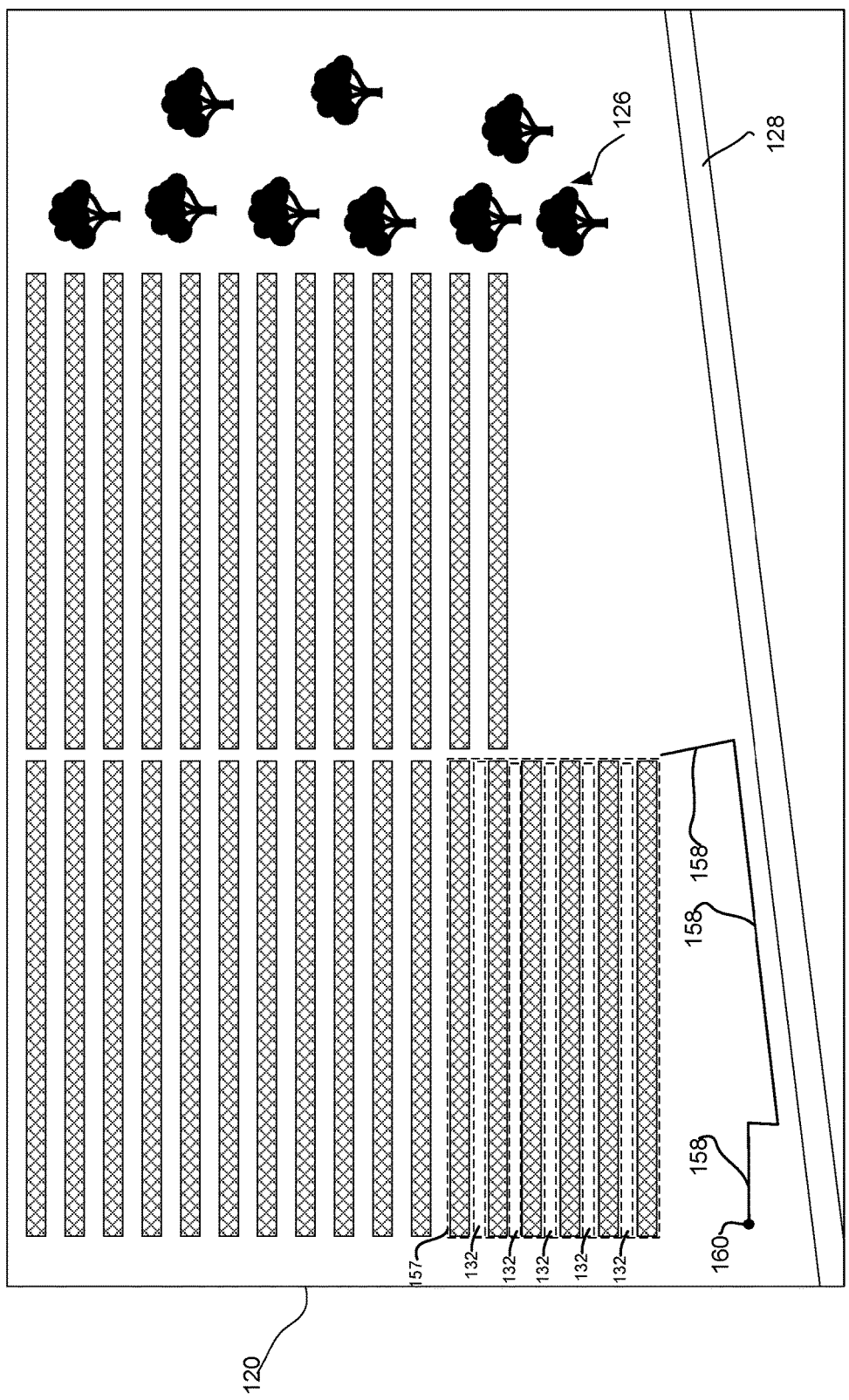
FIG. 1C is a diagrammatic representation of one embodiment of selecting an area for which to generate geometric shapes and one embodiment of a set of paths defined for a site.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Embodiments described herein provide mobile automated maintenance systems and related methods. In particular, some embodiments are adapted to provide maintenance operations for facilities and installations on large acreage where ground cover is desired to prevent soil/ground erosion, provide pleasing aesthetics or for other reasons. While embodiments are primarily discussed in terms of maintenance operations at solar farms, it will be appreciated that embodiments described herein have applicability to other renewable energy or power generation facilities or installations, such as wind turbine farms, ash ponds or other facilities or installations. Furthermore, it will be appreciated that embodiments have applicability beyond renewable energy.

As will be appreciated, it is possible to guide an autonomous vehicle with GPS-based localization along paths and routes. Paths are generally lines of travel which are defined in a way to allow the vehicle to safely traverse near and around static obstacles in the operating space. A path is considered to be a line that exists in real world space between two GPS coordinate points, or other coordinate system points. A path has a start point and an end point defined by GPS coordinates (or other real-world coordinates). A path can be either straight or curved, and is typically definable by some mathematical geometric construct, such as a line or curve in two-dimensional space, or a line or spline in three-dimensional space, as examples. A path is used by the autonomous vehicle as a guide for driving. As the vehicle traverses along the path, the vehicle compares its position via GPS coordinates to the path and makes corrections as necessary to follow the path as accurately as the mechanical capabilities and/or precision of the sensors of the vehicle will allow. The autonomous vehicle may also incorporate other techniques to follow a path, such as LIDAR-based localization, and inertial navigation/dead reckoning (for example, in areas where GPS is unavailable or unreliable). Routes are considered to be a collection of paths, which are interconnected at nodes, where the nodes are either endpoints or intersection points between paths.

As mentioned above, enabling efficient and complete generation of routes for an autonomous vehicle to follow to ensure complete coverage of a working area may be desirable. Embodiments described herein include systems and methods for determining optimized mowing routes. More particularly, some embodiments use information about a site to automatically plan a mowing route for transit to/from a mowing region and mowing of the mowing region. Site information may include, for example, overhead/aerial/satellite imagery; CAD, blueprint or similar data that provides precise geometry and location of structures; data, such as from cameras, LIDARs or other sensors, that has been recorded on site using either sensors on the autonomous vehicle, or data from other sensors, such as from a survey-grade laser scan, or a purpose-built data collection system; manually or automatically generated region, route or path information that explicitly indicates areas to drive and/or mow; manually or automatically generated annotations or metadata to site data (of any type).

According to one embodiment, a mowing route includes two components: transit sections and mowing sections. Transit sections are paths where the autonomous mower moves from one area to another without mowing, and mowing sections are areas where the autonomous mower mows vegetation (e.g., has its cutting mechanism running). The mowing route may be optimized for distance, energy efficiency, fastest effective mow rate (taking into consideration transit and recharge times) or other criteria.

One embodiment combines a route network with annotated mowing regions. The route network includes geometric or geographical points and connections between points along with relevant annotations or metadata. Route finding algorithms known or developed in the art can be used with the route network to systematically find routes from one point to another within the network. Moreover, the route-finding algorithms can solve for routes that optimize some metric (such as route length) when more than one viable route exists.

In some cases, it may be possible to predefine routes that provide full mowing coverage in mowing regions. However, such routes may not accommodate differences in the vehicle (such as if a smaller mower deck is used than when the original routes were created) or in the mowing parameters (such as if the desired path overlap changes). Additionally, in cases where mowing is performed in repetitive patterns (such as along multiple parallel rows), and where there is more than one entrance/exit to a mowing region (such as at both ends of a row of solar panels), the optimal entrance to a region and exit from a region may vary based on where the autonomous mower starts.

Multiple methods can be used to generate a full route that includes an arbitrary number of transit regions and mowing regions. One method is to minimize the total distance traveled (transit distance plus mowing distance). In this case the order in which the mowing regions are sequenced can be determined automatically. Another method is to sequence the mowing regions in a specified order. In this case, the length of the transits could be minimized (and, in some embodiments, determined on-the-fly based on the entry/exit points of the regions).

In some embodiments, the paths to achieve full mowing coverage of a mowing region are provided or determined and stored in a data store. The mow pattern within the region can be computed on demand or on the fly so as to achieve full coverage of the mowing region. In other embodiments, the paths and the mow pattern (order in which the mow paths are traversed) within the mowing region are computed on demand or on the fly.

FIG. 1A is a diagrammatic representation of one embodiment of an autonomous mowing system 100 for mowing an example site 120, which in the illustrated embodiment is a renewable energy farm comprising solar panel rows 122 and solar panel rows 124. Site 120 also includes a wooded area 126, a road 128 and various open areas. Autonomous mowing system 100 comprises an autonomous mower 102, a base station 104, and a management system 106. Base station 104 and autonomous mower 102 are deployed at site 120. Management system 106 may include computer systems at or remote from site 120. Autonomous mowing system 100 includes a data store 118 to store maintenance plans 112, route generation data 114 (e.g., information used to generate paths and routes), operational data and other data used by autonomous mowing system 100. In some cases, at least a portion of route generation data 114 is included in maintenance plans 112.

Autonomous mower 102 may have a variety of sensors, such as, but not limited to LIDAR (light detection and ranging), RADAR (Radio Detection and Ranging), IMU (inertial measurement unit), inertial navigation systems, temperature sensors, humidity sensors, noise sensors, accelerometers, pressure sensors, GPS (global positioning system), ultrasonic sensors, cameras or other sensors. LIDAR may include, in some examples, 3D laser scanning, or a combination of 3D scanning and laser scanning. Autonomous mower 102 implements autonomous navigation to navigate a route, using its sensors for collision avoidance and to adjust routing as needed. Autonomous mower 102 may be communicatively connected to management system 106 through a GPRS (General Packet Radio Service) network or other cellular data network or cell-based radio network technology mobile network, an IEEE 802.IIx wireless network or any other network modality. Any number of networks (of the same or different types) may be present and used in any combination suitable for performing any one or more of the methodologies described herein.

Autonomous mower 102 may have a variety of form factors. Autonomous mower 102 may include one or more blades disposed below a mow deck. In some embodiments, the mowing surface is wholly, or at least mostly, contained within the main wheelbase of the mower itself. In other embodiments, autonomous mower 102 comprises a mowing deck forward of (or behind) the primary physical plant that houses the drive system. The mow deck may be supported on the ground by wheels or the mow deck may be cantilevered. Power is provided through electrical connections to motors on the mow deck to drive the mower blades. The mow deck may be a low-profile mow deck that has a substantially lower profile than the primary physical plant of autonomous mower 102. For example, some embodiments can operate with less than 24 inches of vertical clearance between the panel and ground, but still allow for mowing up to a height of at least 12 inches. This can allow the mowing blades to pass under the lower ends of tilted solar panels. Autonomous mower 102, in some embodiments, is a zero-turn mower—that is, autonomous mower 102 can achieve a turning radius that is effectively zero.

Base station 104 comprises a charging station for autonomous mower 102. Base station 104 may be communicatively connected to management system 106 through a GPRS network or other cellular data network or cell-based radio network technology mobile network, an IEEE 802.IIx wireless network or any other network modality. In some embodiments, base station 104 is communicatively coupled to autonomous mower 102 through a wireless or mobile network. In addition, or in the alternative, base station 104 may communicate with autonomous mower 102 through a wired connection when autonomous mower 102 is docked with base station 104. By way of example, but not limitation, base station 104 and autonomous mower 102 may communicate via power-line protocols or other protocols.

Central management system 106 comprises one or more computer systems with central processing units executing instructions embodied on one or more computer-readable media where the instructions are configured to perform at least some of the functionality associated with embodiments of the present invention. In the illustrated embodiment, these applications include command center application 108. Command center application 108 comprises one or more applications configured to implement one or more interfaces utilized by management system 106 to gather data from or provide data to client computing devices, autonomous mower 102, various information provider systems or other systems. Management system 106 utilizes interfaces configured to, for example, receive and respond to queries from users at client computing devices, interface with autonomous mower 102, base station 104, or other components of autonomous mowing system 100, interface with various information provider systems, obtain data from or provide data obtained, or determined, by management system 106 to client computing devices 148, a position-capture system 150, information provider systems, autonomous mower 102, base station 104 or other components of a distributed maintenance system. It will be understood that the particular interface utilized in a given context may depend on the functionality being implemented by management system 106, the type of network utilized to communicate with any particular entity, the type of data to be obtained or presented, the time interval at which data is obtained from the entities, the types of systems utilized at the various entities, etc. Thus, these interfaces may include, for example, web pages, web services, a data entry or database application to which data can be entered or otherwise accessed by an operator, APIs, libraries or other type of interface which it is desired to utilize in a particular context.

An operator can establish maintenance plans 112 for a site 120 to be maintained. With respect to mowing, site 120 can be broken into maintenance areas (mow areas) and maintenance plans established for the maintenance areas. A maintenance plan may have an associated schedule for executing the maintenance plan to mow the maintenance area to which the maintenance plan pertains.

According to one embodiment, maintenance areas are defined by geometric shapes, such as rectangles, circles, or other geometric shapes, including potentially complex geometric shapes with exclusion zones, convexities, and concavities. In a more particular embodiment, the maintenance areas are defined by arbitrarily complex polygons with exclusion zones (no go zones), convexities, and concavities. Turning to FIG. 1B, for example, maintenance areas 132, 134 are defined by rectangles and maintenance areas 136, 138 are defined by more complex polygons.

At a high level, autonomous mowing system 100 can receive or determine the geometric shapes that define the maintenance areas and automatically generate mow paths to cover the maintenance areas. In particular embodiments, autonomous mowing system 100 automatically generates mow paths for a maintenance area to achieve complete coverage of the maintenance area. That is, autonomous mowing system 100 generates mow paths adapted such that autonomous mower 102 can mow the entire maintenance area by traversing at least some portion of the mow paths generated for the maintenance area. In addition, or in the alternative, mow paths for a maintenance area can be specified through other mechanisms than automatic generation, such as, but not limited to, driving autonomous mower 102 along the paths and recording the paths or providing tools to allow users to explicitly input the path definitions.

Implicit to mowing a maintenance area is getting to the area to be mowed. To this end, paths (e.g., transit paths) to/from maintenance areas, such as from one or more charging stations or other locations, can be defined. In some embodiments, autonomous mowing system 100 automatically generates the paths to/from the maintenance areas. In addition, or in the alternative, paths to/from a maintenance area may be specified through other mechanisms than automatic generation, such as, but not limited to, driving autonomous mower 102 along the paths and recording the paths or providing tools to allow users to explicitly input the path definitions.

Furthermore, in some embodiments, autonomous mowing system 100 provides tools to allow a user to edit paths. For example, autonomous mowing system 100 may provide tools allow the user to change the termination points of paths, the path type of paths (e.g., transit or mow), the allowable directions of travel along the path, the mower orientation for the path (e.g., whether the mower is limited to moving in forward along the path, is limited to moving in reverse along the path, or is not limited in its orientation when it traverses the path).

According to one embodiment, the maintenance plan 112 for a maintenance area includes a definition of paths associated with the maintenance area, such as predefined transit paths and previously automatically generated paths for the maintenance area. In some embodiments, the maintenance plan may include a definition of some paths associated with the maintenance area, such as predefined transit paths associated with the maintenance area or other paths and data that can be used to automatically generate mow paths for the maintenance area. For example, maintenance plan 112 may include the definition of the maintenance area for which mow paths are to be automatically generated. In yet another embodiment, a maintenance plan 112 may include data that can be used to derive the geometric shape that defines a maintenance area. For example, a maintenance plan may include data that can be used to derive mow rectangles, such as maintenance areas 132, 134.

Autonomous mowing system 100 can determine a route to transit to/from a maintenance area and to mow the maintenance area. Even more particularly, in some embodiments, the route is selected to allow autonomous mower 102 to entirely cover the maintenance area. Autonomous mowing system 100 can use path data defining the paths to/from the maintenance area and the path data for the paths within the maintenance area to determine a route. The path data for a maintenance area may represent multiple potential routes. Autonomous mowing system 100 may optimize the path based on costs in one or more dimensions, such as distance or energy draw.

According to one embodiment, autonomous mowing system 100 optimizes routes based on expected power draws associated with the paths. The expected power draw for a path may be established in various ways. For example, the expected power draw may be a historical power consumption for the path. In another embodiment, the expected power draw is a statistical estimate of the power draw based on the historical power consumption for the path or similar paths collected by one or more autonomous mowers. In another embodiment, the expected power draw is based on simulated data or estimated input parameters. A path may have associated expected power draws for various combinations of operational states. For example, each path may have an associated expected power draw for each combination of travel direction along the path, mower orientation (whether the mower is going in forward or reverse in a travel direction), and mower on/off state. Each path may be weighted in one or more dimensions, such as distance, one or more dimensions of expected power draw, or according to other criteria.

In some embodiments, autonomous mowing system 100 optimizes routes based on shortest distance until there is insufficient data to optimize based on energy usage. Over time, autonomous mower 102 may traverse various paths such that there is sufficient historical data to determine an expected power draw for the paths. If there is sufficient historical data on energy usage for the potential paths of a route, autonomous mowing system 100 may optimize the route based on expected power draw. Thus, when determining a route to implement a maintenance plan, autonomous mowing system 100 may select from the plurality of potential routes represented by the path data, the route with the least amount of energy usage.

A maintenance plan 112 may specify one or more maintenance areas to be mowed. In some embodiments, autonomous mower 102 may be configured with one or more maintenance plans and a schedule for performing the maintenance plans. For example, autonomous mower 102 may be configured with a maintenance cycle comprising multiple maintenance plans. When autonomous mower 102 completes a maintenance plan, it can move to the next maintenance plan in the cycle. For example, autonomous mower 102 can be configured with a mow cycle of multiple mow plans and, when autonomous mower 102 completes a mow plan in a mow cycle, it can move to a next mow plan in the mow cycle. Autonomous mower 102 may have access to the entire route network of site 120, including predefined paths and automatically generated paths, and can thus determine the optimum route to transit between and mow multiple areas.

In one embodiment, a user may specify a site area for which geometric shapes are to be generated. Turning to FIG. 1C, a user may define a rectangle 157 to specify an area for which geometric shapes are to be generated. According to one embodiment, rectangle 157 may be defined by providing the coordinates of the vertices of rectangle 157. Based on the definition of rectangle 157 and configuration data, including information about the spacing of solar panels 122 within the defined rectangle, autonomous mower system 100 can generate mow rectangles defining the mowable areas between the solar panels. The mow rectangles (or selected mow rectangles) may be considered to define maintenance areas (e.g., maintenance areas 132). One embodiment of generating mow rectangles is discussed in conjunction with FIG. 5A.

Figure 1D:
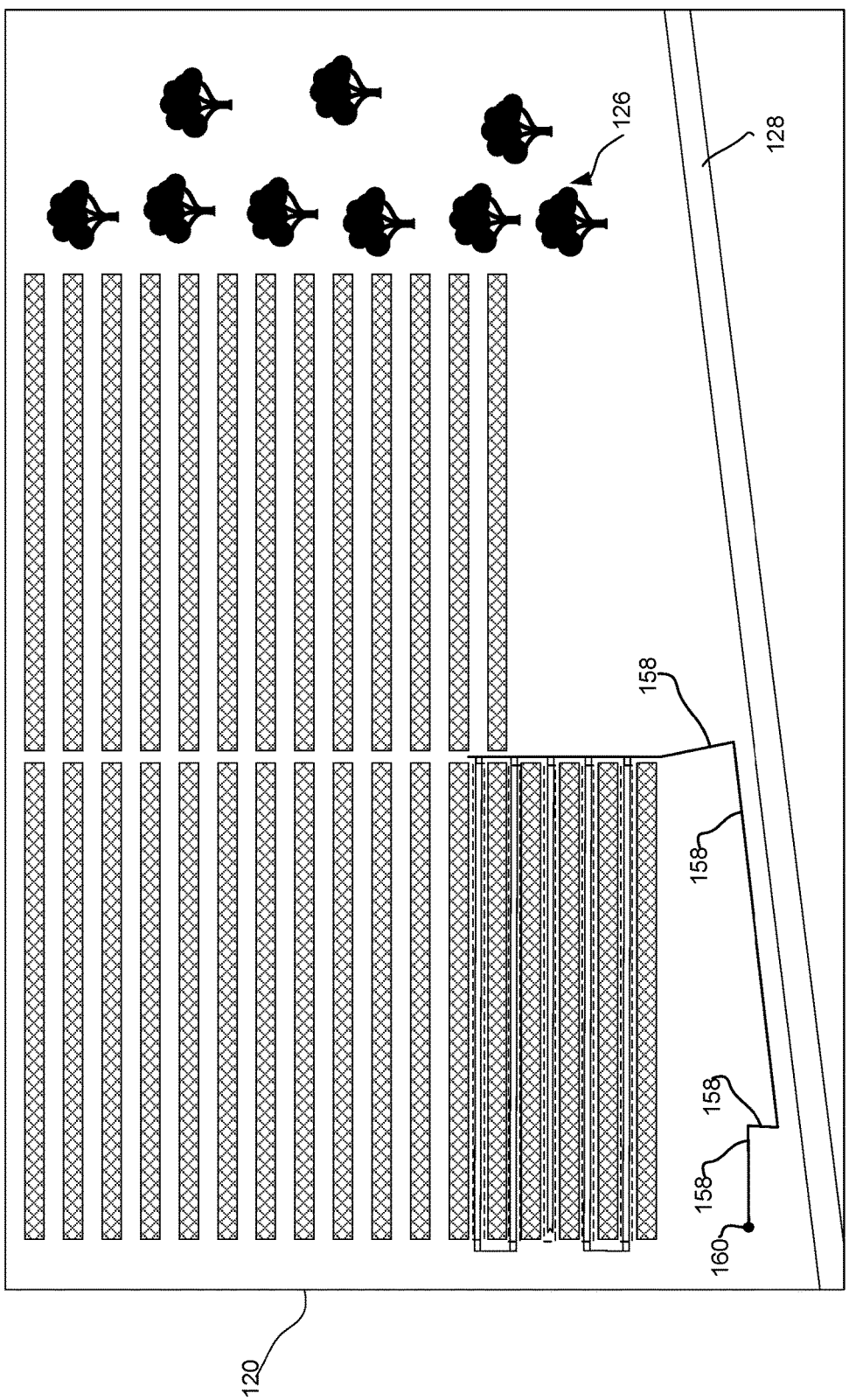
FIG. 1D is a diagrammatic representation of one embodiment of generated paths for example maintenance areas.

The user may also define a set of transit paths 158 to be used to transit to/from the base station (represented by node 160) and between the maintenance areas 132. The transit paths, in some embodiments, may be defined prior to the generation of the mow rectangles. Turning to FIG. 1D, autonomous mowing system 100 can determine a set of paths to connect back to the transit paths 158 and to achieve full coverage of maintenance areas 132. According to one embodiment, when multiple rectangles are defined at the same time or selected for inclusion in a maintenance plan, the autonomous mowing system 100 auto-generates paths between the ends of the rectangles (only on one side for single-ended rectangles, and on both end for open-ended rectangles). Single-ended means the bot may only enter/exit the rectangle area from one end, and open-ended meaning that the bot can enter/exit the rectangle area from either end. In FIG. 1D, the "ends" of the rectangle are considered to be the short sides of the rectangle, as the "long" sides correlate to the solar panels. Autonomous mowing system 100 can use path data defining the paths to/from the maintenance areas 132 and the path data for the paths within the maintenance area to determine a route (e.g., a least cost route) for autonomous mower 102 to follow to mow maintenance areas 132.

Figure 1E:
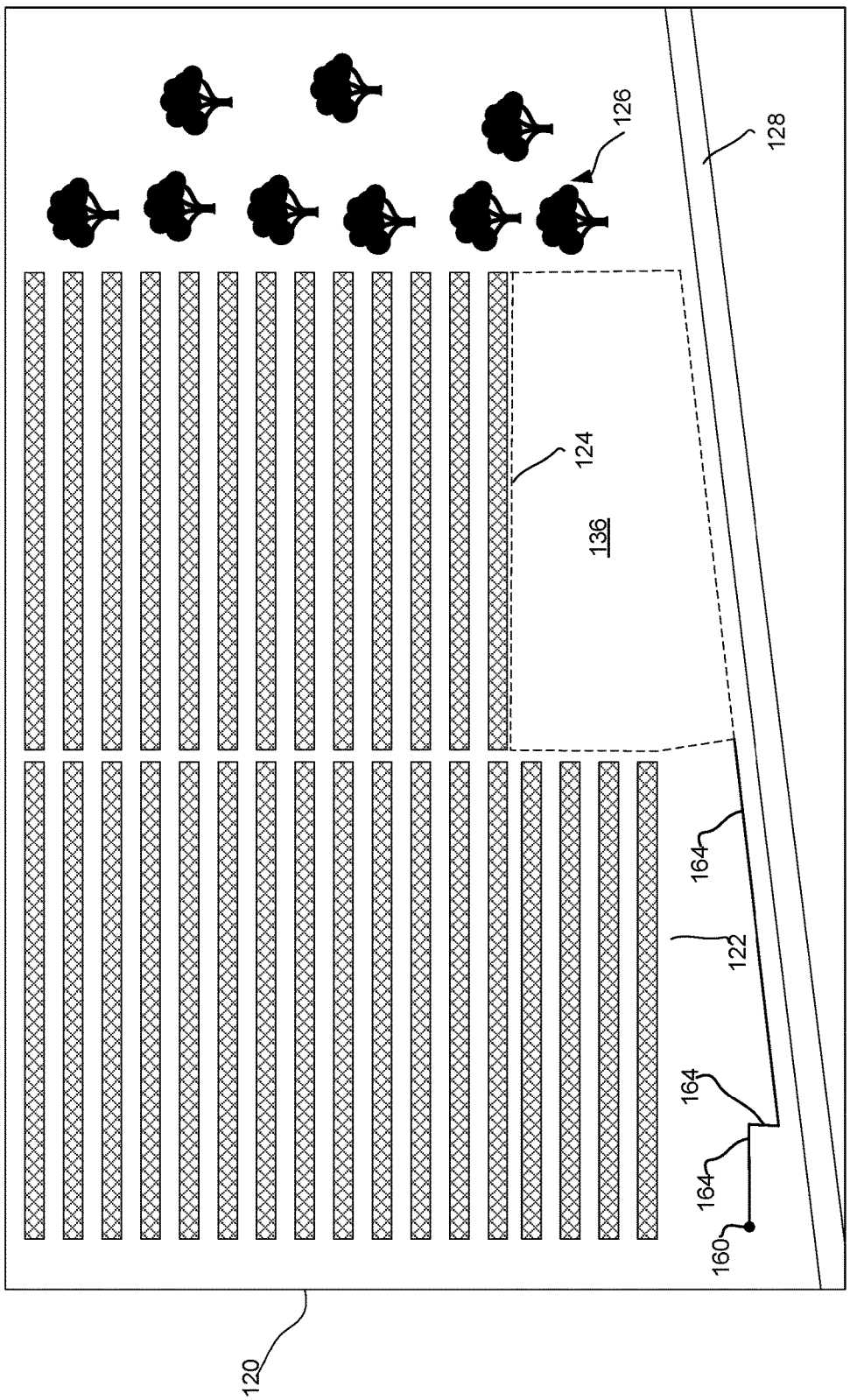
FIG. 1E is a diagrammatic representation of one embodiment of a site having a maintenance area defined and one embodiment of a set of paths defined for the maintenance area.
Figure 1F:
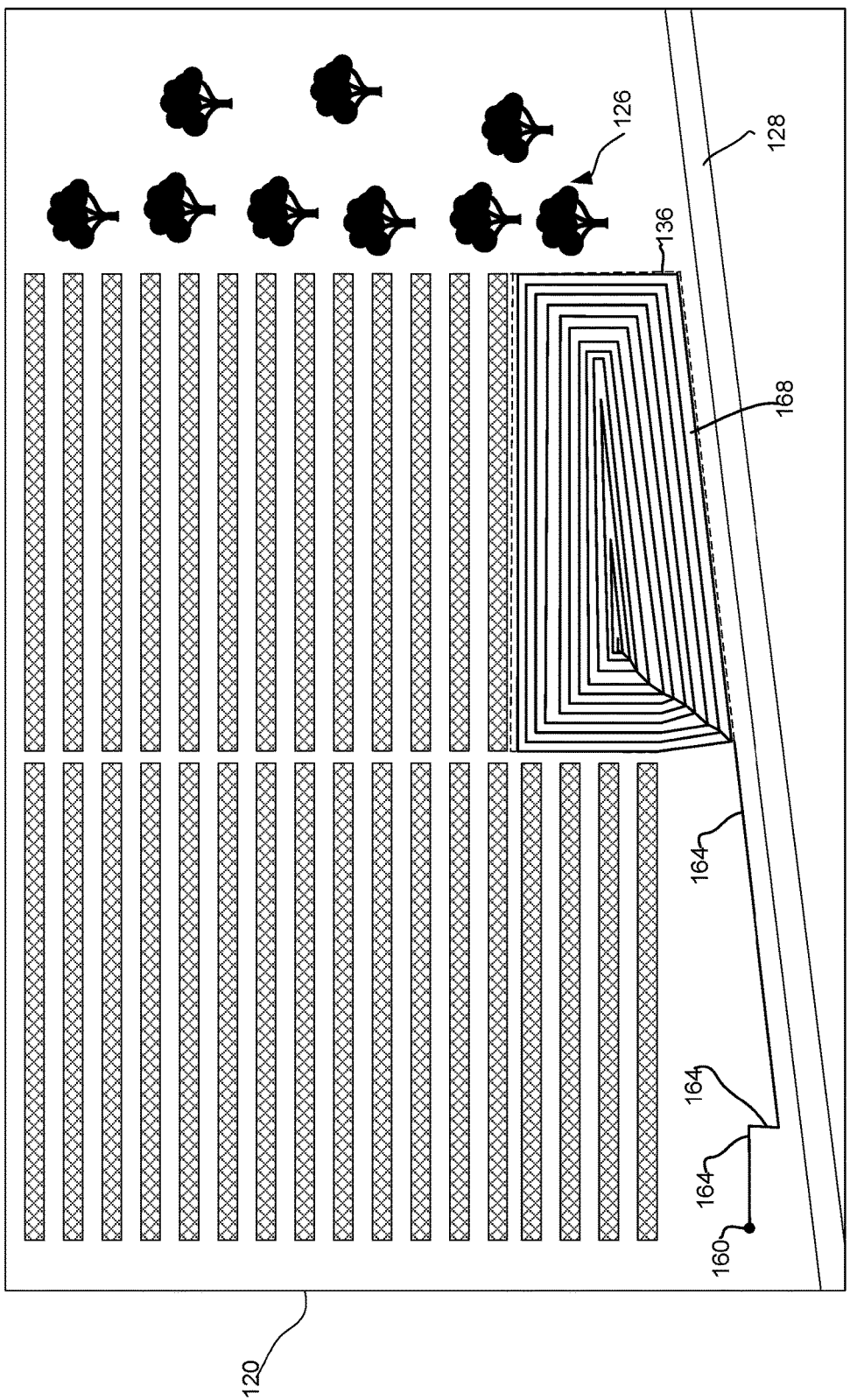
FIG. 1F is a diagrammatic representation illustrating one embodiment of generated paths for a maintenance area.

A maintenance area definition for a maintenance area may include, for example, nodes defining the perimeter lines of the maintenance area, nodes defining the boundary lines of exclusion zones, or other information. Turning to FIG. 1E, the maintenance area definition for maintenance area 136 may comprise the coordinates of the node vertices of an arbitrary polygon and the associations between the vertices to define the perimeter of maintenance area 136. Further, a set of transit paths 164 can be defined for autonomous mower 102 to follow when transiting from base station 104 (represented by node 160) to maintenance area 136. As illustrated in FIG. 1F, autonomous mowing system 100 can generate a set of paths 168 to achieve full coverage of maintenance area 136. Autonomous mowing system 100 can use path data defining the paths to/from the maintenance areas 132 and the path data for the paths within the maintenance area to determine a route (e.g., a least cost route) for autonomous mower 102 to follow to mow maintenance area 136.

In operation, a user may use a position-capture system 150 (FIG. 1A), such as a hand-carried point surveying kit, which includes, for example, a high accuracy GPS receiver and antenna, a battery, an onboard computer, and associated radio equipment (for GPS and local WiFi), to capture survey points (geographical points) to define paths and maintenance areas. Position capture system 150 may provide an interface, such as a web interface, that can be accessed to enable survey points to be collected through a button press or other simple action.

One method for acquiring the points that define a path, a perimeter line, an exclusion area boundary line, or other line, is to i) place position capture system 150 at a location of a point in the real world that defines a first endpoint of the line and record the coordinates of that point; ii) move position capture system 150 to another point in the real world that defines the second endpoint of the line and record the coordinates of that point; iii) associate the first end point and second endpoint as defining the line. The two endpoints can be used to define the limits of the line, and mathematical equations can be used to define the shape of the line (i.e. curve, straight, etc.). Position capture system 150 can be placed in multiple locations to capture the coordinates for nodes that represent: the vertices of a geometric shape defining a maintenance area, the vertices of a geometric shape defining an exclusion area within a maintenance area, path endpoints for defined paths, such as transit paths or other paths. Position capture system 150 may also be used to capture the position of base station 104. In addition, or in the alternative, autonomous mower 102 may be manually controlled to capture position data. The captured node coordinates are communicated to command center application 108.

Position capture system 150 or command center application can provide an interface to allow the operator to associate metadata with the collected nodes. For example, the operator may use the interface to specify whether each set of coordinates captured represents a base station, an endpoint of a path, the vertex of a maintenance area perimeter, the vertex of a geometric shape defining an exclusion area, the vertex of an area for which geometric shapes are to generated, or are coordinates corresponding to another type of node. The interface may also allow the user to specify path types, reconfigure paths or take other actions with respect paths, maintenance areas, site areas or other aspects of route generation.

In addition, or in the alternative, command center application 108 may provide an interface to allow an operator to manually "draw" on 2D overhead imagery, or in a 3D representation of the environment to define nodes. For example, using a point cloud, the operator can generate nodes and paths. Points can be manually selected in an image (or dataset) with software tools which allow for selecting a location (e.g., pixel) in an image and the selected location can be mapped to geographic coordinates. Software can then store those x-y positions, which can be used to define the limits of the line or curve. Additionally, software tools can be used to "draw" the path between the endpoints and store that line or curve as the path directly on the 2D image or within the 3D dataset.

Autonomous mowing system 100 includes a mow planner 110 to generate routes to transit to/from maintenance areas and mow the maintenance areas. According to one embodiment, mow planner 110 may perform various functions with respect to route generation, such as, for example, determining the geometric shapes that define maintenance areas, determining mow paths to achieve coverage of maintenance areas, determining transit paths to/from maintenance areas or determining transit paths within maintenance areas.

Figure 2:
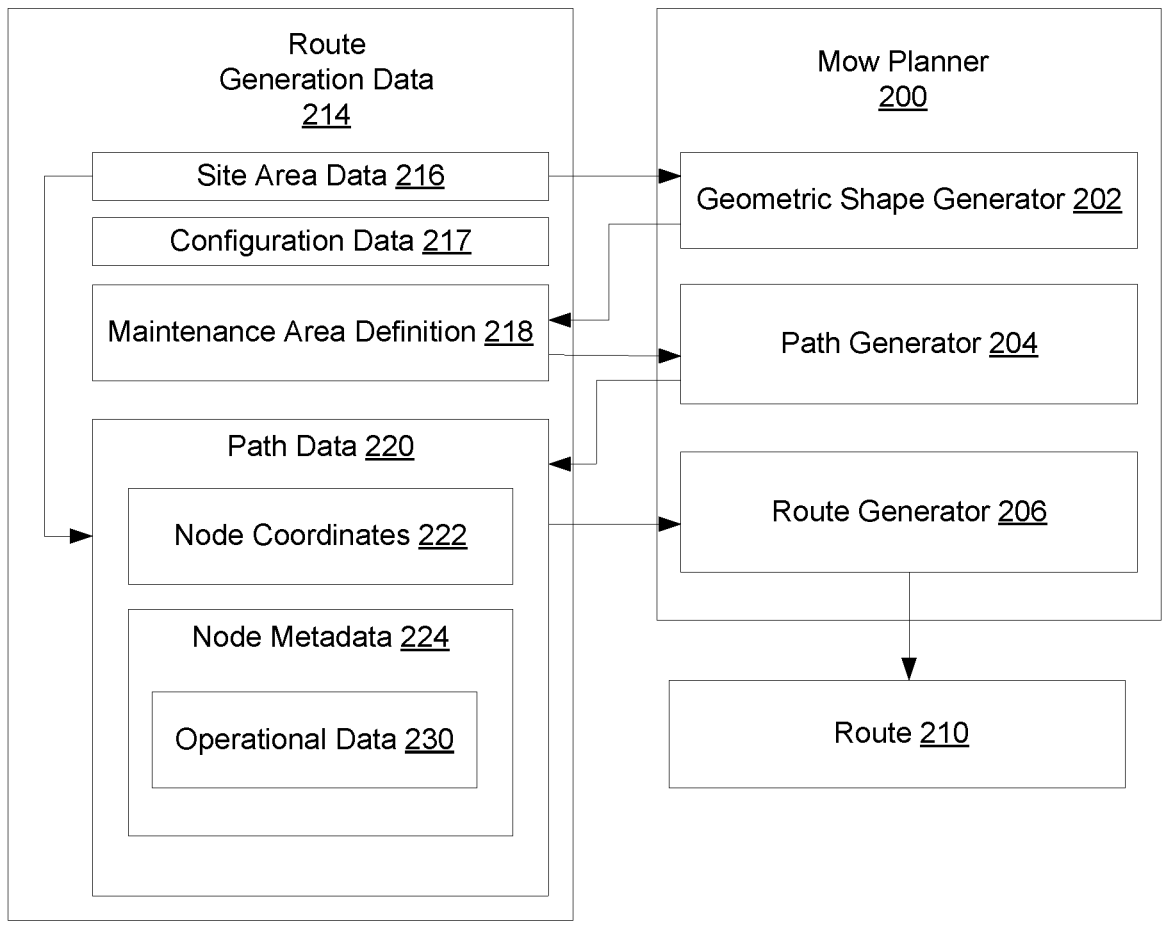
FIG. 2 is a diagrammatic representation of one embodiment of a mow planner.

Turning briefly to FIG. 2, this figure illustrates one embodiment of a mow planner 200 (which may be one example of mow planner 110) processing route generation data 214 to generate a route 210 for a maintenance plan. In some embodiments, at least a portion of route generation data 214 is included in a maintenance plan. Mow planner 200 may be configured according to a set of configuration data 217. Such configuration data 217 may be used to determine maintenance areas, paths, or routes.

Mow planner 200 may be implemented by a processor executing computer-readable program code embodied on computer-readable medium or according to another architecture. The processor may comprise, for example, a processor of management system 106, a processor of autonomous mower 102, a combination of processors at management system 106 and autonomous mower 102, or other processors.

In some embodiments, route generation data 214 may include data that can be used to derive the geometric shape that defines a maintenance area. In one embodiment, for example, an area of the site to be maintained (e.g., site 120 in FIG. 1A) can be specified. Route planner may include a geometric shape generator 200 to generate the geometric shapes that can be used to define maintenance areas. Using the example of FIG. 5A, site area data may include a selection of coordinates for an area containing solar panels and geometric shape generator 202 can generate definitions of geometric shapes, such as rectangles, corresponding to mowable areas. One or more of the generated rectangles may be selected as a maintenance area. Such selection may be done automatically or by a user.

Route generation data 214 includes a maintenance area definition 216. According to one embodiment, maintenance areas may be defined as geometric shapes with conditional points and boundaries associated with the geometric shapes. As discussed, maintenance areas can be defined by arbitrarily complex geometric shapes. In a more particular embodiment, the maintenance areas are defined by arbitrarily complex polygons with exclusion zones (no go zones), convexities, and concavities. In some embodiments, maintenance area definition 216 includes data defining the perimeter of a maintenance area, for the example the node coordinates and connections between the nodes corresponding to the vertices of the maintenance area perimeter and, if there are exclusion areas (areas not to be mowed), maintenance area definition 216 may include the coordinates of the vertices defining the exclusion areas. The maintenance area definition may also specify, for example, the entrance/exit points of the maintenance area. In one embodiment, maintenance area definition 216 may include the definition of a geometric shape, such as a mow rectangle, generated by geometric shape generator 202. In addition, or in the alternative, maintenance area definition 216 includes the definition of an operator defined geometric shape or other geometric shape.

Figure 3A:
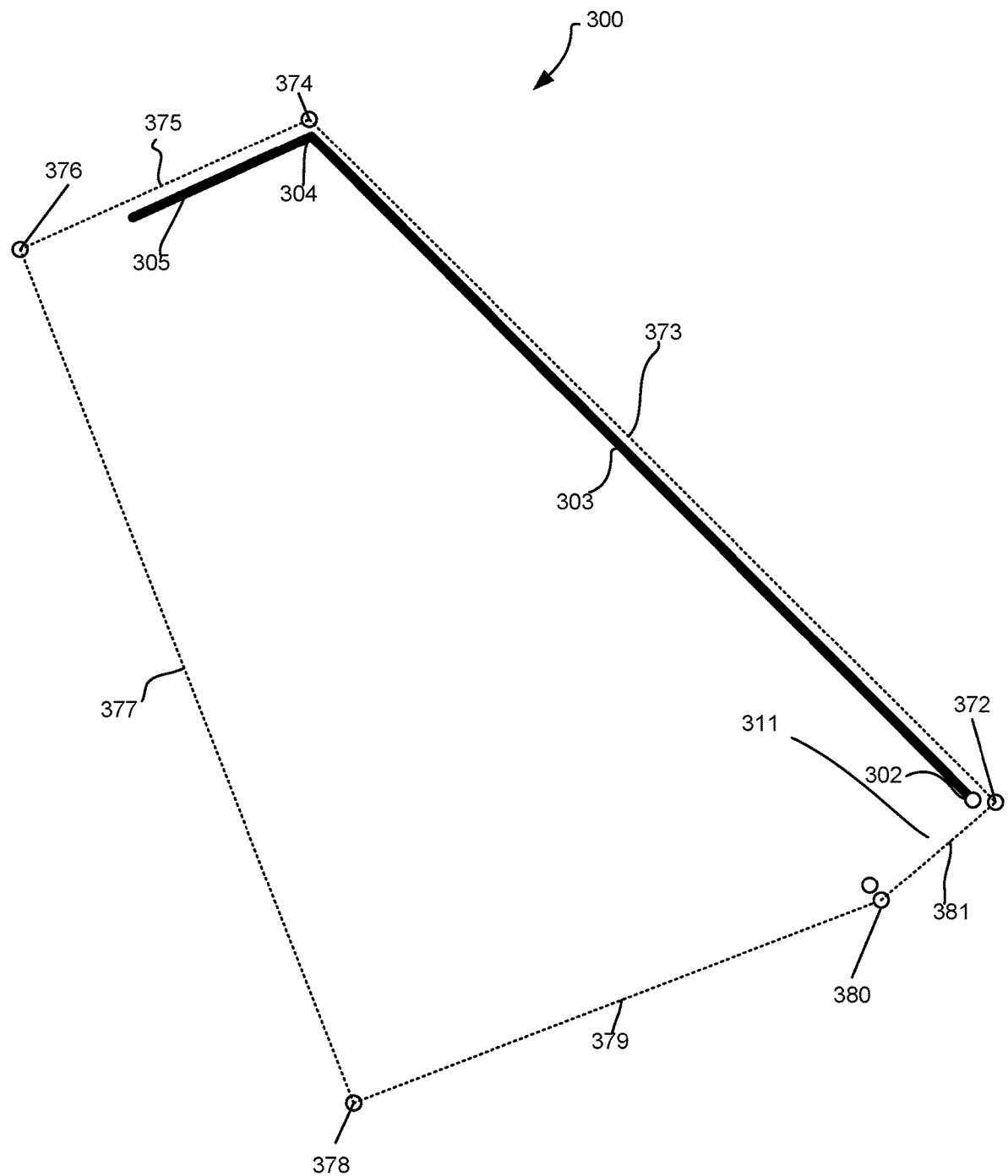
FIG. 3A, FIG. 3B, FIG. 3C, FIG. 3D, FIG. 3E, FIG. 3F, FIG. 3G, FIG. 3H, FIG. 3I, FIG. 3J, and FIG. 3K are diagrammatic representations of one embodiment of generating paths for a maintenance area.

Using the example of FIG. 3A, the maintenance area definition may include the coordinates of and connections between the nodes that define the outer perimeter of maintenance area 300. Using the example of FIG. 4A, maintenance area definition 216 may include the coordinates of and connections between the nodes that define the outer perimeter of maintenance area 400 and the nodes that define exclusion area 415 which is excluded from maintenance area 400. Using the example of FIG. 5A, maintenance area definition 216 may include the definition of one or more of mow rectangles 520, 522, 524, depending on which mow rectangles are selected to be part of the maintenance plan.

Figure 3B:
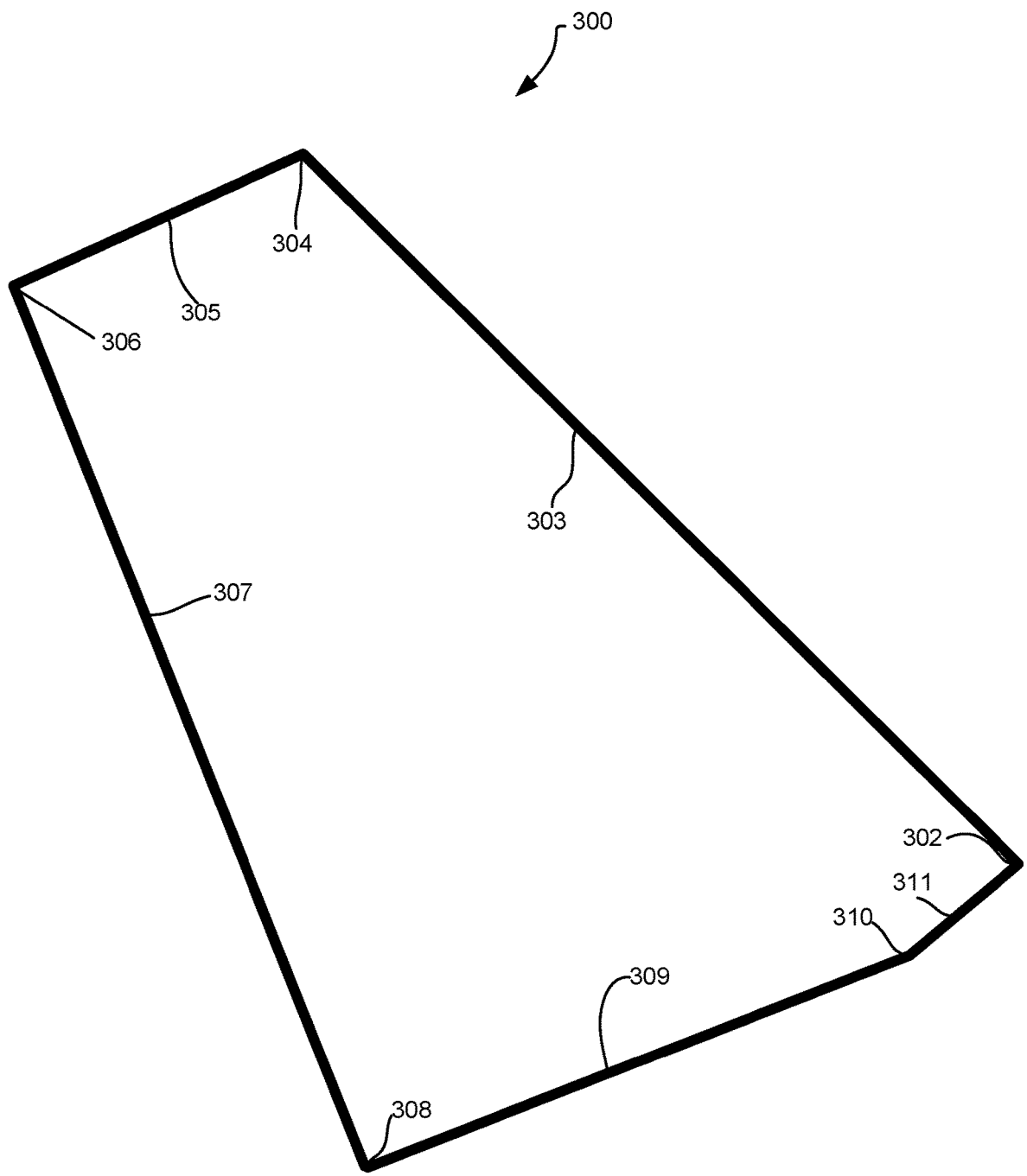
Figure 5A:
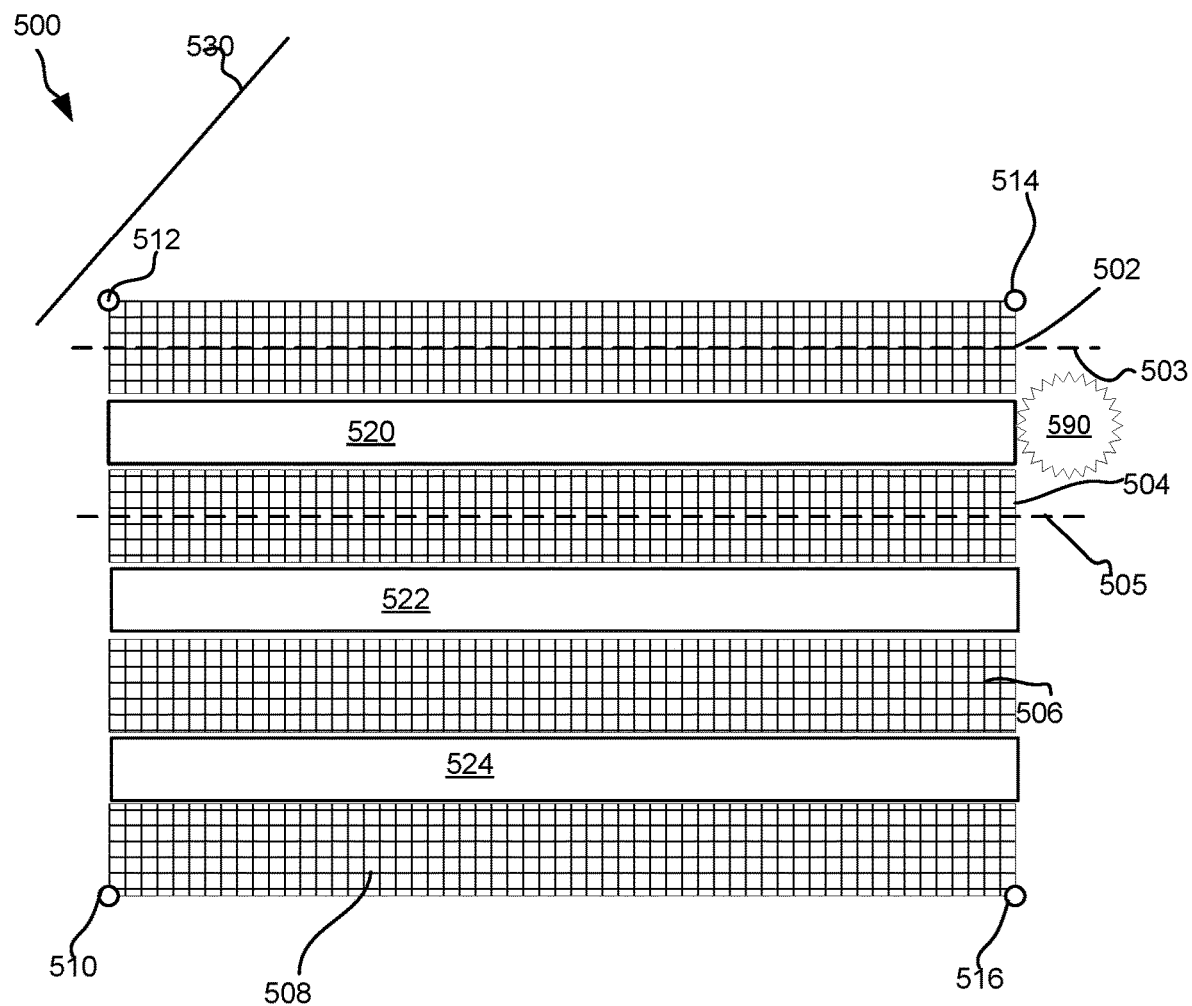
FIG. 5A, FIG. 5B and FIG. 5C are diagrammatic representations of another embodiment of generating paths.
Figure 5B:
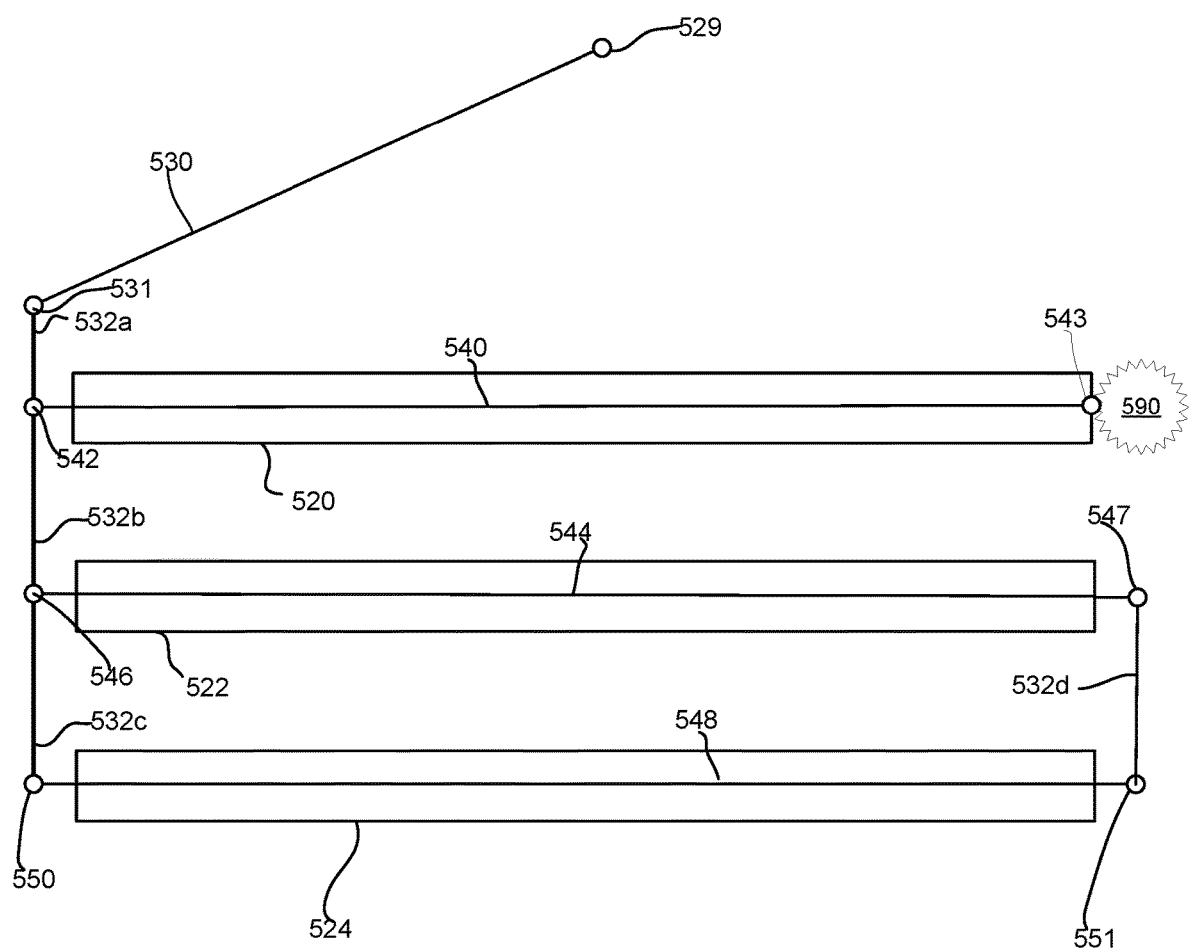
Figure 5C:
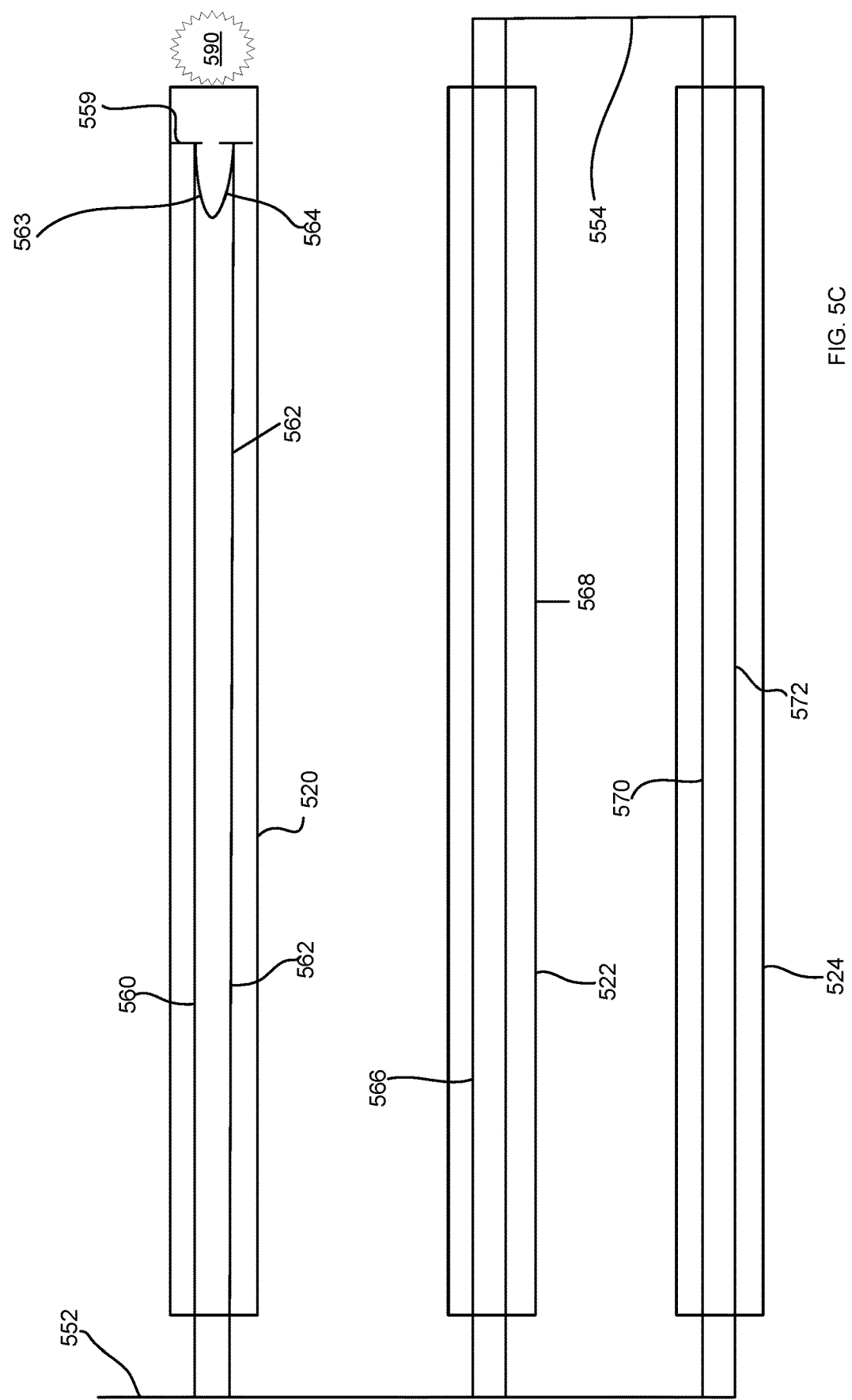

Mow planner 200 includes a path generator 204 to generate paths for maintenance areas. In particular, path generator 204 generates path data defining paths that can be followed by an autonomous mower. Path generation may include generating path data for paths within the maintenance areas and, in some cases, generating path data for paths to, from or between the maintenance areas. In a particular embodiment, path generator 204 uses the maintenance area definition 216 and configuration data 217 to generate path data defining mow paths to fully cover the maintenance area. For example, path generator 204 may generate paths to fully cover maintenance area 300 as shown in FIG. 3K, paths to fully cover maintenance area 400 as illustrated in FIG. 40, paths to fully cover mow rectangles 520, 522, 524 as illustrated in FIG. 5C. In one embodiment, the generated paths represent the center of the autonomous mower in geo-referenced space. The paths generated by path generator 204 (and other paths defined in path data 220) may be considered potential paths from which route generator 206 determines the paths that will actually be used and the order in which they will be used to implement a maintenance plan.

According to one embodiment, path data 220 includes path definitions for each path associated with the maintenance area—for example, each path to implement a maintenance plan. The path definitions may include definitions of predefined paths, definitions of paths generated by path generator 204, or definitions of other paths. The path data for each path can include, for example, the path end termination points, directions those terminations can be approached, the orientation in which the mower can approach each termination, whether the mower's cutting mechanism is to be enabled or disabled, and other information.

According to one embodiment, path data 220 comprises data for nodes that defines the paths. Each node may have a set of node coordinates 222 (e.g., GPS coordinates or other geographic coordinates of the path endpoint) and node metadata 224. The node metadata 224 for a node can define approach directions for the node. In one embodiment, the approach directions specified for a node indicate which other nodes can be approached from that node. In addition, or in the alternative, the approach directions specified for a node can specify from which other nodes that node can be approached. Thus, an approach direction can specify a connection with another node and hence, can represent the presence of a path between the nodes (that is, a path between the points in the real-world having coordinates of the connected nodes). The approach directions specified in the metadata for one or both of a pair of connected nodes can be used to determine the directionality of the connection (the directionality of the path).

Other examples of node metadata 224 include, but are not limited to, turn in place data (whether the autonomous mower can turn in place at that node), orientation data (whether the autonomous mower can approach the node in forward/reverse or both), mower on/off data (whether the mower should enable/disable its blades). In general then, the transit and mow paths can be represented as a set of nodes with associated metadata.

In some embodiments, a portion of the associated path data includes operational data 230. As one example, each path for a maintenance plan may have an associated expected power draw. The node metadata 224 for a node may include an indication of the power draw for a connection to another node. In some embodiments, the node metadata 224 for a node may include indications of expected power draws for various states of the mower (e.g., orientations, mower on/off) for a connection. An expected power draw may be expressed in various ways including, but not limited to weight that can be used in node traversal.

According to one embodiment, a route network can be established that holds static metadata for the nodes. In one an embodiment, the static metadata may include properties associated with the location of the node or the connectivity of the node that, for example, will not vary with the specific route that traverses the node. In a particular embodiment, for example, the static metadata includes the approach direction. In addition, or in the alternative, the static metadata can include metadata such as, but not limited to, speed limits, stop points, or other metadata. When a "route" which is composed of nodes and paths from the "route network" is established (e.g., based on shortest route or other parameters), then additional metadata can be attached to the nodes where actions such as mower on/off are added to the nodes for that specific "route." For example, mower on/off may be added to the node at the start of a path. The same route network node may appear in the route network multiple times, but each occurrence can have a route-specific metadata active at that node. For example, one instance of a node may have mower:"on" and another instance may have mower"off".

Path generator 204 may implement any suitable algorithm to determine a set of mow paths that achieve full coverage of the maintenance area. According to one embodiment, path generator 204 implements an edge following algorithm to generate paths for a maintenance area. In an even more particular embodiment, path generator 204 implements edge following to fill in paths working in from the perimeter. Parallel paths may be spaced based on configuration data such as the mow deck size and percentage overlap.

Path data 220 may represent a plurality of potential routes that can be implemented to transit to/from a maintenance area and fully cover the maintenance area. In some embodiments, a nodal traversal approach is used to determine a plurality of candidate routes that could be used to transit to/from the maintenance area and to cover all of the mow paths determined for the maintenance area. In a particular embodiment, Dijkstra's algorithm (Dijkstra's Shortest Path First Algorithm) is used to find the shortest (least cost) path. Other node traversals may also be used. Route generator 206 can be configured to determine the least cost route from the plurality of candidate routes, where cost may be based on distance, energy usage, or other metric. Thus, the route generator may be adapted to optimize for a particular metric, such as shortest geographic distance, least power draw, or any other metric. In some embodiments, route generator 206 may optimize routes for distance until sufficient data has been collected to quantify the expected power draw for each path associated with a maintenance area. Once expected power draws for the paths have been determined or provided, route generator 206 can optimize the route to minimize power consumption.

Returning to FIG. 1A and FIG. 1B, mow planner 110 may determine a route to implement a maintenance plan on demand or on the fly when the maintenance plan is to be executed. For example, a scheduler may signal mow planner 110 that the maintenance plan is to be executed, and, responsive to the signal, mow planner 110 may determine the route. In some embodiments, a portion of route generation is performed before the maintenance plan is to be executed and another portion performed on demand or on the fly as needed. For example, in one embodiment, mow planner 110 may determine the geometric shapes of the maintenance areas associated with a maintenance plan beforehand and then generate the mow paths and route to be followed on demand or on the fly, responsive to a signal from a scheduler for example. In another embodiment, mow planner 110 generates and stores the path data for a maintenance plan beforehand and then generates the route on demand or on the fly, responsive to a signal from a scheduler for example.

The functionality of mow planner 110 may be implemented at management system 106, autonomous mower 102, or other components of autonomous mowing system 100. In one embodiment for example, management system 106 implements mow planner 110 to determine the route for a maintenance plan and sends the route to autonomous mower 102. In another embodiment, management system 106 sends route generation data 114 to autonomous mower 102 and autonomous mower determines the route to follow. For example, in one embodiment, management system 106 sends the complete path data for a maintenance plan to autonomous mower 102 and autonomous mower 102 determines the route (e.g., in one embodiment, autonomous mower 102 implements a route generator). As another example, management system 106 sends maintenance area definitions and any predefined paths for a maintenance plan to autonomous mower 102 and autonomous mower 102 determines the route to follow (e.g., in one embodiment, autonomous mower 102 implements a path generator and a route generator and management system implements a geometric shape generator). In yet another embodiment, management system 106 sends site area data and path data for any predefined paths for the maintenance plan to autonomous mower 102 and autonomous mower 102 a generates the geometric shapes defining a maintenance area, generates paths for the maintenance area, and determines the route to execute a maintenance plan. In some embodiments, management system 106 sends route generation data 114 to autonomous mower 102 responsive to a signal from the scheduler.

Thus, autonomous mower 102 may be configured with a route (e.g., a least cost route) to follow. For example, the route may be provided to autonomous mower 102 for use when executing a maintenance plan. In another embodiment, autonomous mower 102 may configure itself with the least cost route by, for example, selecting the least cost route as the route to run for a maintenance plan.

As discussed above, in some embodiments, the path generator (e.g., path generator 204) generates paths using edge following. Some examples of edge following path generation are discussed below in conjunction with FIG. 3A-FIG. 3K and FIG. 4A-4M. At a high level, the path generator continually determines successively smaller polygons of mow paths, starting with an outer polygon and working toward the center of the maintenance area. At the center of the maintenance area or subsection of the maintenance area, the remaining area may be covered by a single path or single node in some cases.

According to one embodiment, if the path generator detects an intersection with a edge (e.g., a perimeter or prior path), the path generator will define the end node for the path being generated and begin generating a new path, following the detected edge. This process can continue until the path generation returns to the start node of the current path polygon or reaches a point that it cannot generate further mow paths without crossing prior mow paths.

In some cases, if the path generator detects a self-intersection with a prior path and there is a mowable subsection of the maintenance area beyond the prior path that cannot be reached without crossing the prior path, the path generator will continue to fill a subsection of the maintenance area until the subsection is complete without crossing a prior path. The path generator can then generate a connection path to an unfinished subsection and generate mow paths in that subsection.

Turning to FIG. 3A, one embodiment of a maintenance area 300 is illustrated. The maintenance area definition for maintenance area specifies the perimeter of maintenance area 300. More particularly, the maintenance area definition includes the nodes and their associations that define the perimeter of the maintenance area. In one embodiment, the maintenance area definition defines a perimeter from which the centers of the outermost mow paths of the maintenance area are offset. For example, the operator may capture coordinate data, select pixels from a user interface, or otherwise input data to indicate the location of the nodes 372, 374, 376, 378, 380 that define perimeter edges 373, 375, 377, 379, 381. The outermost mow path of maintenance area 300 can be determined so that the mower will mow up to the perimeter edges. One or more of nodes 372, 374, 376, 378, 380 may be designated as an entry/exit for maintenance area 300.

In one embodiment, the path generator determines the location of the start node for a perimeter path polygon (e.g., the start point for a polygon formed by the outermost mow paths within maintenance area 300). For example, if node 372 is indicated as an entry/exit node, the path generator can determine the position of node 302 as an entry/exit node and the start node of the outermost path polygon. The start node 302 can be spaced to the inside of boundary edge polygon a particular distance, for example half the width of the mow deck, from the closest perimeter edges that meet at the boundary node 372.

The path generator begins generating mow paths for maintenance area 300 by following the perimeter. For example, the path generator generates a mow path 303 beginning at node 302 and extending parallel to perimeter edge 373. As noted above, mow path 303 may correspond to the path for the center of the autonomous mower; thus, the actual area that would be mowed if the mower followed the path (the covered area for the path) would extend to perimeter 373 and to the other side of mow path 303. On detecting an intersection with perimeter 375, the path generator terminates mow path 303 so that mow path 303 does not cross perimeter 375 accounting for the size of the autonomous mower. For example, the path generator can define the path endpoint (e.g., node 304) at the point the mower would have to turn to follow the new edge while maintaining the specified spacing. Path generator then follows perimeter edge 375 to generate mow path 305. As illustrated in FIG. 3B, this edge-following process can continue to generate mow paths to complete an outer perimeter path polygon formed by mow path 303 (defined by end nodes 302, 304), mow path 305 (defined by end nodes 304, 306), mow path 307 (defined by end nodes 306, 308), mow path 309 (defined by end nodes 308, 310) and mow path 311 (defined by end nodes 310, 302).

Figure 3C:
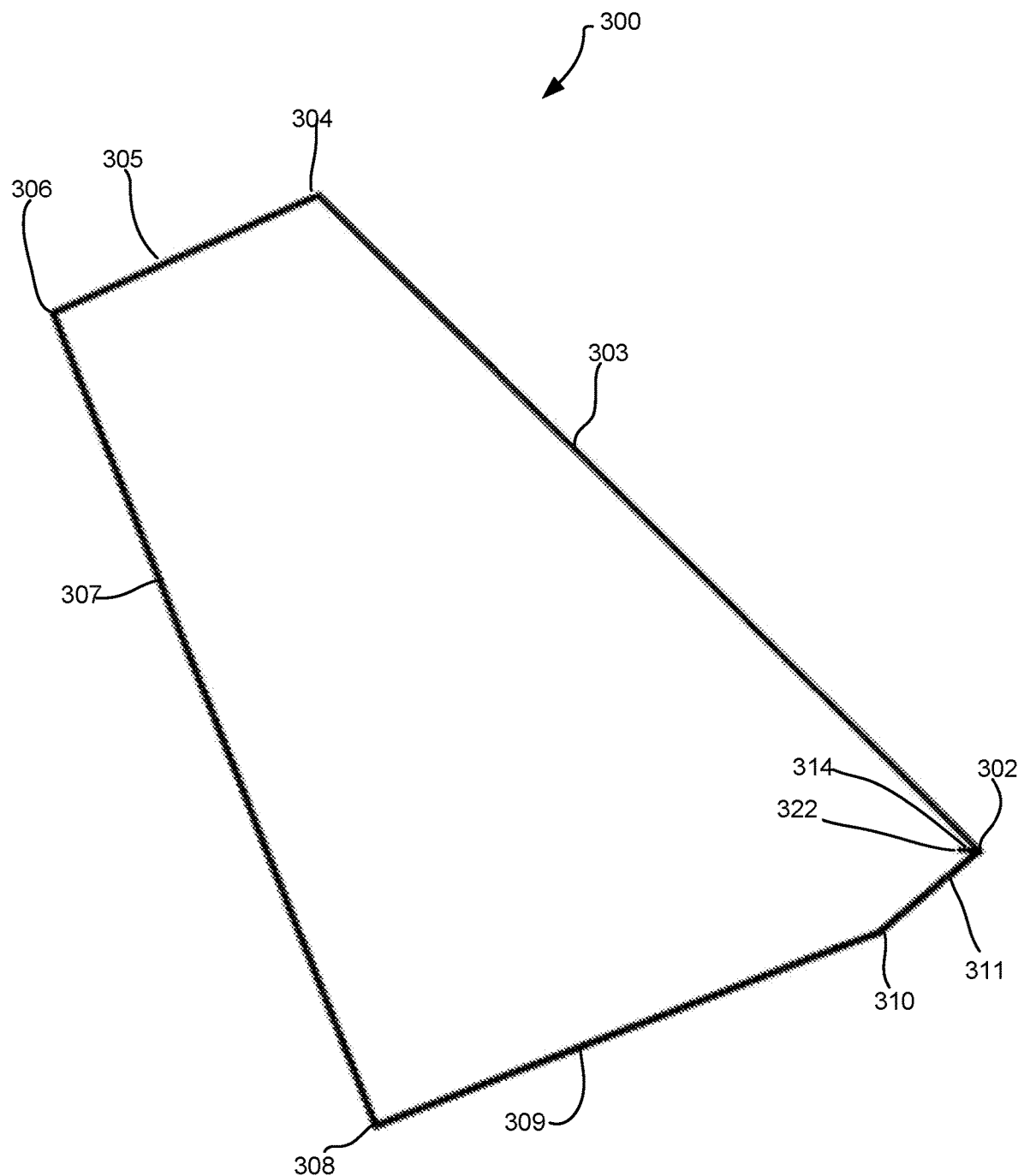
Figure 3D:
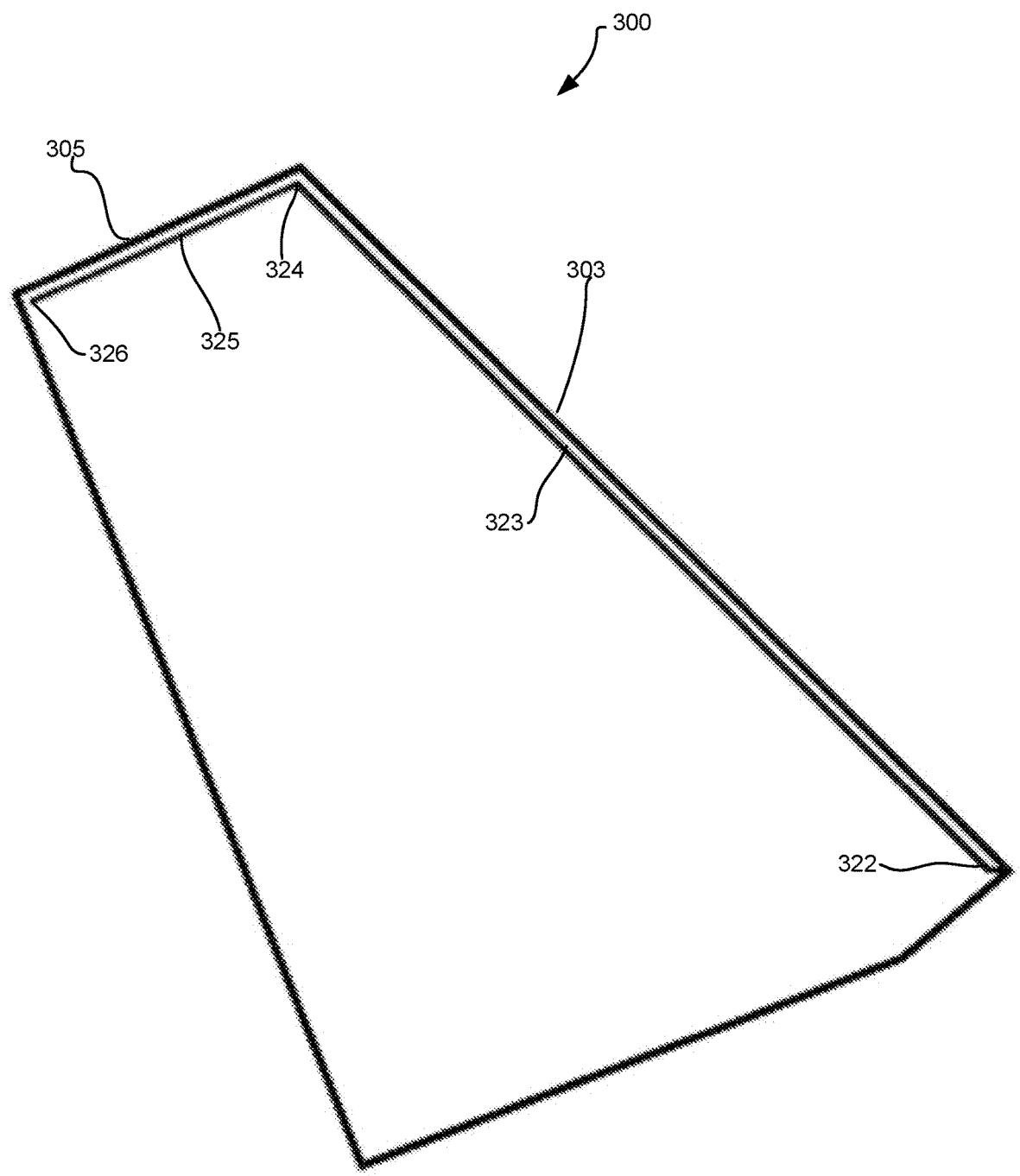
Figure 3E:
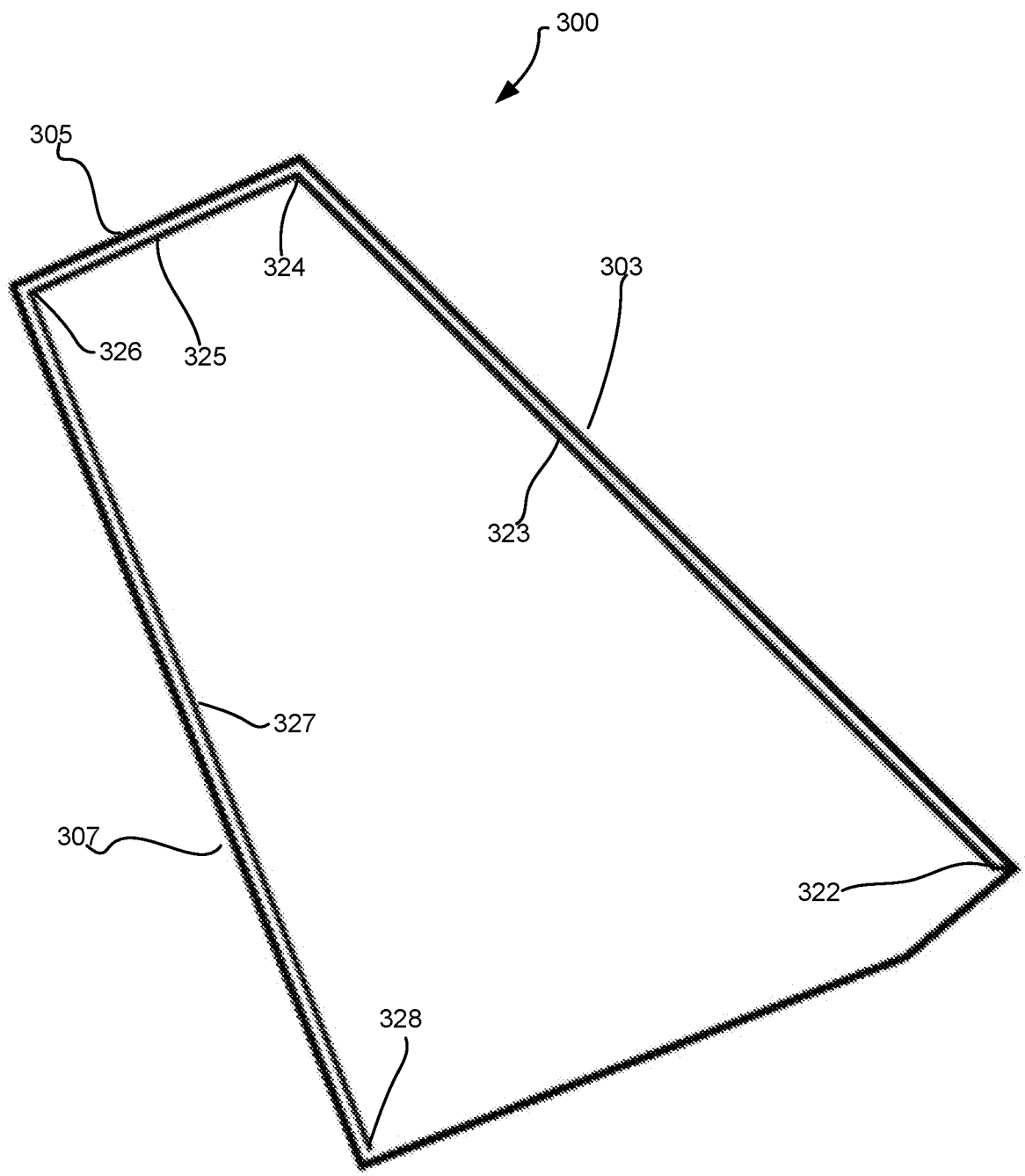
Figure 3F:
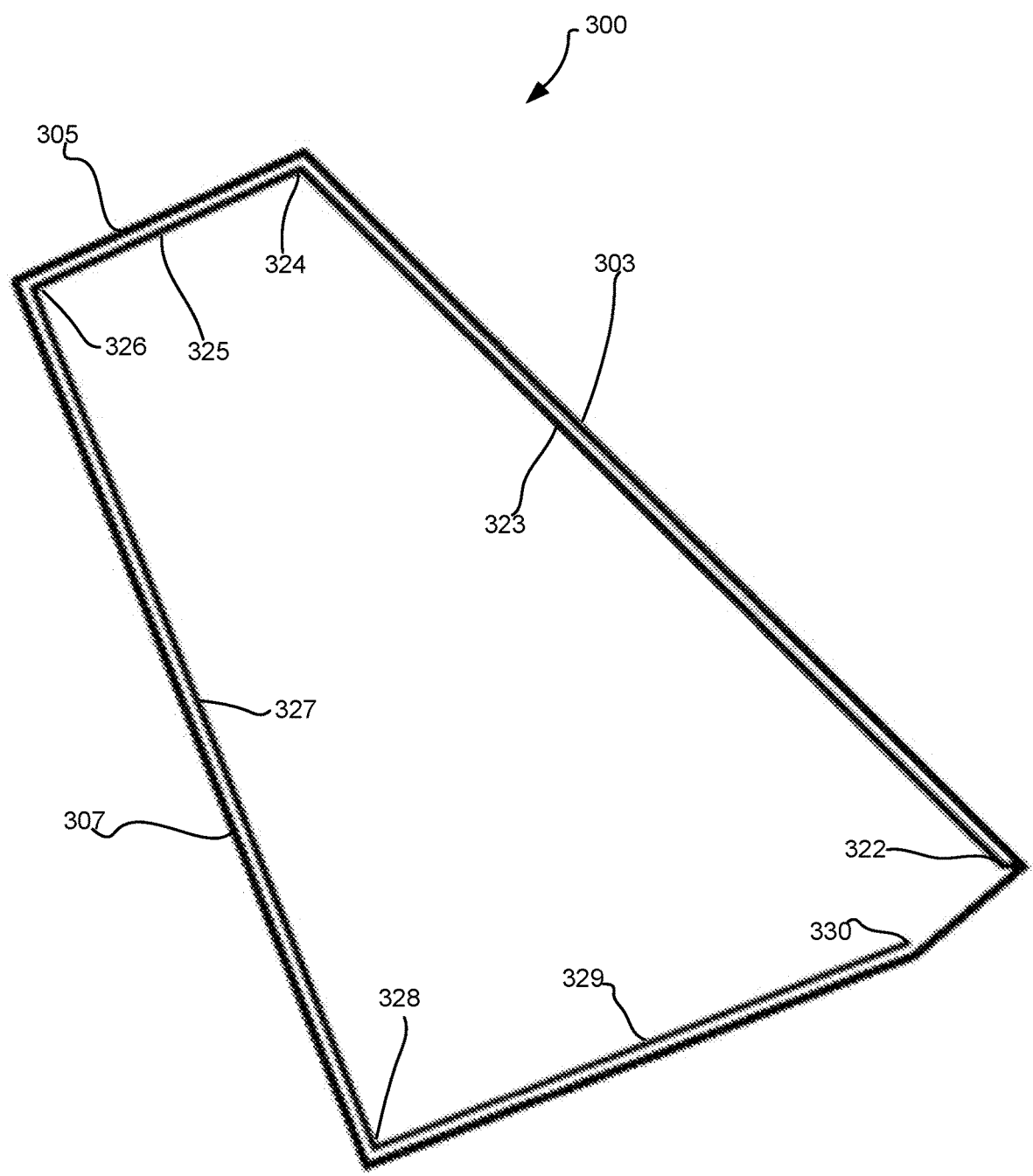
Figure 3G:
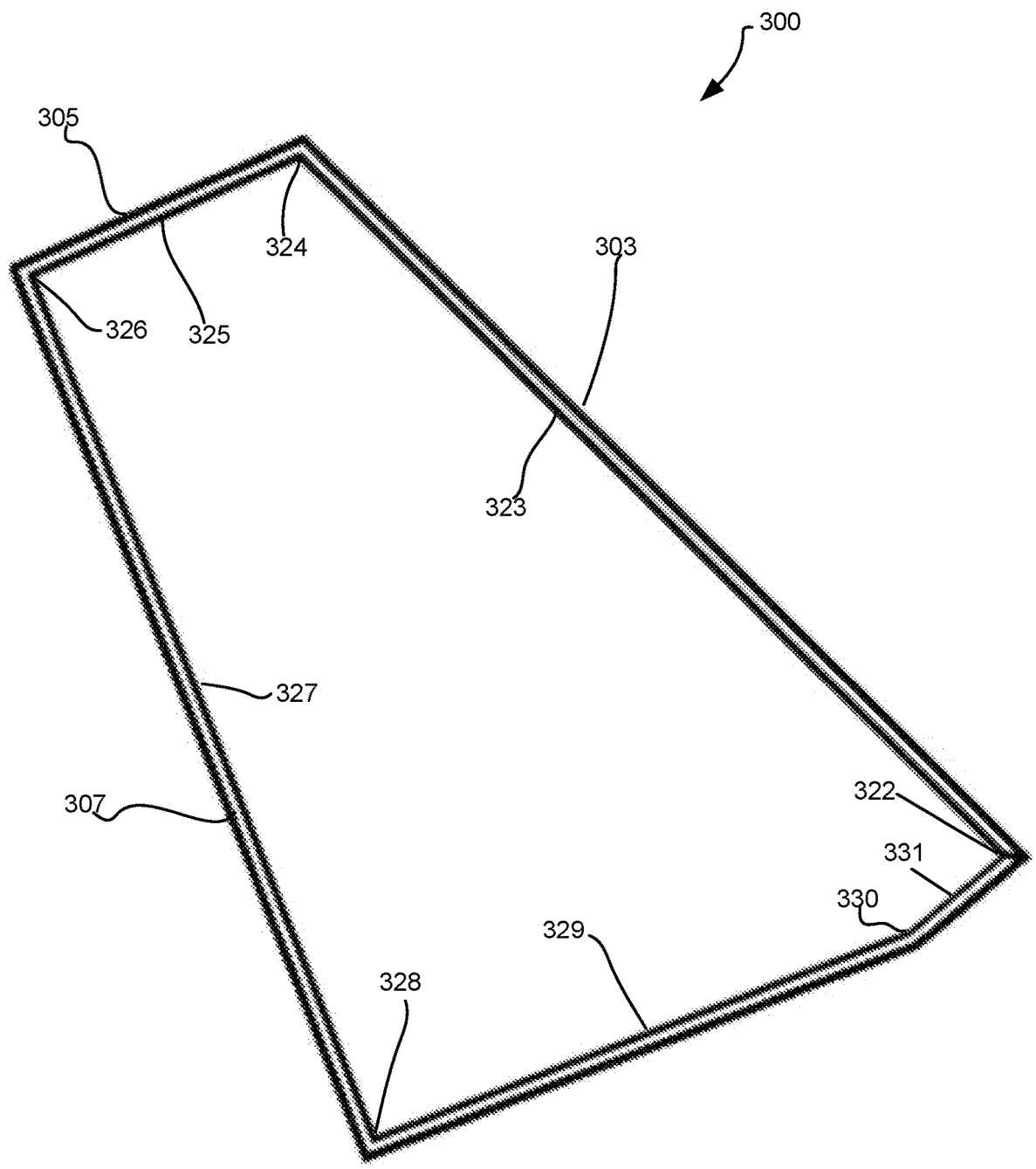

Turning to FIG. 3C, if the path generator has completed a mow path polygon and there is still a portion of the maintenance area that is not covered by any mow path generated for the maintenance area, the path generator determines the start node of a next mow path. If the uncovered area in the maintenance area—that is the area of maintenance region that would not be mowed based on the currently generated paths for the maintenance region—is adjacent to the start/end node of the path polygon (e.g., node 302), the path generator generates the new node in the uncovered area adjacent to the current mow path polygon. This new node may be the start/end node for the next mow path polygon. For example, the path generator can determine the position of node 322 based on node 302, where the position of node 322 is determined such that node 322 is a particular distance from mow path 303 and mow path 311 (e.g., based on the mow deck width and percentage overlap between passes). The path generator defines a path from the already created path polygon to the next path polygon. For example, the path generator generates a path 314 having node 302 and node 322 as its endpoints. According to one embodiment, paths connecting to the next node path polygon are (e.g., path 314) are designated as mow paths by default. The new mow path polygon becomes the current mow path polygon.

As illustrated in FIG. 3D, FIG. 3E and FIG. 3F, and FIG. 3G, the path generator then follows the edges (paths) of the adjacent prior polygon to define path 323 (having end nodes 322, 324), path 325 (having end nodes 324, 326), path 327 (having end nodes 326, 328), path 329 (having end nodes 328, 330), and path 331 (having end nodes 330, 302) forming a second path polygon. Again, in some embodiments, the paths that form the polygon can be automatically designated as mow paths. The locations of nodes 322, 324, 326, 328, 330, 322 are determined such that mow paths 323, 325, 327, 329, and 331 are spaced from respective adjacent mow paths 303, 305, 307, 309, 311 to achieve the configured overlap given the mow deck size.

Figure 3H:
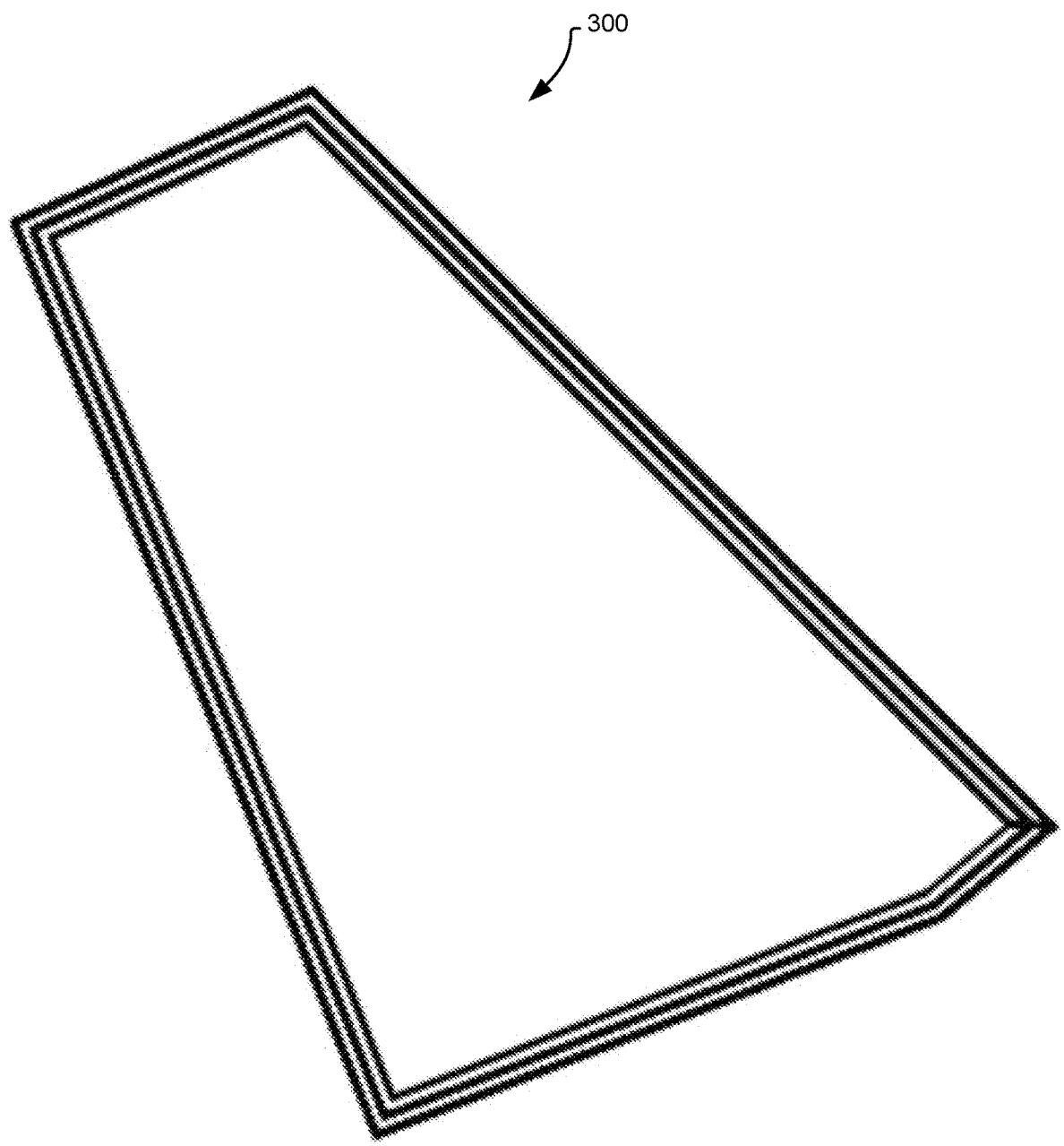
Figure 3I:
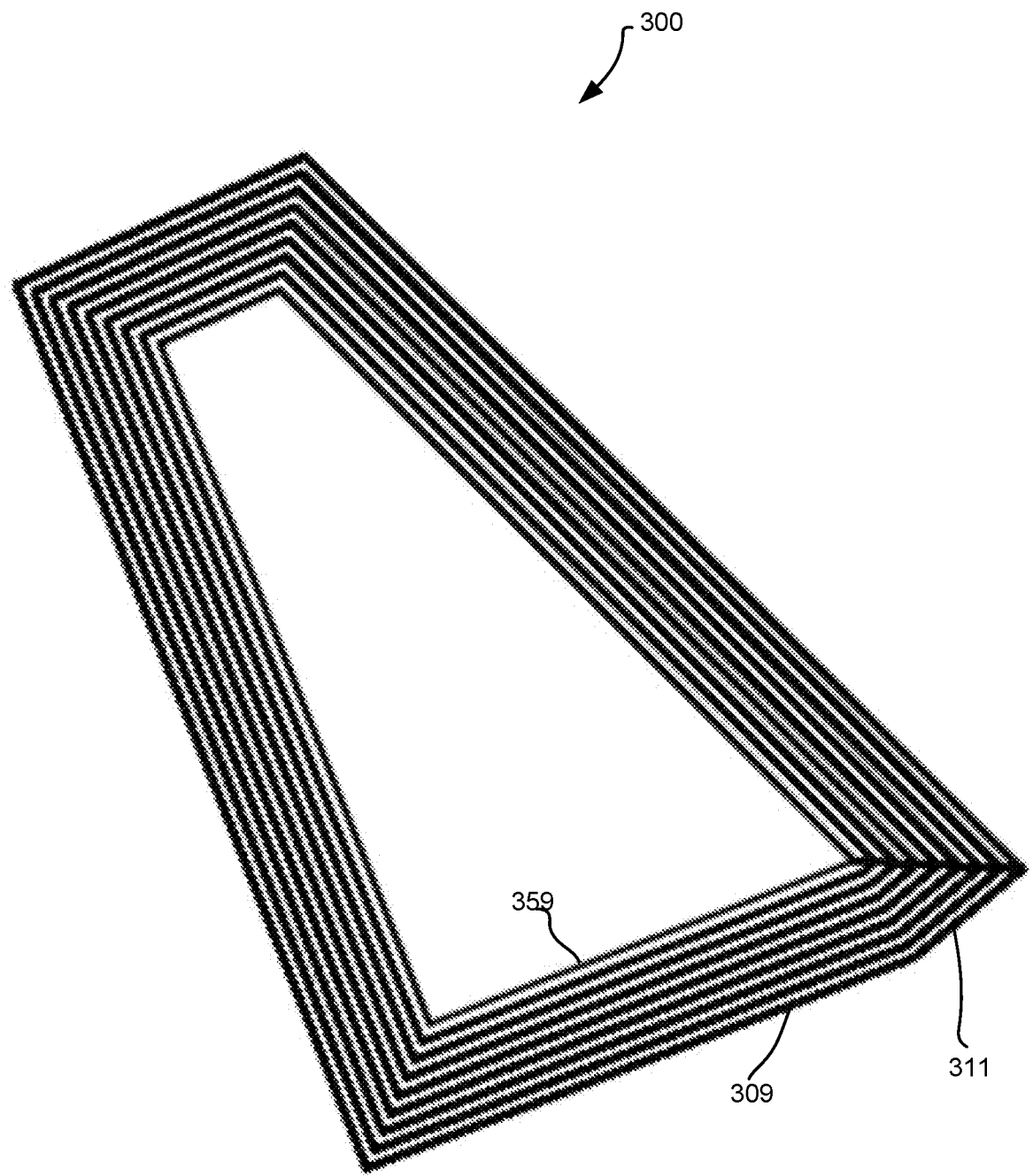
Figure 3J:
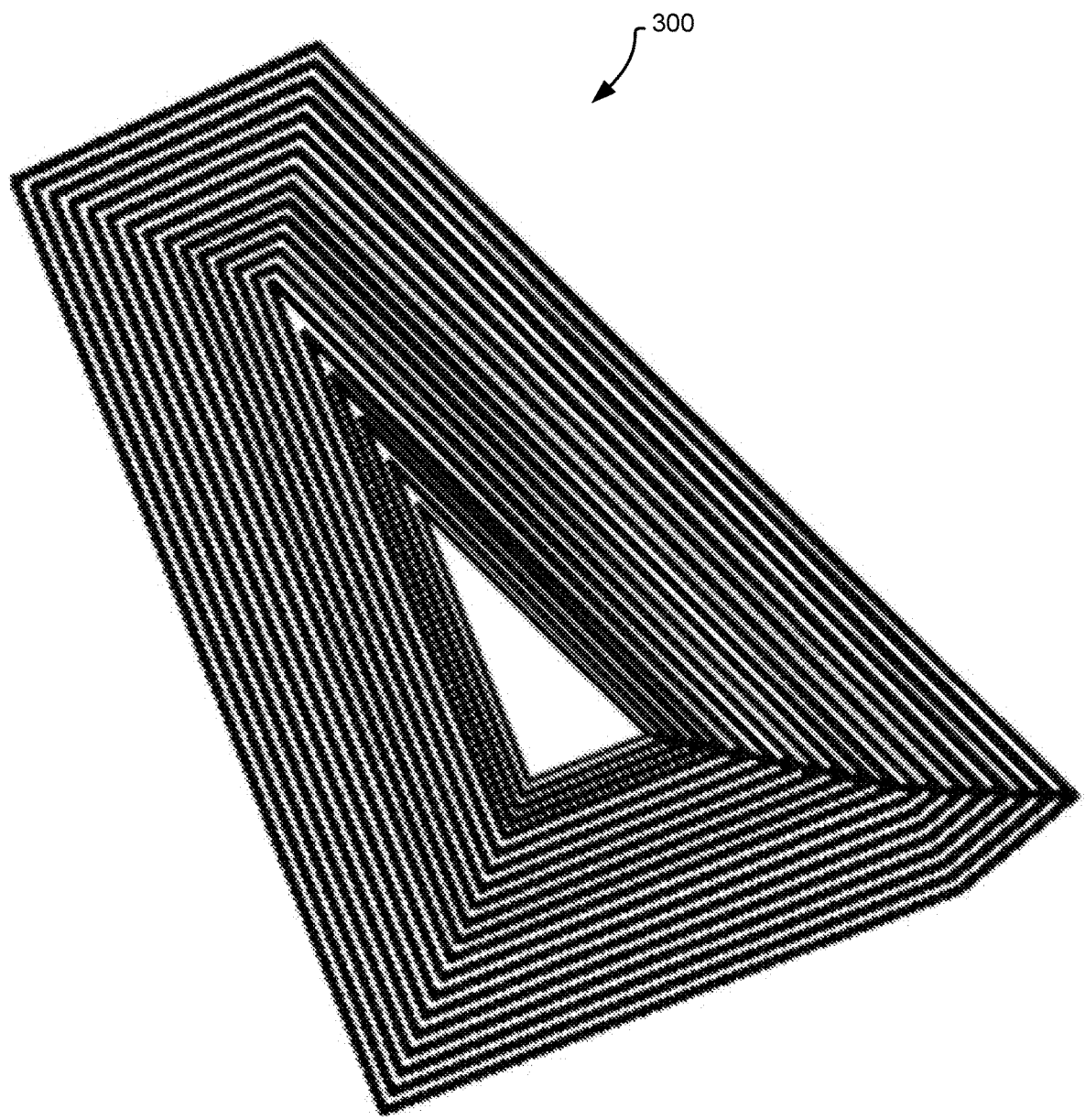
Figure 3K:
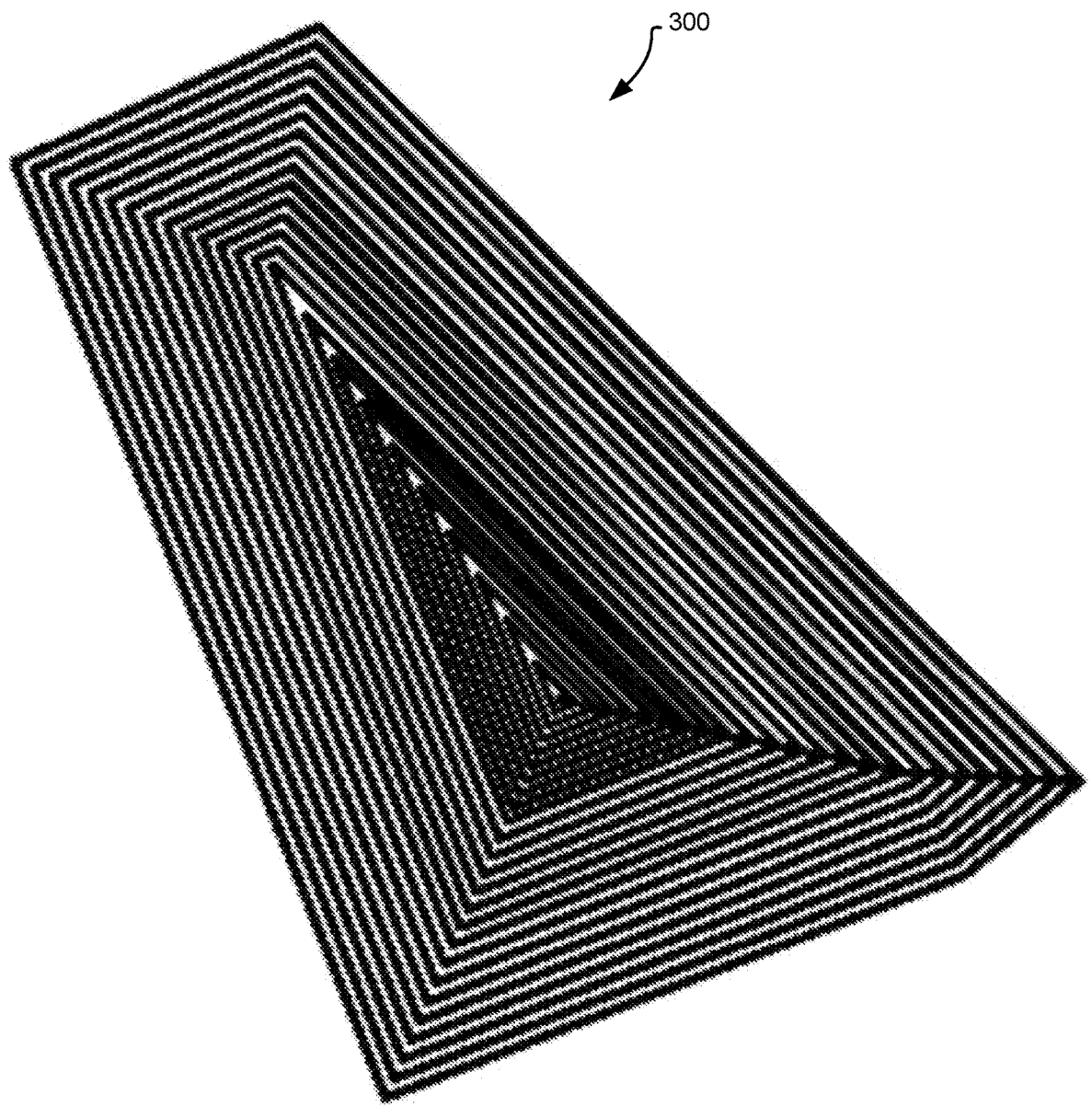

As illustrated in FIG. 3H, this process can be repeated to create progressively smaller path polygons. As illustrated in FIG. 3I, at some point a path from an outer path polygon may become so short that it is not represented in the current mow path polygon. For example, after several iterations, the paths 309, 311 are reduced to a single path 359 (edge) in the current path polygon. FIG. 3I, FIG. 3J, and FIG. 3K illustrate the path generator continuing to generate paths for maintenance area 300 until maintenance area 300 is fully covered by paths.

Figure 4A:
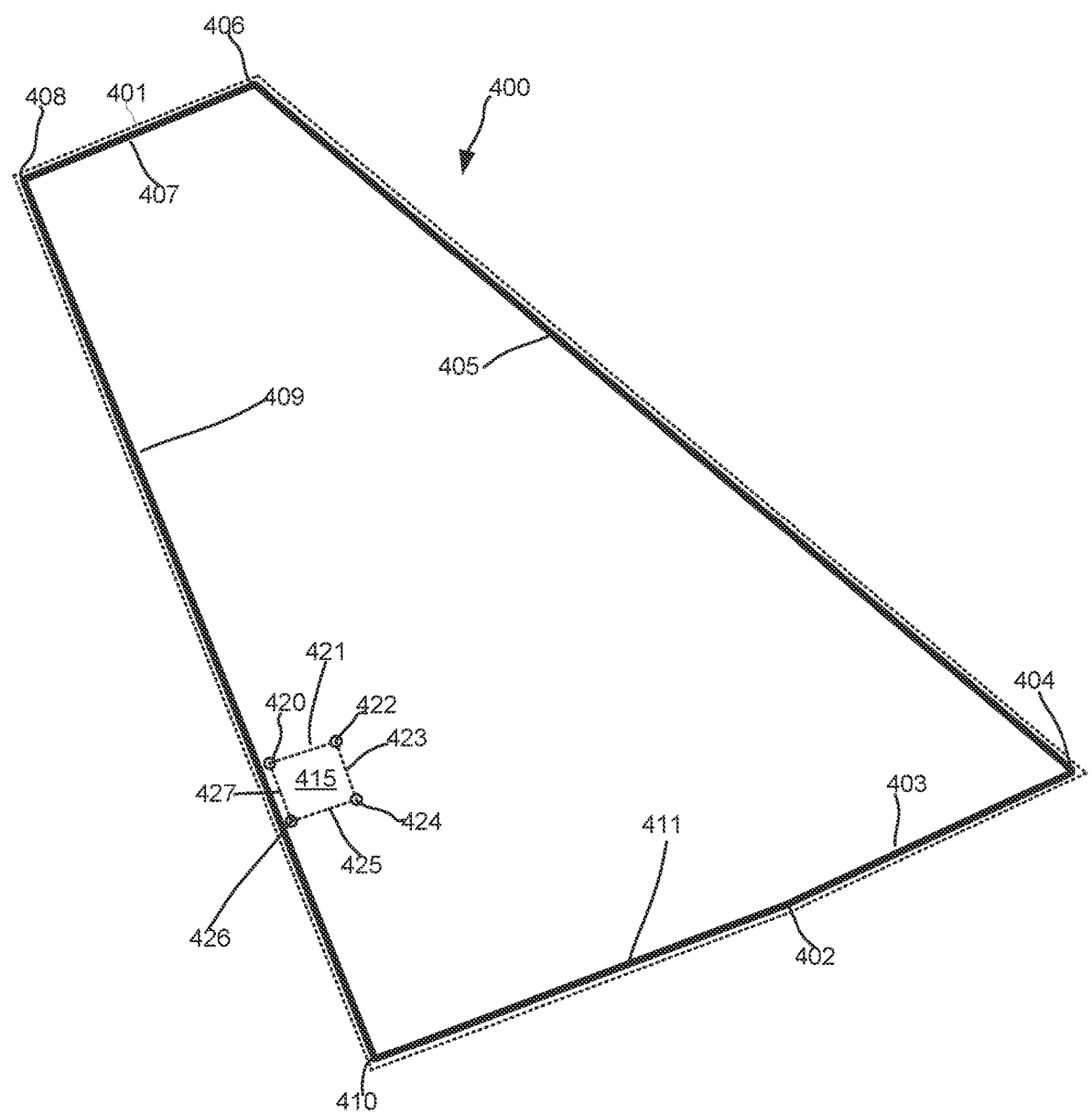
FIG. 4A, FIG. 4B, FIG. 4C, FIG. 4D, FIG. 4E, FIG. 4F, FIG. 4G, FIG. 4H, FIG. 4I, FIG. 4J, FIG. 4K, FIG. 4L and FIG. 4M are diagrammatic representations of another embodiment of generating paths for a maintenance area.

FIG. 4A illustrates another example of a maintenance area 400 that includes an exclusion area 415. To define maintenance area 400, an operator can define the perimeter 401 of maintenance area 400 by, for example, specifying the endpoints (nodes) defining each edge. In some embodiments, to define exclusion area 415, the operator captures coordinate data, selects pixels from a user interface, or otherwise inputs data to indicate the location of the exclusion area boundary nodes 420, 422, 424, 426 to define the edges 421, 423, 425, 427 of exclusion area 415.

Starting at node 402, edge following can be performed to generate the perimeter mow paths—that is, mow path 403 (defined by nodes 402, 404), mow path 405 (defined by nodes 404, 406), mow path 407 (defined by nodes 406, 408), mow path 409 (defined by nodes 408, 410) and mow path 411 (defined by nodes 410, 402) can be generated. Edge following can continue as discussed above to generate progressively smaller mow path polygons, each connected to the adjacent polygon.

Figure 4B:
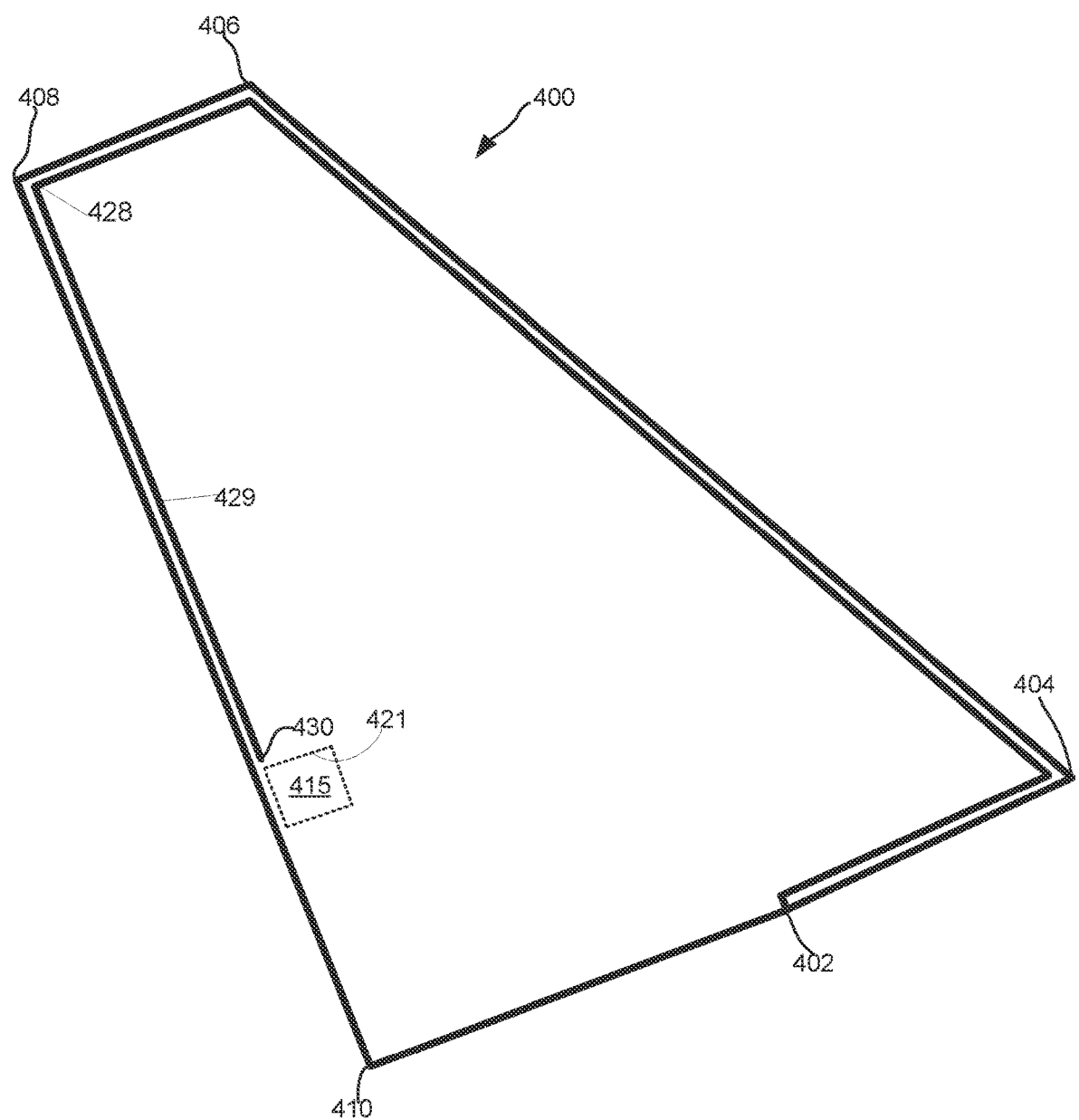
Figure 4C:
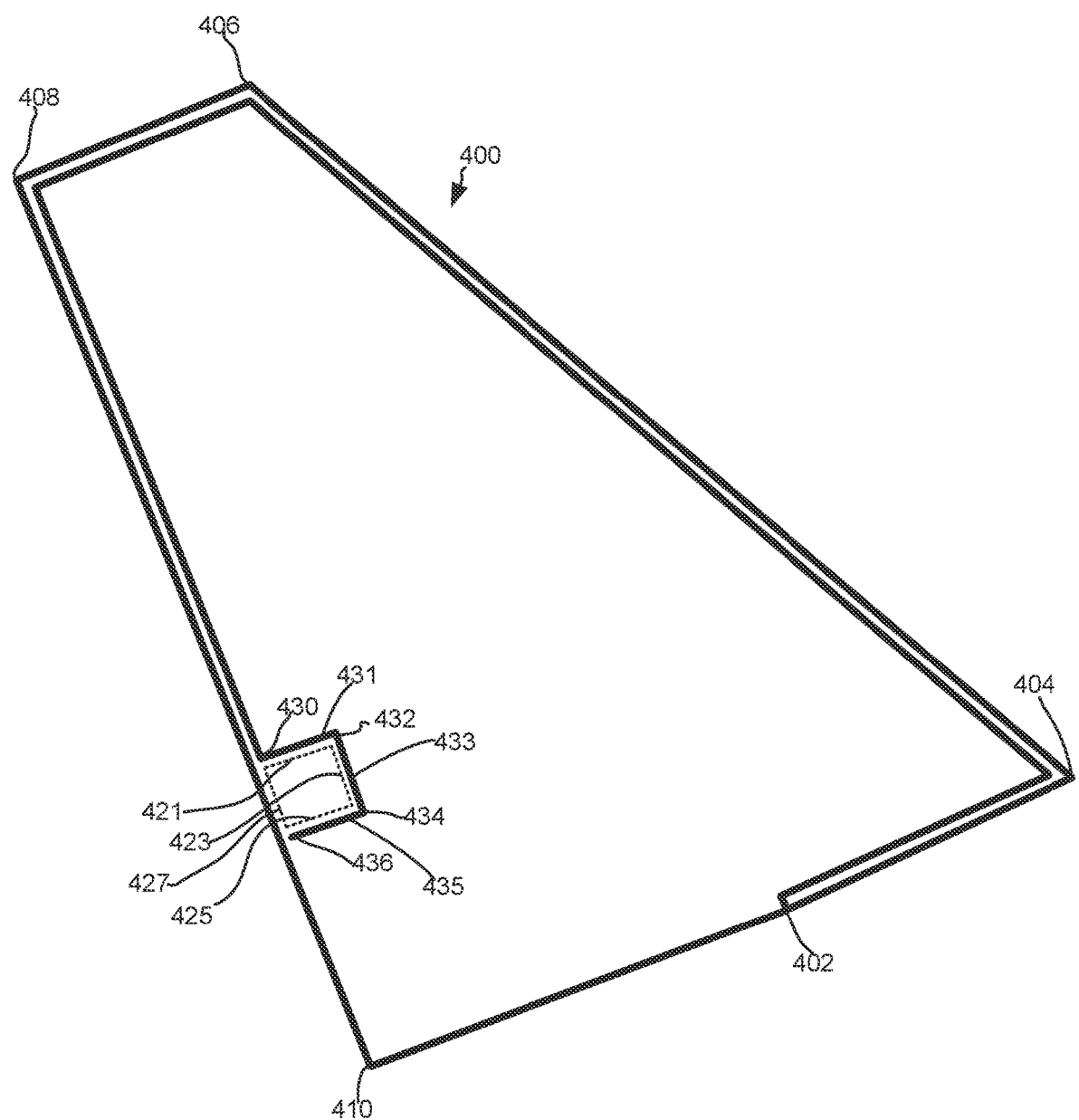
Figure 4D:
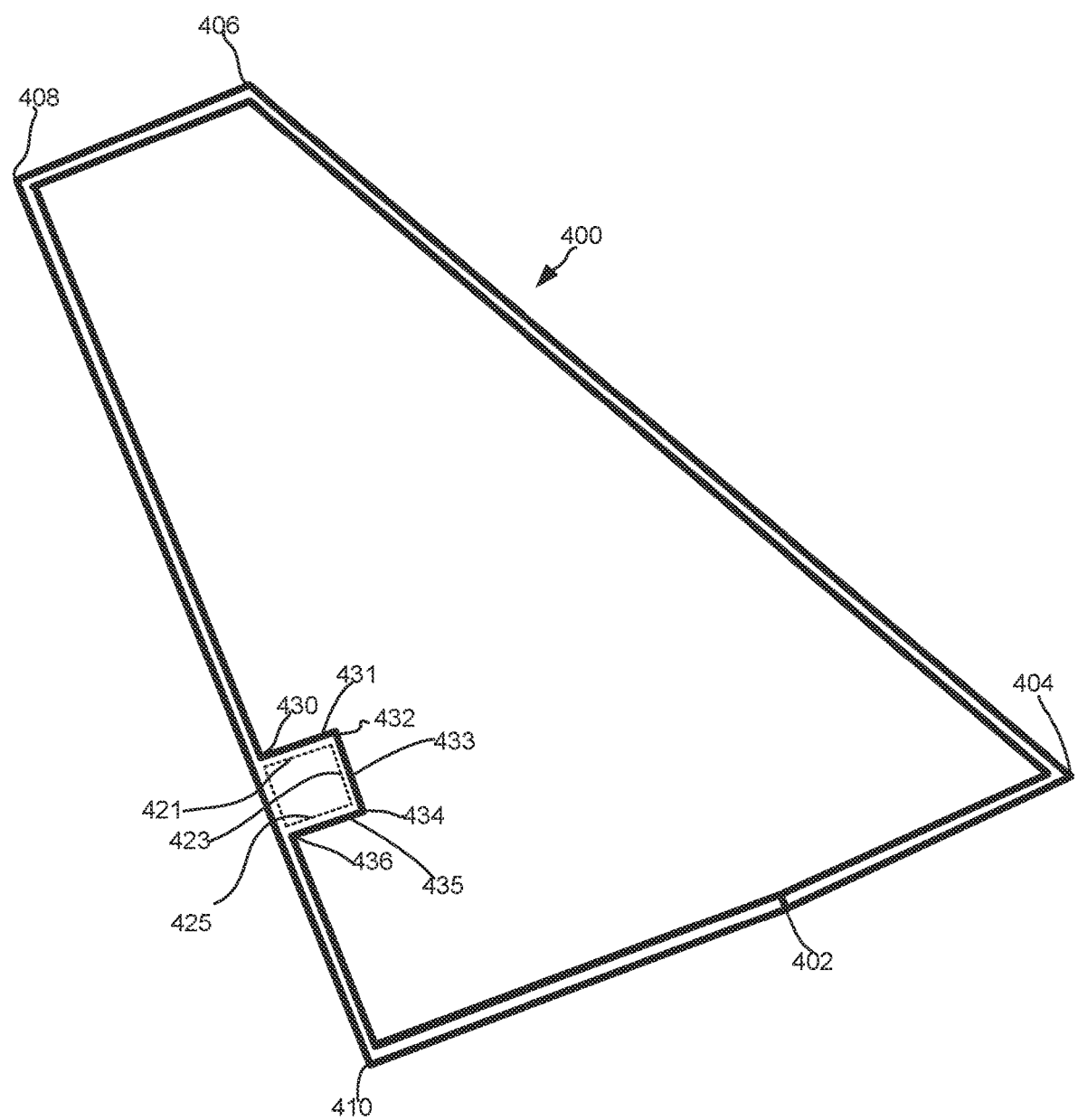

Turning to FIG. 4B, if a path being generated would intersect a boundary edge of an exclusion area, the path can be terminated. For example, on detecting an intersection with exclusion area boundary edge 421, the path generator can terminate mow path 429 (e.g., generate end node 430) so that mow path 429 does not cross boundary edge 421 and is offset from boundary edge 421 by some amount. Thus, the path generator generates node 430 to define mow path 429 having endpoint nodes 428, 430. As illustrated in FIG. 4C, the path generator follows the edges of exclusion area 415 to generate path 431 having endpoint nodes 430, 432, path 433 having endpoint nodes 432, 434 and path 435 having endpoint nodes 434, 436, and then resumes following the prior path polygon to complete the current path polygon (FIG. 4D). In some embodiments, the path generator is configured to leave a fairly wide distance between the boundaries of the exclusion area and the initial mow paths that follow the exclusion area. Thus, in some embodiments, the path generator may come back to fill in around the exclusion area as illustrated in FIG. 4M.

Figure 4E:
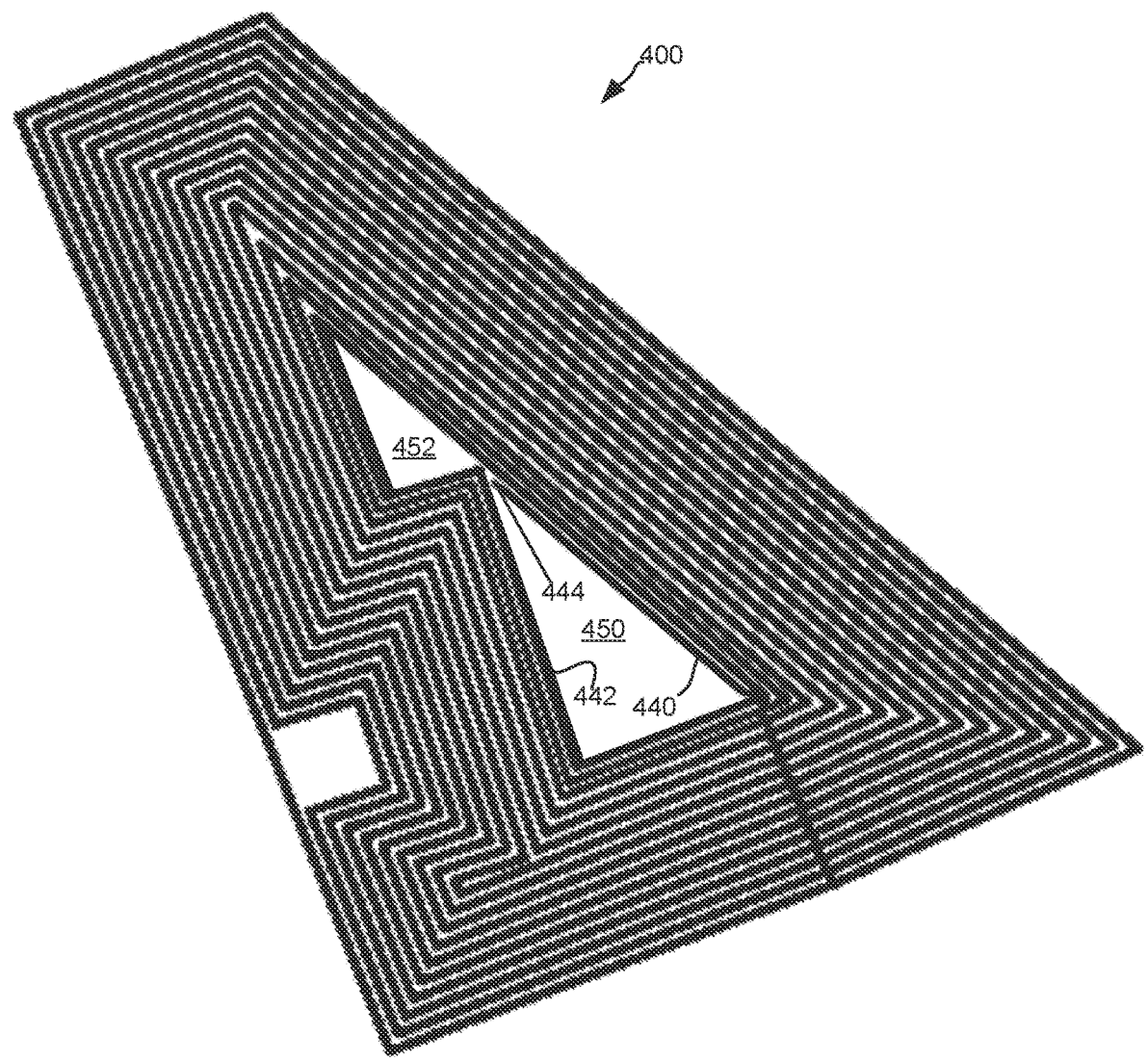
Figure 4F:
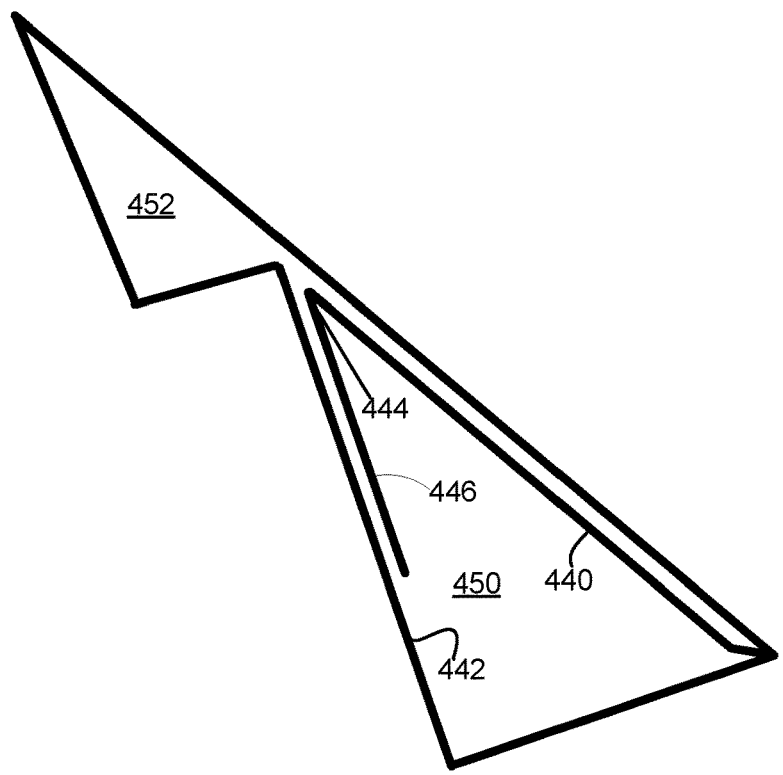
Figure 4G:
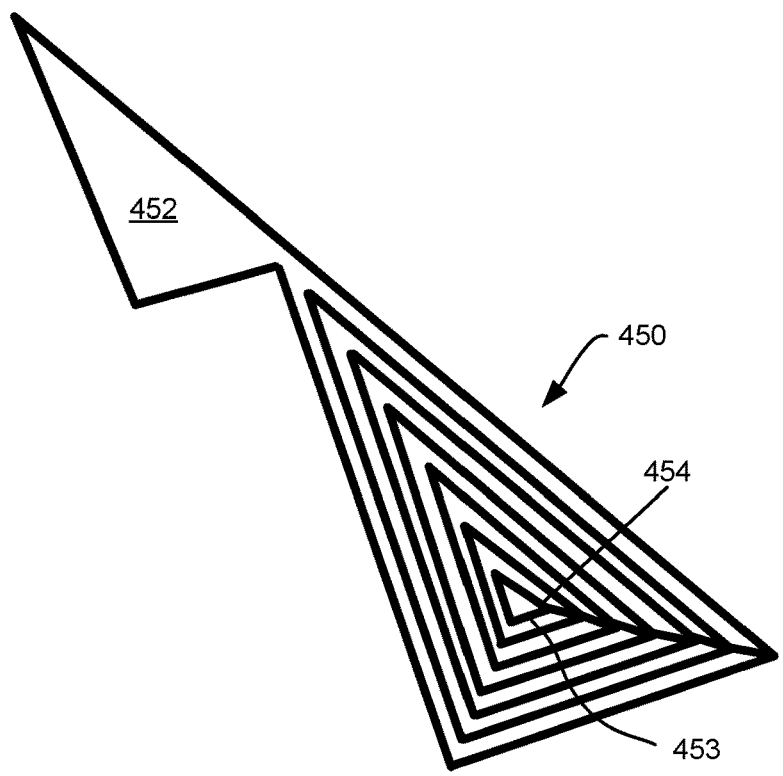
Figure 4H:
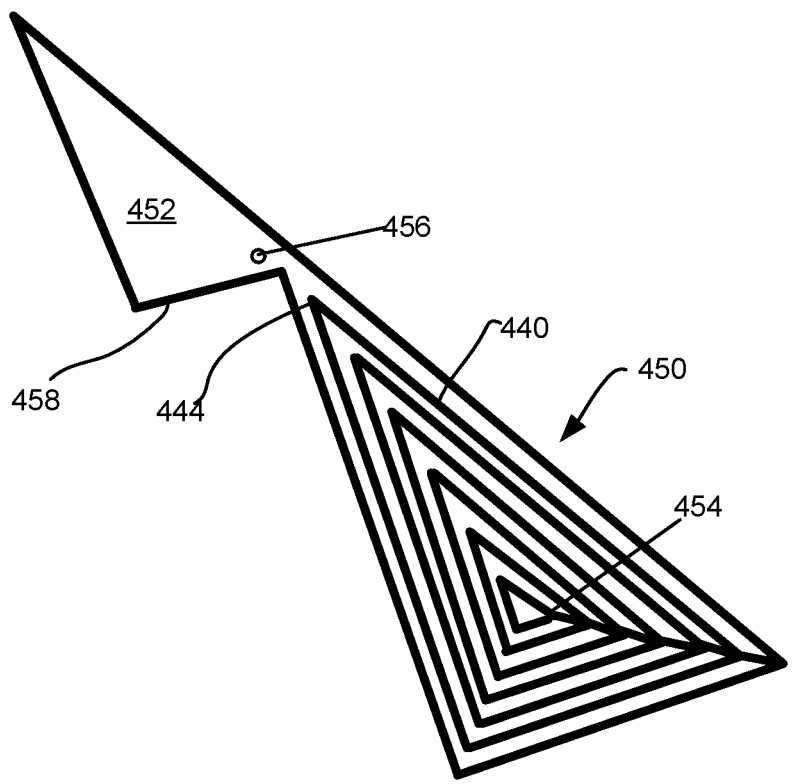
Figure 4I:
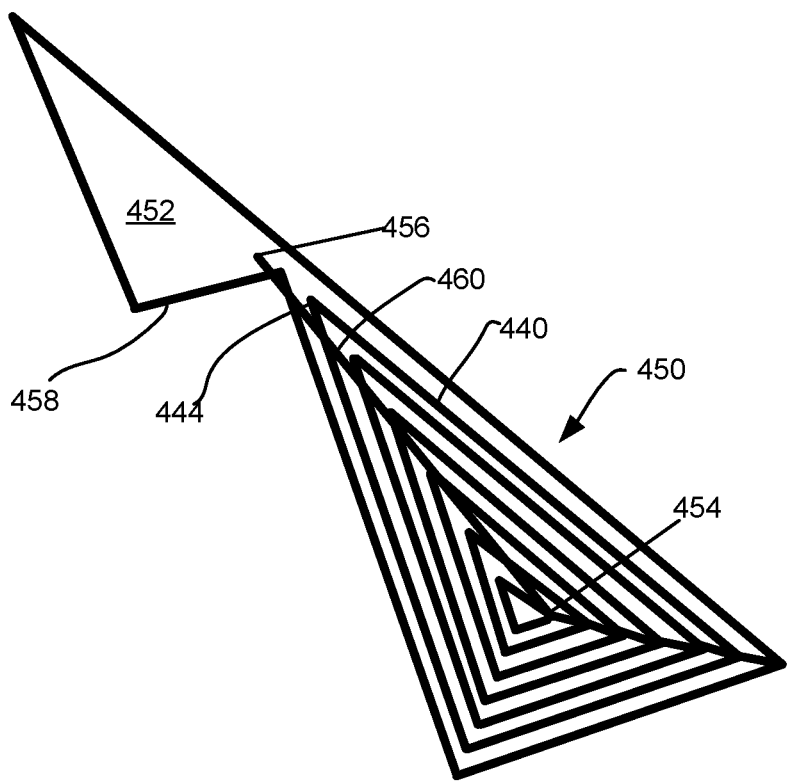

Continuing to FIG. 4E, the path generator continues to generate mow paths based on edge following to fill in the maintenance area. At some point, the path generator may reach a self-intersection with a previously generated path where there is an uncovered subsection of the maintenance area that can be reached without crossing the prior path and an uncovered subsection that cannot be reached without crossing at least one previously generated path. For example, in generating mow path 440, the path generator may detect a self-intersection with prior mow path 442. In this instance, the path generator breaks the maintenance area down into subsection 450 and subsection 452 area each representing a portion of the maintenance area not yet covered by a mow path. The path generator continues to fill in the uncovered subsection proximate to mow path 442. For example, the path generator defines node 444 as the endpoint of mow path 440, and begins generation of path 446, following prior path 442 (FIG. 4F). In one embodiment, the path generator records that node 444 of path 440 is the point at which subsections 450, 452 were determined. As illustrated in FIG. 4G, the path generator can continue to generate mow paths to cover subsection 450. On returning to node 454, the path generator determines that subsection 450 is fully covered by the generated mow paths. For example, after generating path 453, the path generator may determine that there is no adjacent uncovered movable area that is reachable from node 454 without crossing a prior mow path.

When the path generator has fully covered a subsection, the path generator can determine if there are any remaining uncovered subsections to which a connection path can be generated. If there are multiple unfinished subsections, the path generator may select the nearest unfinished subsection. In other embodiments, the path generator selects the unfinished subsection to which to connect based on other rules.

Figure 4J:
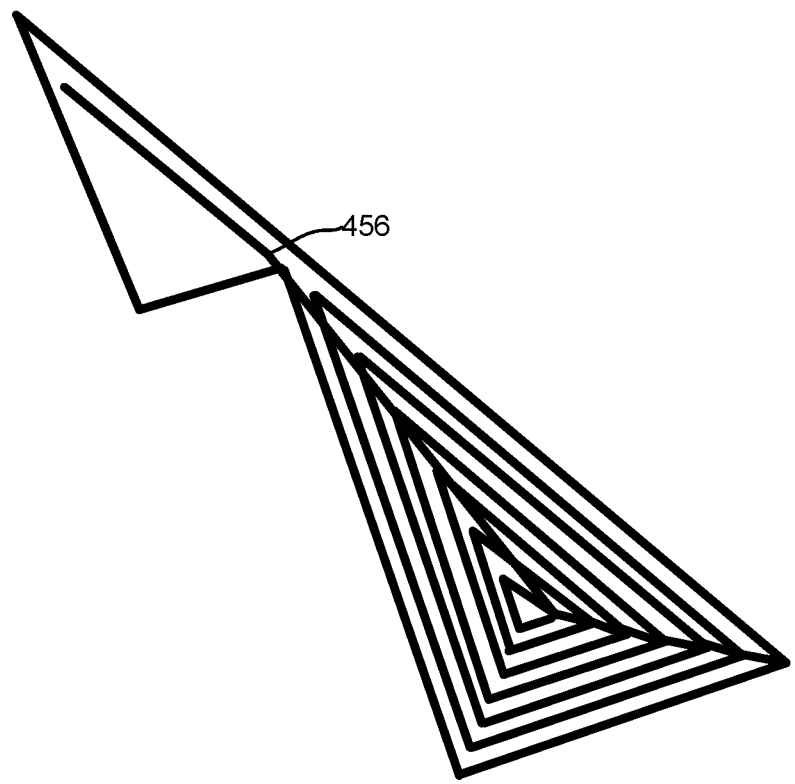
Figure 4K:
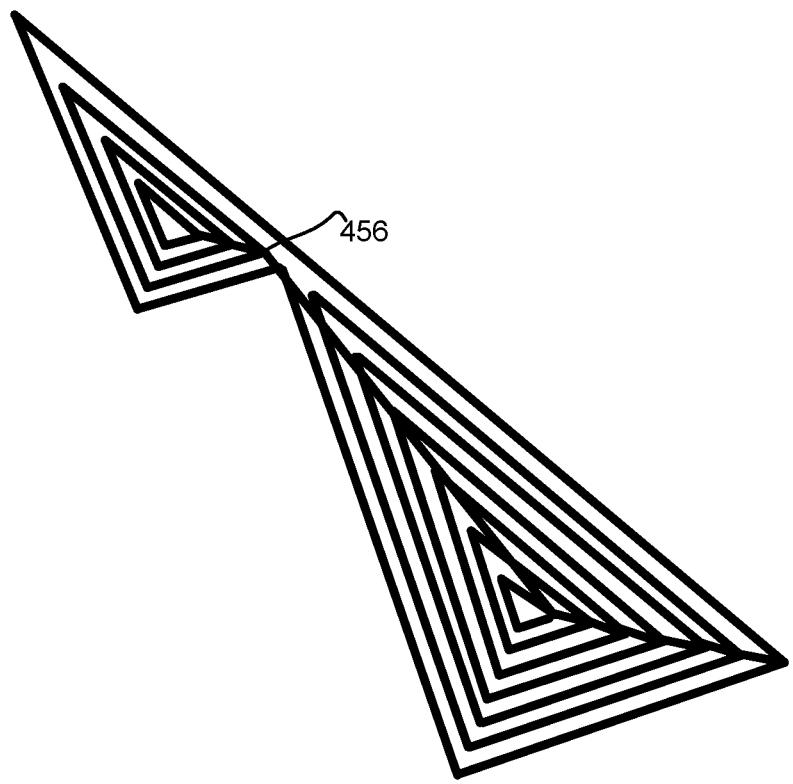
Figure 4L:
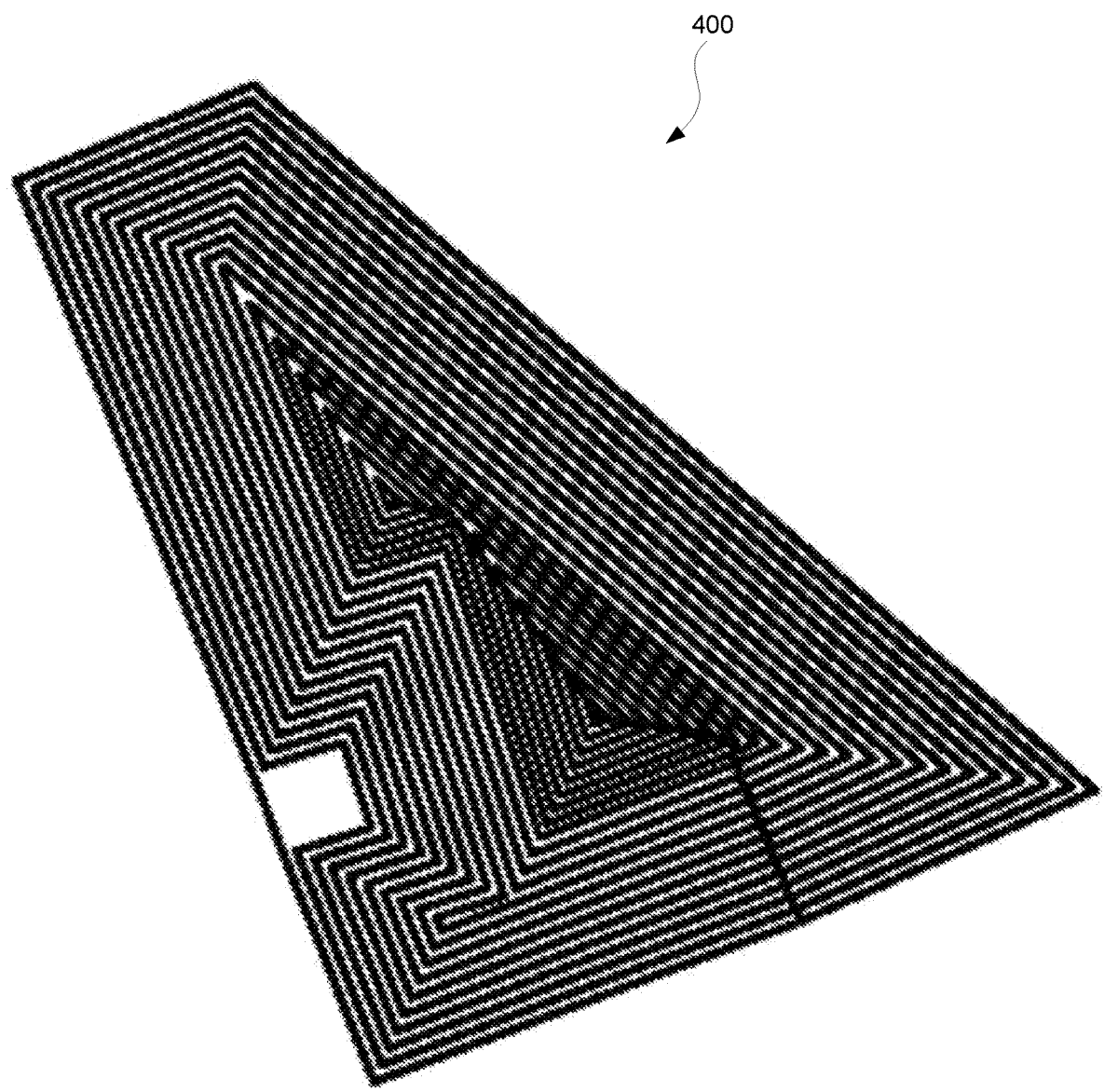
Figure 4M:
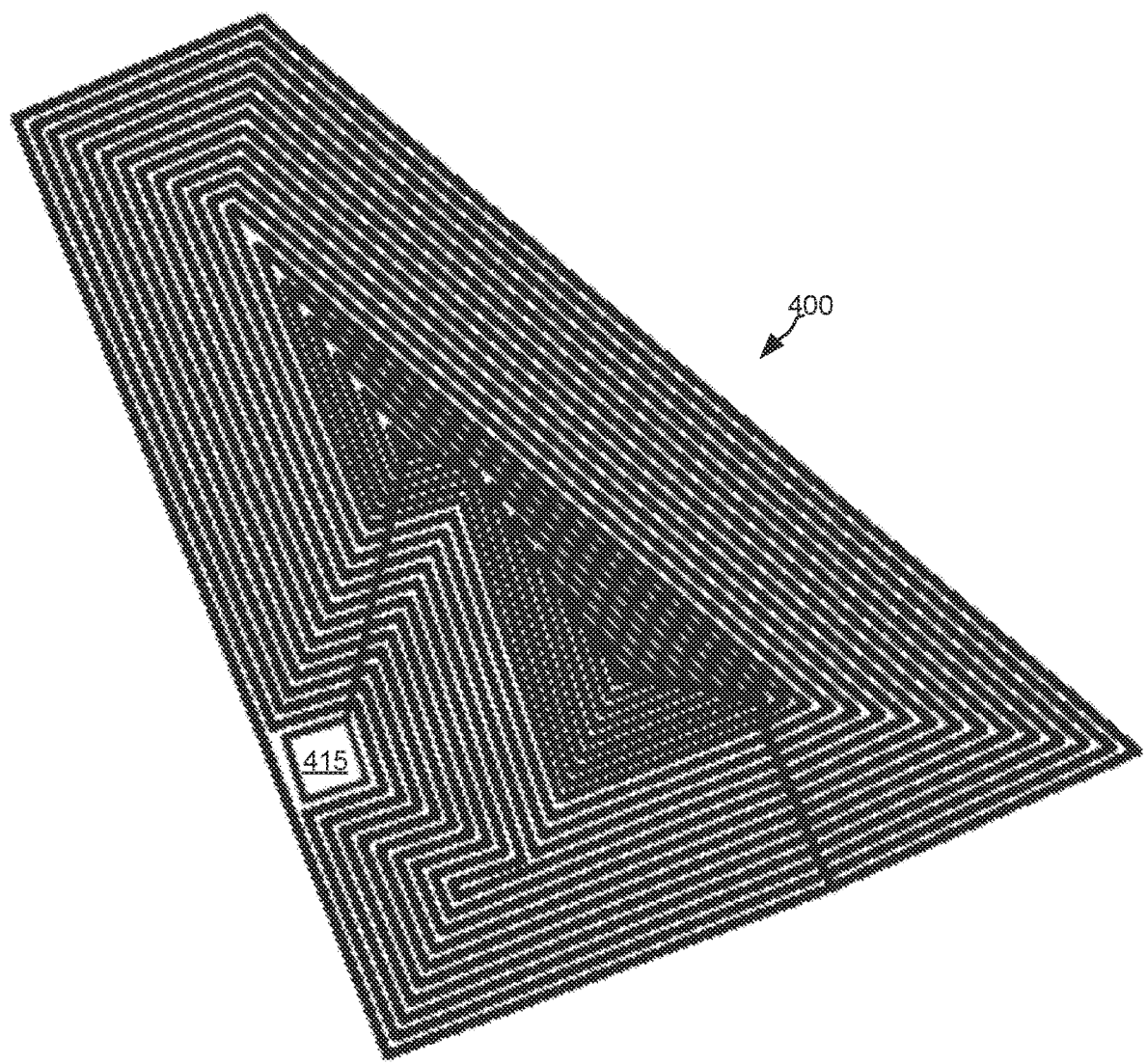

The path generator creates a connection node to define a connection path—that is a transit path within the maintenance area—from the endpoint of the last generated mow path (node 454 in the example of FIG. 4G) of the finished (fully covered) subsection 450 to the selected unfinished subsection (e.g., subsection 452). In one embodiment, the location of the connection node is selected as the closest point in the unfinished subsection that i) lies along the projection of the path for which the self-intersection that lead to the creation of the subsection was detected; and ii) is spaced according to the mow deck size and overlap specified in the configuration. For example, as discussed above in conjunction with FIG. 4E, the path generator divides the uncovered mowable portion of maintenance area 400 into subsection 450 and subsection 452 based on generating mow path 440. Thus, in the embodiment illustrated in FIG. 4H, the path generator generates connection node 456 corresponding to a point that lies along the projection of path 440 into subsection 452 and is the closest point to node 444 that satisfies the distance requirements (e.g., is spaced from path 458 based on the mow deck size and percentage overlap specified). As such, the path generator generates connection path 460 (FIG. 4I) connecting node 454 to node 456. As illustrated in FIG. 4J and FIG. 4K, the path generator continues to generate paths to fill subsection 452, starting at node 456. Thus, as illustrated in FIG. 4L, the path generator can generate paths to cover the maintenance area 400.

In some embodiments, the path generator fills the largest polygon first and then goes back to fill in any unfilled areas in random order. For example, just outside exclusion area 415 has not been filled in, the path generator can return to that area to fill in a mow path around exclusion area 415 as illustrated in FIG. 4M.

The path generator can thus output a set of nodes and their associations to define the mow paths for a maintenance area. In some embodiments, the path generator may be configured to specify additional metadata for the nodes. For example, by default each node may be indicated as approachable from any direction (from any other node to which it is connected) in either orientation (autonomous lawnmower in forward or in reverse). For the end nodes of a mow path the nodes may have node metadata designating mower: "on" (cutting enabled) for that path. For the end nodes of a transit path, the nodes may include associated metadata designating mower: "off" (cutting disabled). In other embodiments, the path generator may be adapted to automatically configure nodes in other ways.

Turning to FIG. 1F, mow planner 110 can thus determine the set of paths 168 to achieve full coverage of the mowable area within maintenance area 136. In one embodiment, the autonomous mower system 100 may store path data for the set of paths 168 (e.g., in data store 118 of FIG. 1A) and, when a scheduler determines that a maintenance plan for maintenance area 136 is to be run or on the occurrence of another event, management system 106 sends the path data for the set of paths 168 and the path data for the transit paths 164 to autonomous mower 102. Autonomous mower 102 uses the path data to determine the least cost route. For example, mower 102 may determine the shortest distance route or the route that uses the least amount of battery power to fully mow maintenance area 136. In some embodiments, autonomous mower 102 determines the route before it leaves base station 104 to implement the maintenance plan.

According to another embodiment, when a scheduler determines that a maintenance plan for maintenance area 136 is to be run or on the occurrence of another event, management system 106 uses the path data for the set of paths 168 and the path data for the transit paths 164 to determine the least cost route and sends the least cost route to autonomous mower 102.

In yet another embodiment, when a scheduler determines that a maintenance plan for maintenance area 136 is to be run or on the occurrence of another event, management system 106 sends the path data for transit paths 164 and the definition of maintenance area 136 to autonomous mower 102. Autonomous mower 102 generates the paths for maintenance area 136 and determines the least cost route to follow.

FIG. 3A-FIG. 3K and FIG. 4A-FIG. 4O provide examples of generating paths for open areas. As discussed above, embodiments may also support generating paths for mowing between panels. In general, the maintenance areas for rows of solar panels may include rectangles between the rows of solar panels. FIG. 5A illustrates an area 500 containing solar panel row 502, solar panel row 504, solar panel row 506, solar panel row 508. Further, an obstruction 590 is illustrated. Additionally, transit path 530, defined by nodes 529, 531 is illustrated.

In one embodiment, an operator selects an area for maintenance by selecting three of the four nodes that define a rectangle (say node 510, node 512 and node 514) and the fourth node 516 can be inferred. The operator may capture coordinate data, select pixels from a user interface, or otherwise input data to indicate the location of the nodes 510, 512 and 514.

The mow planner may be configured to determine a set of rectangles that represent the maintenance areas between the rows of solar panels. According to one embodiment, part of the configuration data for determining the rectangles includes information to determine the number of rectangles and information to determine the widths of the rectangles. In one embodiment, the information to determine the number of rectangles may include the pitch distance between each set of panels, that is the distance between the centerlines of the panels (e.g., the distance between centerline 503 and centerline 505, which may be assumed to be consistent between rows). In another embodiment, the information to determine the number of rectangles includes the number of rows of solar panels in maintenance area 500. According to one embodiment, the parameters for defining the width of the rectangle include the mow offset distance from the panels. In some embodiments, the configuration data may also include a shift distance specifying how far to shift the center lines of the rectangle for consideration of mow path. The shift distance may be used to compensate for panels that are highly tilted such that the mower can get under the panels on one side, but not the other (for example the mower can mow under the panels to the rear of the panels, but not the front of the panels).

The mow planner can thus generate rectangles 520, 522, 524 for solar panel rows in area 500. In some embodiments, an operator or the rectangle generator can specify whether each rectangle is open ended, meaning that the autonomous mower can enter/leave the rectangle from either end, or single ended, meaning the autonomous mower can only enter/leave the rectangle at one end. In FIG. 5B, for example, rectangle 520 is designated as single ended and rectangles 522, 524 are designated as open ended. The nodes and paths between the nodes can be created that connect all the paths along the short edges of the rectangle to allow transit between the rectangles.

According to one embodiment, the point on a path on the adjacent closest to the rectangles, which is part of the route network, is designated as the exit/entry point for the row. When building a route that includes a row rectangle, the route is planned to the entry point and then the mow path is generated for the rectangle. These individual routes (to the row and in the row) are then concatenated. In some cases, the entry point can be omitted from the route (if it is close enough to the start of the first row path), such the bot will drive directly to the start of the first mow path in the row (rather than moving to the entry point first). The exit process can be the reverse of this, where the path is planned through the exit point to the next destination. In some embodiments, the exit point can be omitted from the route, for example, when close to the last point in the row route.

As illustrated in FIG. 5B, nodes (including, for example, entry/exit nodes) can be computed for the rectangles. In FIG. 5B, nodes 542, 543, 546, 547, 550, 551 for reference paths 532a, 532b, 532c, 532d, 540, 544, 548. Nodes 542, 546, 550 may be determined to be on a line that runs perpendicular to the long axes of the rectangles and that connects to node 531. Because rectangles 522, 524 are open ended, nodes are defined to allow the mower to leave either end of the rectangles and to create connection paths at both ends of the rectangle.

According to one embodiment, the mow rectangles and the corresponding network (nodes) for the reference paths are auto-generated from the survey data and are part of the route network used for route generation. Mow paths in the mow rectangles are autocomputed each time a mow plan to mow the rectangles is requested. In such an embodiment, the mow paths are not explicitly part of the "route network."

Turning to FIG. 5C, in some embodiments, the route network is used to generate mow paths 560, 562, 566, 568, 570, 572 and paths 555 connecting the mow paths on one side of the rectangles and paths 554 connecting mow paths on the other side of the rectangles, based on whether each rectangle is designated as single ended or open ended.

According to one embodiment, the operator may specify an offset distance from the ends of each one the rectangles. The offset distance may be provided to account for the distance from the mow deck edge to the center of the mower (or other reference point on the mower) to prevent the mower from exceeding the rectangle. This may be used for example, if there are obstructions at the end of a row or to otherwise prevent the mower from exceeding the rectangle. For example, an offset may be specified to prevent the center of the mower from passing line 559 when mowing rectangle 520, and hence prevent the mower blades from running over or into an obstruction 590.

During path generation, the mow planner can determine how many passes it will take to fully cover a given mow region (rectangle) based on a mow deck size and a percentage overlap between parallel passes specified. For example, the mow planner may determine that two passes are required for each of rectangle 520, rectangle 522 and rectangle 524.

If the maintenance area is narrow and only has one exit, the mower may not be able to turn around. For rectangle 520 then, the path generator may define mow paths 560, 562 running from respective intersections with path 532 and perpendicular to path 532 and terminating at the offset indicated by line 559. Further, the path generator may generate intermediate paths 563, 564 to connect path 560 to path 562. The intermediate paths can be adapted to cause the autonomous mower to reverse and then move forward when transitioning between mow path 560 and mow path 562 (or vice versa) without turning completely around. In some embodiments, paths 560, 562 are curved based on the geometry of the autonomous mower.

For an open ended rectangle, the path generator may have a preference to define paths such that the mower can leave the rectangle and turn around without reversing. Thus, for rectangle 522, the path generator can generate path 566 and path 568 running from and perpendicular to path 552 and terminating at an intersection path 552 and path 554. Similarly, for rectangle 524, the path generator can generate path 570 and path 572.

The path generator can thus output a set of nodes and their associations to define the mow paths for a maintenance area. In some embodiments, the path generator may be configured to specify additional metadata for the nodes.

Returning to FIG. 1D, a maintenance plan specifies the rectangles (e.g., maintenance areas 132) to mow and the transit paths associated with the rectangles. According to one embodiment, the path data to achieve full coverage of the rectangles may be determined and stored (e.g., in data store 118 of FIG. 1A). When a scheduler determines that a maintenance plan for maintenance areas 132 is to be run or on the occurrence of another event, management system 106 sends the path data for mowing the rectangles and the path data for the transit paths 158 to autonomous mower 102 and autonomous mower 102 uses the path data to determine the least cost route. For example, mower 102 may determine the shortest distance route or the route that uses the least amount of battery power to fully mow maintenance areas 132.

In another embodiment, when a scheduler determines that a maintenance plan for maintenance areas 132 is to be run or on the occurrence of another event, management system 106 uses the path data for the mow paths and the transit paths 158 to determine the least cost route and sends the least cost route to autonomous mower 102.

In yet another embodiment, when a scheduler determines that a maintenance plan for maintenance areas 132 is to be run or on the occurrence of another event, management system 106 sends the path data for transit paths 158 and the definitions of the rectangles to be mowed to autonomous mower 102 and autonomous mower 102 generates the paths to achieve full coverage of maintenance areas 132. Autonomous mower 102 further determines the least cost route to follow.

It can be noted that in some embodiments, the mow planner may have access to the entire route network of site 120. In some embodiments then the mow planner may determine the optimum route to transit to/from an area to be mowed using any of the paths defined in the route network. Thus, in some embodiments, the transit paths to or from areas to be mowed may be automatically determined, including on the fly in some cases.

Executing a maintenance plan may include performing autonomous navigation to follow paths or routes, performing maintenance operations, and taking other actions without human intervention. Autonomous navigation can include path and route following, collision avoidance and other aspects of autonomous navigation known or developed in the art. Autonomous mower can continuously record its progress and report its progress to management system 106. This can include for example, reporting areas of a maintenance plan that were missed (e.g., due to obstacle avoidance) or that autonomous mower 102 was unable to complete (e.g., due to returning to the charger).

In determining the least cost route, the route generator may enforce a set of limitations. Examples include that the autonomous mower cannot rerun the same path in a particular mow operation unless: the mower is transiting between sections; the mower has encountered a return home situation in which the mower must get back to my station quickly; the route generator detects that the mower must traverse a path that it has already mowed to get to a section that needs to be mowed; it would take more time for the mower to stop and turn around than it would for the mower to rerun a particular path. If the mower reruns a path it has already mowed in the current mow operation, it can turn its cutting mechanism off until it reaches a fresh section that needs to be mowed.

Mowers having different characteristics (such a smaller or larger mow deck) can easily replace the current mower because the paths and routes can be automatically regenerated to account for those characteristics.

Figure 6:
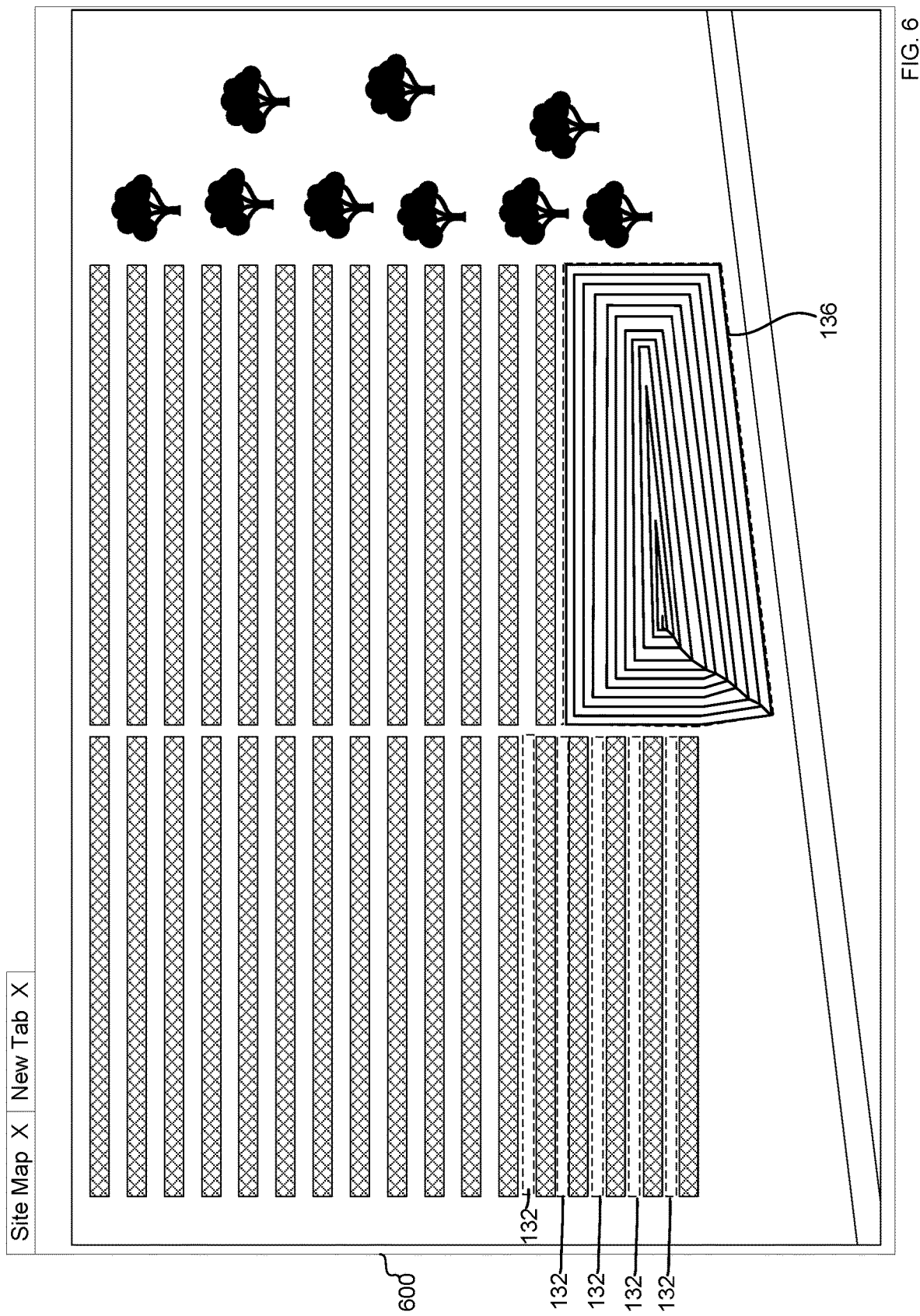
FIG. 6 is a diagrammatic representation of one embodiment of a user interface.

Turning briefly to FIG. 6, an example user interface 600, such as provided by command center application 108 or another component, is illustrated. User interface 600 displays an image of site 620 and can display maintenance areas and associated paths. For example, in FIG. 6, maintenance area 136 is delineated and the mow paths and transit paths defined or generated for maintenance area are overlaid on the image of site 120. User interface 600 may provide tools to allow the user to select the nodes that define the paths or the paths. For example, the user may be provided context menus or other tools that allow the user to change the metadata associated with nodes or paths (for example, change a node from allowing approach in either orientation to only allowing approach in a forward direction). Further, user interface 600 may provide tools to allow the user to select defined rectangles 132 to include in a mow plan, to specify parameters for the rectangles or to take other actions with respect to rectangles 132 or paths generated for rectangles.

Figure 7:
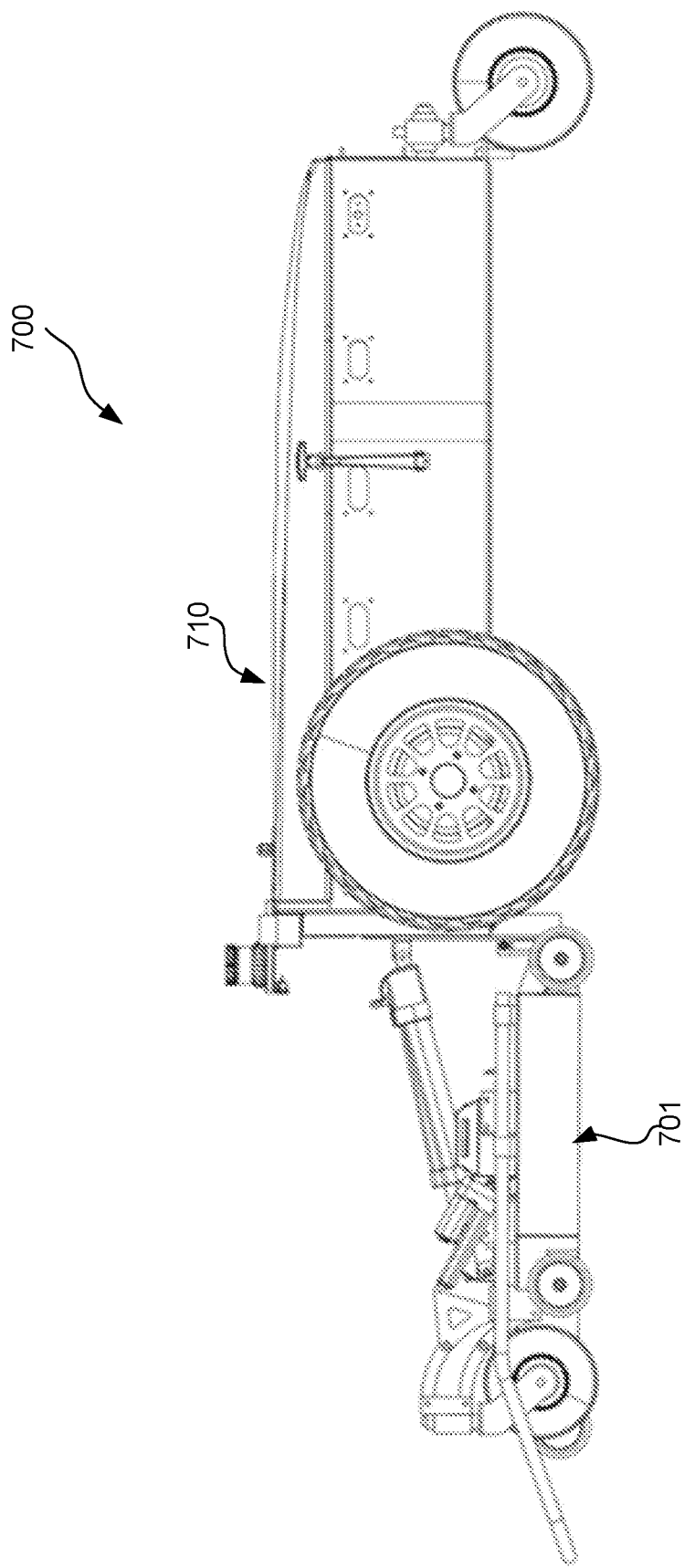
FIG. 7 is a diagrammatic representation of one embodiment of an autonomous mower.

FIG. 7 is a diagrammatic representation of one embodiment of an autonomous mower 700, which may be one example of autonomous mower 102. Autonomous mower 700 includes a mowing deck 701 and a tractor 710. Tractor 710 includes a main body that houses various electrical components and electronics, such as batteries, drive motors, a battery management system, component controllers, sensors (e.g., LIDAR, RADAR, IMU, inertial navigation systems, temperature sensors, humidity sensors, noise sensors, accelerometers, pressure sensors, GPS, ultrasonic sensors, cameras or other sensors), network interface devices, a computer system to provide overall control of the mower, or other components.

Mowing deck 701 includes one or more blades disposed below a mowing deck 701. The mowing deck is supported by a number of wheels. In other embodiments, the mowing deck 701 may be cantilevered from tractor 710 without supporting wheels. Power is provided through electrical connections to motors on mowing deck 701 to drive the mower blades.

Mowing deck 701 is adapted to provide for low-profile mowing that can pass under solar panels, even when the solar panels are positioned close to the ground and the tractor cannot drive under them. For example, mowing deck 701 is disposed forward of tractor 710 and outside of the wheels of tractor 710. Thus, tractor 710 can drive the mowing deck 701 into spaces which tractor 710 itself cannot go, such as under panels that are lower to the ground than the top of tractor 710. The form factor of the mowing deck can be selected to achieve a desired cutting width and low profile. By way of example, but not limitation, mowing deck 701 can be configured as a 63-inch mowing deck that can operate with less than 24 inches of vertical clearance between the panel and ground, but still allow for mowing up to a height of at least 12 inches. Mowing deck 701 may be otherwise configured to have a larger or smaller width, to work in different clearances and to have different mowing heights. In some embodiments, mowing deck 701 may be raised and lowered. In addition, or in the alternative, mow deck 701 may be tilted up and down.

Figure 8:
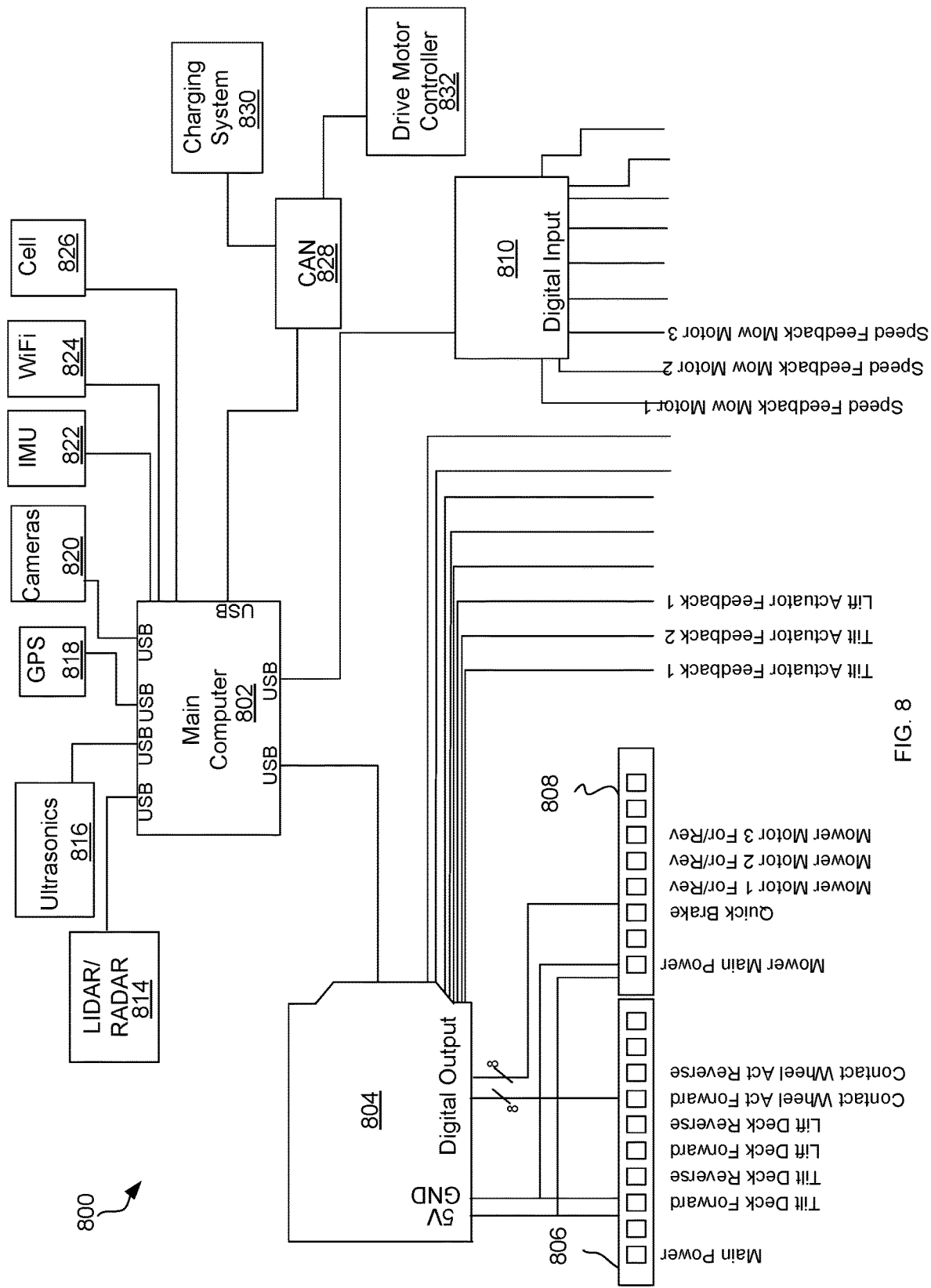
FIG. 8 is a diagrammatic representation of one embodiment of a control system.

FIG. 8 is a diagrammatic representation of one embodiment of a control system for an autonomous mower, such as autonomous mower 102. Components of FIG. 8 may be housed in an autonomous, unmanned vehicle, such as a tractor. Control system 800 includes a main computer 802 to provide overall control of the tractor or other autonomous robot. According to one embodiment, main computer 802 is a computer system adapted for expected operating conditions of the robot. By way of example, but not limitation, main computer 802 may be a fan-less embedded system suited for industrial applications. Main computer 802 can include software and hardware to implement a state machine having, e.g., autonomy, halt-and-wait, and remote-control states, control autonomous navigation and maintenance operation functionality and other functionality described herein.

In the embodiment illustrated, main computer 802 is connected to various controllers that control the distribution of power to and receive feedback from various components. In the illustrated embodiment, main computer 802 is connected to a first controller 804 by a bus, such as a USB or other bus. First controller 804 controls the distribution of power to various components as needed. For example, first controller 804 controls logic relays 806 to provision main power for drive motor controller 832, control power to drive motor controller 832, and forward or reverse power to tilt actuator motors, lift actuator motors, and wheel actuator motors. Via relays 808, first controller 804 controls distribution of power to the motor controllers of the mower motors that turn the mower's blades. In this example, each mower motor controller has a main power input, an enable control signal input (e.g., high level/stop low level/run), a quick brake input (e.g., high level/stop, low/level run), a forward/reverse (F/R) input and/or other inputs. First controller 804 controls the signals to these inputs to start/stop and otherwise control power to the mower motors 204 as needed.

First controller 804 may also receive feedback from various components. For example, lift actuators, tilt actuators and wheel actuators may incorporate hall effect sensors or other sensors to provide feedback indicative of position, movement, or other related information. Moreover, first controller 804 can receive feedback from wheel pressure sensors. First controller 804 can provide data based on the feedback to main computer 802 indicative of, for example, speed, position or other condition of the actuators or contact wheels.

Main computer 802 is further connected to second controller 810 via a communications bus, such as a USB. Second controller 810 may receive feedback from various components of the attached tool. In this example, second controller 810 connects to speed feedback outputs and alarm outputs of the mower motor controllers. In one embodiment, second controller 810 provides hardware monitoring of various components of the attached tool and main computer 802 can provide software monitoring. Main computer 802 can be connected to various other components of the robot.

Furthermore, one or more sensor components are connected to main computer 802 over a communications bus. For example, main computer 802 is connected to a LIDAR and/or RADAR unit 814, ultrasonic sensors 816, GPS 818, cameras 820 and an IMU 822. Main computer 802 may also be connected to (or include) various network interfaces. For example, main computer 802 may be connected to a Wi-Fi adapter 824 and a cellular network adapter 826. In the embodiment illustrated in FIG. 8, the communications bus is a USB. However, any suitable communications bus may be used. Further, in the embodiment of FIG. 8, main computer 802 is connected to one or more components of a charging system 830 and a drive motor controller 832 by a controller area network (CAN) 828 or other connection. Main computer 802 can, for example, communicate with drive motor control to control drive motors to turn the drive wheels and battery management system to receive data regarding battery status and control charging and discharging of batteries.

Control system 800 is provided by way of example and not limitation. In some embodiments, the control system 800 of a robot, such as a tractor 710 or other mobile autonomous system, can be reconfigured for a particular type of tool. For example, for a cantilever mowing deck, there would not be a connection for (or the connection would not be used) for the deck wheel actuators, nor would connections for deck wheel actuator feedback be used. In some embodiments, control system 800 can be reconfigured as needed by providing appropriate controllers and/or software configuration of main computer 802.

Figure 9:
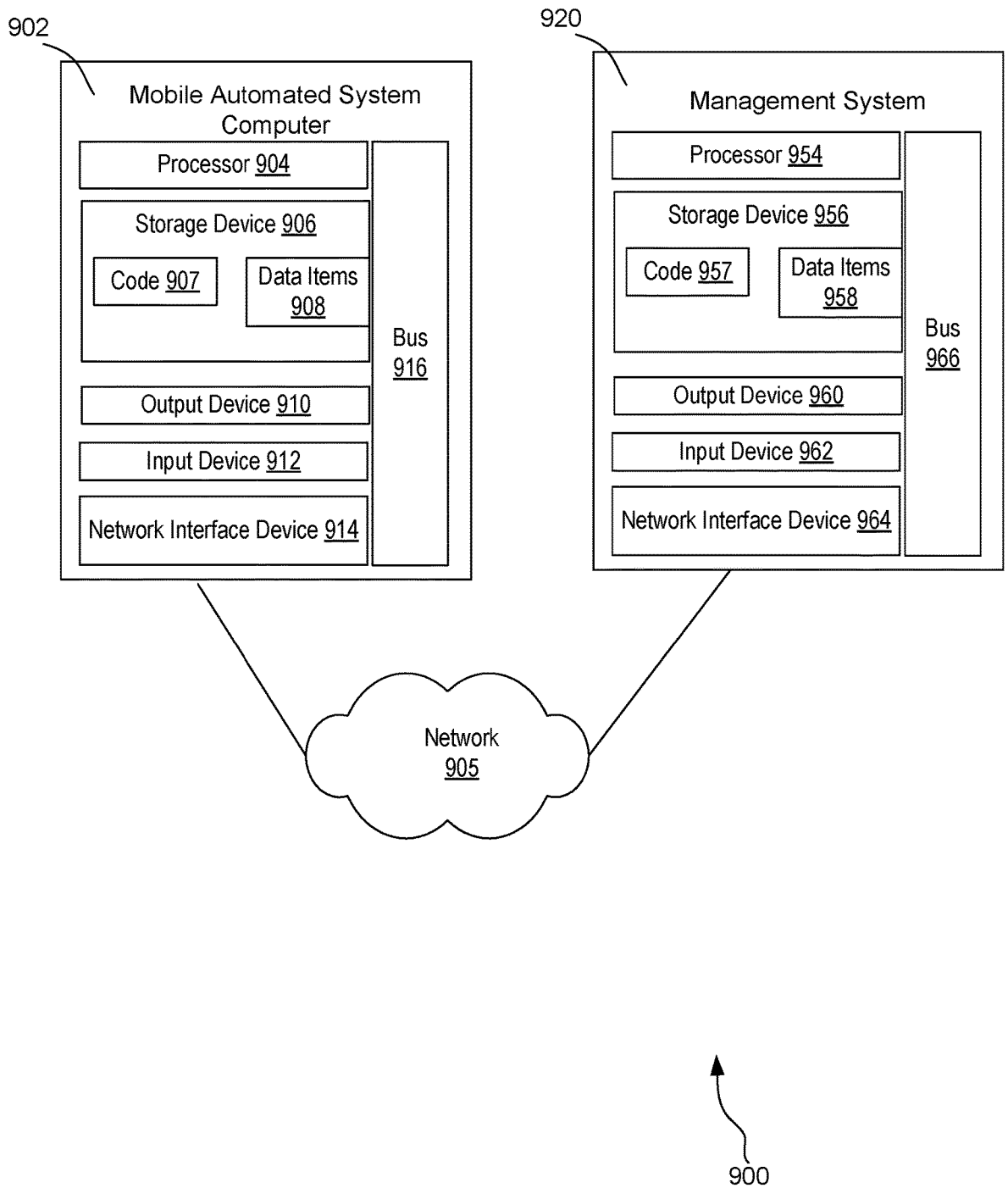
FIG. 9 is a diagrammatic representation of one embodiment of a maintenance network system.

FIG. 9 is a diagrammatic representation of one embodiment of a maintenance network system 900 comprising a computer 902 communicatively coupled to a central management system 920 via a network 905. Computer 902 may be one example of a computer for controlling a robot including a robot that provides a mobile automated maintenance system. Computer 902 may be one embodiment of a main computer 802 of an autonomous mower. Central management system 920 may be one embodiment of management system 106. Computer 902 includes a processor 904, a storage device 906, an output device 910, an input device 912, and a network interface device 914 connected via a bus 916. Processor 904 represents a central processing unit of any type of processing architecture, such as CISC (Complex Instruction Set Computing), RISC (Reduced Instruction Set Computer), VLIW (Very Long Instruction Word), a hybrid architecture, or a parallel architecture. Any appropriate processor may be used. Processor 904 executes instructions and may include that portion of the computer that controls the operation of the entire computer. Processor 904 may include a control unit that organizes data and program storage in memory and transfers data and other information between the various parts of the computer. The processor receives input data from the input device 912 and the network, reads and stores code and data in the storage device 906 and outputs data to the output devices 910. While a single processor, input device, storage device output device and single bus are illustrated, computer 902 may have multiple processors, input devices, storage devices, output devices and busses with some or all performing different functions in different ways.

Storage device 906 represents one or more mechanisms for storing data. For example, storage device 906 may include read-only memory (ROM), random access memory (RAM), magnetic disk storage media, optical storage media, flash memory devices, solid state device storage media, and/or other machine-readable media. In other embodiments, any appropriate type of storage device may be used. Multiple types of storage devices may be present. Additionally, multiple and different storage devices and types may be used in conjunction with each other to perform data storage functions for the computer. Further, although the computer is drawn to contain the storage device, it may be distributed across other computers communicatively coupled over a suitable network, for example on a remote server.

Storage device stores code 907 and data items 908 therein. Code 907 can include instructions executable by processor 904 to carry out various functionality described herein, including but not limited to autonomous navigation. In some embodiments, code 907 is executable to implement a command center application. In some embodiments, code 907 is executable to implement a mow pattern planner. In some embodiments, code 957 is executable to implement a path generator. In some embodiments, code 957 is executable to implement a route generator. In some embodiments, code 907 is executable to implement a state machine having, for example, an autonomy state, a hold-and-wait state and a remote-control state. In another embodiment, some or all of the functions are carried out via hardware in lieu of a processor-based system. As will be understood by those of ordinary skill in the art, the storage device may also contain additional software and data (not shown). Data items 908 can include a wide variety of data including, but not limited to, configuration data, data collected by the mobile automated system during use, data provided to the mobile automated system by central management system 920 or other system, maintenance plans, path information, and other data. Although the code 907 and the data items 908 as shown to be within the storage device 906 in the computer 902, some or all of them may be distributed across other systems communicatively coupled over the network, for example on a server.

Output device 910 represents devices that output data to a user or direct data to be sent to other systems connected through the network. The output may be a liquid crystal display (LCD), in one example, though any suitable display device may be used. In an embodiment, an output device displays a user interface. Any number of output devices can be included, including output devices intended to cause data to be sent to other systems connected through network 905. Input device 912 represents one or more devices that provide data to processor 904. Input device 912 can represent user input devices (e.g., keyboards, trackballs, keypads and the like), sensors or other input devices.

The network interface device 914 provides connection between the computer 902 and network 905 through any suitable communications protocol. The network interface device 914 sends and receives data items from the network. Bus 916 may represent one or more busses, e.g., USB (Universal Serial Bus), PCI (Peripheral Component Interconnect), ISA (Industry Standard Architecture), X-Bus, EISA (Extended Industry Standard Architecture), MCA (Micro Charmel Architecture), IEEE 994, or any other appropriate bus and/or bridge.

Computer 902 may be implemented using any suitable hardware and/or software. Peripheral devices such as auto adapters or chip programming devices, such as EPROM (Erasable Programmable Read-Only Memory) programming devices may be used in addition to, or in place of the hardware already depicted. Computer 902 may be connected to any number of sensors or other components via a bus, network or other communications link.

Network 905 may be any suitable network and may support any appropriate protocol suitable for communication to the computer. Network 905 can include a combination of wired and wireless networks that the network computing environment of FIG. 9 may utilize for various types of network communications. For example, network 905 can include a local area network (LAN), a hotspot service provider network, a wide area network (WAN), the Internet, GPRS network or other cellular data network or cell-based radio network technology mobile network, an IEEE 802.IIx wireless network or other type of network or combination thereof. According to an embodiment, network 905 may support the Ethernet IEEE 802.3x specification. According to an embodiment, network 905 may support IP (Internet Protocol) over either or UDP (User Datagram Protocol).

According to one embodiment, a mobile automated system can communicate with a central management system 920 via network 905 to communicate data to and receive data and commands. For example, computer 902 may send status information, alerts, collected data and other information to central management system 920. Similarly, computer 902 can receive updated routing information, maintenance plans, decision algorithms or other information from central management system 920. According to one embodiment, code 907 implements watchers to watch for various commands from central management system 920.

In one embodiment, a mobile automated system may operate in various states including, but not limited to an autonomy state and a remote-control state. In an autonomous state, the mobile automated system (e.g., under the control of computer 902) performs autonomous navigation to generate paths, generate routes, follow routes, implement maintenance plans or take other actions without human intervention. Autonomous navigation can include route following, collision avoidance and other aspects of autonomous navigation. In some cases, the mobile automated system may encounter a situation that requires intervention, such as becoming stuck or encountering an obstacle that the mobile automated system cannot navigate around. The mobile automated system can send alerts to central management system 920 and, in some cases, await further instructions before moving again.

Central management system 920 may communicate with computer 902 to update the mobile automated system, put the mobile automated system in a manual state or carry out other actions. Central management system 920 can provide an interface, such as a web page or mobile application page, through which an operator can control the mobile automated system in the manual state. Commands entered by the operator (e.g., movement commands or other commands) are routed to computer 902 over network 905 and computer 902 controls the mobile automated system to implement the commands. Central management system 920 can further return the mobile automated system to an autonomous state. Central management system 920 may provide a centralized management for a large number of geographically dispersed mobile automated systems.

Central management system 920 may be one embodiment of management system 106. Central management system 920 includes a processor 954, a storage device 956, an output device 960, an input device 962, and a network interface device 964 connected via a bus 966. Processor 954 represents a central processing unit of any type of processing architecture, such as CISC (Complex Instruction Set Computing), RISC (Reduced Instruction Set Computer), VLIW (Very Long Instruction Word), a hybrid architecture, or a parallel architecture. Any appropriate processor may be used. Processor 954 executes instructions and may include that portion of the computer that controls the operation of the entire computer. Processor 954 may include a control unit that organizes data and program storage in memory and transfers data and other information between the various parts of the computer. The processor receives input data from the input device 962 and the network, reads and stores code and data in the storage device 906 and outputs data to the output devices 960. While a single processor, input device, storage device output device and single bus are illustrated, Central management system 920 may have multiple processors, input devices, storage devices, output devices and busses with some or all performing different functions in different ways.

Storage device 956 represents one or more mechanisms for storing data. For example, storage device 956 may include read-only memory (ROM), random access memory (RAM), magnetic disk storage media, optical storage media, flash memory devices, solid state device storage media, and/or other machine-readable media. In other embodiments, any appropriate type of storage device may be used. Multiple types of storage devices may be present. Additionally, multiple and different storage devices and types may be used in conjunction with each other to perform data storage functions for the computer. Further, although the computer is drawn to contain the storage device, it may be distributed across other computers communicatively coupled over a suitable network, for example on a remote server.

Storage device stores code 957 and data items 958 therein. Code 957 can include instructions executable by processor 954 to carry out various functionality described herein. In some embodiments, code 957 is executable to implement a command center application. In some embodiments, code 957 is executable to implement a mow pattern planner. In some embodiments, code 957 is executable to implement a path generator. In some embodiments, code 957 is executable to implement a route generator. In another embodiment, some or all of the functions are carried out via hardware in lieu of a processor-based system. As will be understood by those of ordinary skill in the art, the storage device may also contain additional software and data (not shown). Data items 958 can include a wide variety of data including, but not limited to, configuration data, data collected from the autonomous mower, data provided to central management system 920 by other systems, maintenance plans, path information, and other data. Although the code 957 and the data items 958 as shown to be within the storage device 956, some or all of them may be distributed across other systems communicatively coupled over the network.

Output device 960 represents devices that output data to a user or direct data to be sent to other systems connected through the network. The output may be a liquid crystal display (LCD), in one example, though any suitable display device may be used. In an embodiment, an output device displays a user interface. Any number of output devices can be included, including output devices intended to cause data to be sent to other systems connected through network 905. Input device 962 represents one or more devices that provide data to processor 954. Input device 962 can represent user input devices (e.g., keyboards, trackballs, keypads and the like), sensors or other input devices.

The network interface device 964 connects between central management system 920 and network 905 through any suitable communications protocol. The network interface device 964 sends and receives data items from the network. Bus 966 may represent one or more busses, e.g., USB (Universal Serial Bus), PCI (Peripheral Component Interconnect), ISA (Industry Standard Architecture), X-Bus, EISA (Extended Industry Standard Architecture), MCA (Micro Channel Architecture), IEEE 994, or any other appropriate bus and/or bridge.

Central management system 920 may be implemented using any suitable hardware and/or software. In some embodiments, central management system 920 may be implemented according to a cloud-based architecture. Peripheral devices such as auto adapters or chip programming devices, such as EPROM (Erasable Programmable Read-Only Memory) programming devices may be used in addition to, or in place of the hardware already depicted. Central management system 920 may be connected to any number of sensors or other components via a bus, network or other communications link.

Figure 10:
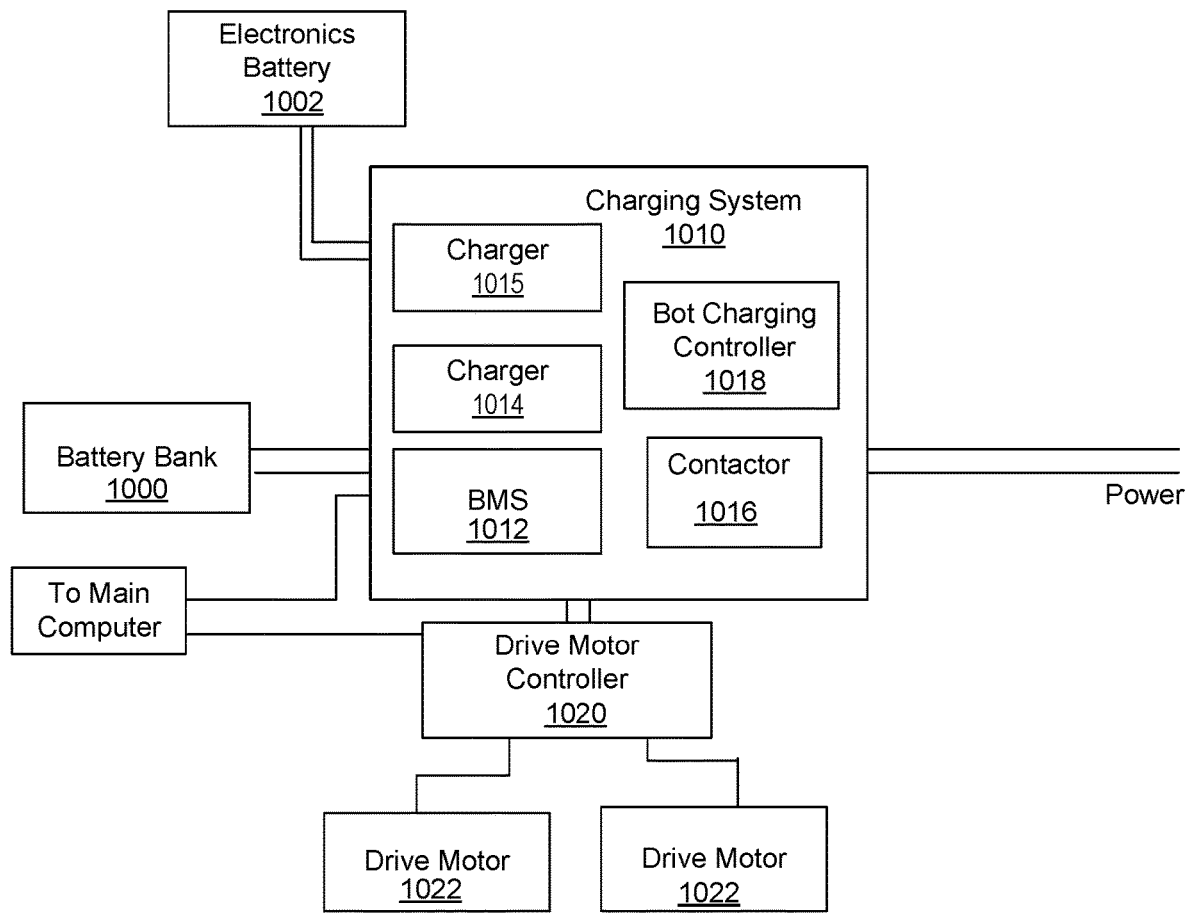
FIG. 10 is a diagrammatic representation of one embodiment of power and drive components of an autonomous mower.

FIG. 10 is a block diagram illustrating one embodiment of power and drive components of a robot, such as autonomous mower 102 or autonomous mower 700 or other mobile automated system. In the embodiment of FIG. 10, the robot includes a main battery bank 1000 having one or more battery modules (for example one or more lithium ion or other rechargeable battery modules). The number of modules needed may be increased or decreased for a variety of reasons, including, but not limited to, altering the amount of power for the maintenance system based on the location of the maintenance system, and run time needed for the maintenance system and any attached devices. In one embodiment, the robot contains 8 48V battery modules, with each having approximately 2850 kWh of power. As will be well understood by one of ordinary skill in the art, the efficiency of battery systems may increase over time, and any number of battery modules may be used.

The battery modules of main battery bank 1000 may be a higher voltage than supported by computers (e.g., main computer 802), actuators, various electronics or other components of the mobile automated system. In one embodiment then, the robot can include one or more secondary batteries 1002 to power the main computer 802, various sensors, electronics, logic relays and other components. For example, according to one embodiment, a robot may include a common car, motorcycle, Gel cell battery or the like.

As illustrated in FIG. 10, the robot can include a charging system 1010 that includes various components involved in charging the batteries. The charging can be an example of charging system 830. In the illustrated embodiment, the charging system includes battery management system (BMS) 1012, charger 1014, contactor 1016 and bot charging controller 1018. Various components of the charging system can be connected to a bot computer (e.g., main computer 802) by a network or other communications link.

According to one embodiment, BMS 1012 is directly connected to battery bank 1000 and is adapted to manage and maintain batteries in battery bank 1000. As will be appreciated, BMS 1012 can provide various functionality with respect to the rechargeable batteries of main battery bank 1000. By way of example, BMS 1012 can provide constant monitoring of charge balance, generate alerts, and implement preventive action to ensure proper charging. In one embodiment, BMS 1012 assesses battery profiles for the battery modules of battery bank 1000 and the temperature of the battery modules, oversees balancing, performs monitoring of battery health and ensure battery bank 1000 is being charged in a safe manner (e.g., not being overcharged, not exceeding temperature limits, etc.). According to one embodiment, a bot computer (e.g., main computer 802) is connected to BMS 1012 (e.g., by a CAN or other communication link) and monitors/controls whether BMS 1012 allows charging.

The charging system further includes a charger 1014 to charge the batteries in battery bank 1000. Charger 1014 includes one or more chargers that have programmed profiles for the battery modules of battery bank 1000. Charger 1014 monitors the voltage of the battery bank 1000 and, if a charging voltage is out of range, stops charging. The charging system also includes a charger 1015 to charge secondary battery 1002 from main battery bank 1000. In one embodiment, the charging system includes or is connected to a contactor 1016 that is electrically coupled to the charging contacts of the robot. Contactor 1016 can be selectively engaged and disengaged to allow charging when the bot is docked at a charging station.

The charging system includes a bot charging controller 1018 electrically coupled to the charging contacts. Bot charging controller 1018, according to one embodiment, is configured to determine when the robot has docked with a charging dock and engage/disengage contactor 1016 as needed to connect the charge power lines to charger 1014 and/or BMS 1012 to charge batteries in main battery bank 1000. In one embodiment, the determination that the robot has docked successfully may be based, in part on a data communication between bot charging controller 1018 and a charging station controller. Such communication may be implemented according to any suitable protocol including power-line protocols or other protocols. To this end, bot charging controller 1018 may include a power-line communication or other adapter for communicating with the charging station.

The robot includes a drive motor controller 1020, which may be one example of drive motor controller 832. Drive motor controller 1020 is electrically connected to the drive motors 1022 that turn the drive wheels of the robot. According to one embodiment, drive motor controller 1020 distributes power from battery bank 1000 to drive motors 1022 based on commands from the main computer. In some embodiments, drive motor controller 1020 is connected to the main battery bank 1000 through the charging system, for example, through BMS 1012 or other components.

Those skilled in the relevant art will appreciate that the embodiments can be implemented or practiced in a variety of computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, stored as firmware in chips, as well as distributed electronically over the Internet or over other networks (including wireless networks). Example chips may include Electrically Erasable Programmable Read-Only Memory (EEPROM) chips.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. Steps, operations, methods, routines or portions thereof described herein be implemented using a variety of hardware, such as CPUs, application specific integrated circuits, programmable logic devices, field programmable gate arrays, optical, chemical, biological, quantum or nanoengineered systems, or other mechanisms.

Software instructions in the form of computer-readable program code may be stored, in whole or in part, temporarily or permanently, on a non-transitory computer-readable medium. The computer-readable program code can be operated on by a processor to perform steps, operations, methods, routines or portions thereof described herein. A "computer-readable medium" is a medium capable of storing data in a format readable by a computer and can include any type of data storage medium that can be read by a processor. Examples of non-transitory computer-readable media can include, but are not limited to, volatile and non-volatile computer memories, such as RAM, ROM, hard drives, solid state drives, data cartridges, magnetic tapes, floppy diskettes, flash memory drives, optical data storage devices, compact-disc read-only memories. In some embodiments, computer-readable instructions or data may reside in a data array, such as a direct attach array or other array. The computer-readable instructions may be executable by a processor to implement embodiments of the technology or portions thereof.

A "processor" includes any hardware system, mechanism or component that processes data, signals or other information. A processor can include a system with a general-purpose central processing unit, multiple processing units, dedicated circuitry for achieving functionality, or other systems. Processing need not be limited to a geographic location or have temporal limitations. For example, a processor can perform its functions in "real-time," "offline," in a "batch mode," etc. Portions of processing can be performed at different times and at different locations, by different (or the same) processing systems.

Different programming techniques can be employed such as procedural or object oriented. Any suitable programming language can be used to implement the routines, methods or programs of embodiments of the invention described herein, including R, Python, C, C++, Java, JavaScript, HTML, or any other programming or scripting code, etc. Communications between computers implementing embodiments can be accomplished using any electronic, optical, radio frequency signals, or other suitable methods and tools of communication in compliance with known network protocols.

Any particular routine can execute on a single computer processing device or multiple computer processing devices, a single computer processor or multiple computer processors. Data may be stored in a single storage medium or distributed through multiple storage mediums. In some embodiments, data may be stored in multiple databases, multiple filesystems or a combination thereof.

Although the steps, operations, or computations may be presented in a specific order, this order may be changed in different embodiments. In some embodiments, some steps may be omitted. Further, in some embodiments, additional or alternative steps may be performed. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Thus, while the invention has been described with respect to specific embodiments thereof, these embodiments are merely illustrative, and not restrictive of the invention. Rather, the description (including the Abstract and Summary) is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. An autonomous mowing system comprising:
a memory configured to hold a set of path data for a maintenance plan associated with a plurality of spaced apart maintenance areas, each maintenance area in the plurality of spaced apart maintenance areas defined by a respective maintenance area definition, the set of path data comprising a set of node data for a set of nodes that define path endpoints for a set of paths, wherein each path in the set of paths is defined by a respective pair of endpoints, the set of paths comprising:
a set of mow paths generated using the maintenance area definitions to cover the plurality of spaced apart maintenance areas, wherein each of the plurality of spaced apart maintenance areas does not overlap the others of the plurality of spaced apart maintenance areas; and a plurality of transit paths, the plurality of transit paths comprising transit paths between the maintenance areas in the plurality of spaced apart maintenance areas, wherein the set of node data includes path cost data and wherein the set of node data includes node data for a transit path endpoint node, the node data for the transit path endpoint node specifying a disabled cutting state for a respective transit path from the plurality of transit paths;

a processor coupled to the memory;

a computer readable medium coupled to the processor, the computer readable medium storing a set of instructions executable by the processor, the set of instructions comprising instructions for:

using the set of path data, determining:

a plurality of candidate routes, wherein each route in the plurality of candidate routes uses mow paths from the set of mow paths and transit paths from the plurality of transit paths to serially and fully cover the plurality of spaced apart maintenance areas; and a total cost for each of the plurality of candidate routes;

determining a least cost route from the plurality of candidate routes; and causing an autonomous mower to execute the maintenance plan using the least cost route to traverse between and serially mow the plurality of spaced apart maintenance areas.

2. The autonomous mowing system of claim 1, wherein the set of path data includes an estimated energy draw for each path in the set of paths, and wherein the set of instructions comprises instructions for determining a total estimated energy draw for each candidate route from the plurality of candidate routes, and wherein the least cost route has a lowest total estimated energy draw of the plurality of candidate routes.

3. The autonomous mowing system of claim 1, wherein the memory is configured to store a set of configuration data and wherein the set of instructions comprises instructions for:

receiving a definition of a mow rectangle;

using the set of configuration data, determining a number of mow paths to fully cover the mow rectangle;

generating a plurality of mow paths based on the number of mow paths determined; and wherein the set of path data used to determine the plurality of candidate routes comprises path data defining the plurality of mow paths.

4. The autonomous mowing system of claim 3, wherein the set of instructions comprises instructions for:

based on a determination that the mow rectangle is designated as a single-ended rectangle, terminating the plurality of mow paths within the mow rectangle, and generating an intermediate path to connect the plurality of mow paths.

5. The autonomous mowing system of claim 4, wherein generating the intermediate path to connect the plurality of mow paths comprises generating a plurality of intermediate paths, the plurality of intermediate paths selected to cause the autonomous mower to reverse from a first of the plurality of mow paths and move forward to a second of the plurality of mow paths.

6. The autonomous mowing system of claim 3, wherein the set of instructions comprises instructions for:

based on a determination that the mow rectangle is designated as an open-ended rectangle, extending the plurality of mow paths from a first side of the mow rectangle, through the mow rectangle, to an intermediate path that connects the plurality of mow paths.

7. The autonomous mowing system of claim 1, wherein the set of instructions comprises instructions for:

receiving data for a geometric shape defining a maintenance area in the plurality of spaced apart maintenance areas; and generating the set of mow paths, wherein generating the set of mow paths comprises edge following the geometric shape to generate position data for a plurality of mow path end nodes.

8. The autonomous mowing system of claim 7, wherein generating the set of mow paths comprises:

starting with a start node of a first mow path polygon, iteratively generating mow path polygons, each mow path polygon following an adjacent larger mow path polygon and spaced from the adjacent larger mow path polygon based on a mow deck size and a specified percentage overlap; and defining a path from each mow path polygon to the adjacent larger mow path polygon.

9. The autonomous mowing system of claim 1, wherein the total cost for each of the plurality of candidate routes comprises multiple dimensions of cost.

10. The autonomous mowing system of claim 1, wherein:

each mow path in the set of mow paths and each transit path in the plurality of transit paths is defined by a respective pair of endpoint nodes; and each maintenance area in the plurality of spaced part maintenance areas is a mowable area defined by a respective mowing boundary polygon defining a perimeter of the mowable area, wherein each maintenance area in the plurality of spaced apart maintenance areas has an associated plurality of nodes from the set of nodes, the associated plurality of nodes for a maintenance area defining mow paths within that maintenance area.

11. A computer program product comprising a non-transitory, computer-readable medium storing a set of computer-executable instructions, the set of computer-executable instructions comprising instructions for:

accessing a set of path data for a maintenance plan associated with a plurality of spaced apart maintenance areas, each maintenance area in the plurality of spaced apart maintenance areas defined by a respective maintenance area definition, the set of path data comprising a set of node data for a set of nodes that represents path endpoints for a set of paths, wherein each path in the set of paths is defined by a respective pair of endpoints, the set of paths comprising:

a set of mow paths generated using the maintenance area definitions to cover the plurality of spaced apart maintenance areas, wherein each of the plurality of spaced apart maintenance areas does not overlap the others of the plurality of spaced apart maintenance areas; and a plurality of transit paths, the plurality of transit paths comprising transit paths between maintenance areas in the plurality of spaced apart maintenance areas, wherein the set of node data comprises path costs, and wherein the set of node data comprises node data for a transit path endpoint node, the node data for the transit path endpoint node specifying a disabled cutting state for a respective transit path from the plurality of transit paths;

using the set of path data, determining:
  a plurality of candidate routes, wherein each route in the plurality of candidate routes uses mow paths from the set of mow paths and transit paths from the plurality of transit paths to serially and fully cover the plurality of spaced apart maintenance areas; and
  determining a least cost route from the plurality of candidate routes; and
  causing an autonomous mower execute the maintenance plan using the least cost route to traverse between and serially mow the plurality of spaced apart maintenance areas.

12. The computer program product of claim 11, wherein the set of path data includes an estimated energy draw for each path in the set of paths, and wherein the set of computer-executable instructions comprises instructions for determining a total estimated energy draw for each candidate route from the plurality of candidate routes, and wherein the least cost route has a lowest total estimated energy draw of the plurality of candidate routes.

13. The computer program product of claim 11, wherein the set of computer-executable instructions comprises instructions for:
  receiving a definition of a mow rectangle;
  using a set of configuration data, determining a number of mow paths to fully cover the mow rectangle;
  generating a plurality of mow paths based on the number of mow paths determined; and
  wherein the set of path data used to determine the plurality of candidate routes comprises path data defining the plurality of mow paths.

14. The computer program product of claim 13, wherein the set of computer-executable instructions comprises instructions for:
  based on a determination that the mow rectangle is designated as a single-ended rectangle, terminating the plurality of mow paths within the mow rectangle, and generating an intermediate path to connect the plurality of mow paths.

15. The computer program product of claim 14, wherein generating the intermediate path to connect the plurality of mow paths comprises generating a plurality of intermediate paths, the plurality of intermediate paths selected to cause the autonomous mower to reverse from a first of the plurality of mow paths and move forward to a second of the plurality of mow paths.

16. The computer program product of claim 13, wherein the set of computer-executable instructions comprises instructions for:
  based on a determination that the mow rectangle is designated as an open-ended rectangle, extending the plurality of mow paths from a first side of the mow rectangle, through the mow rectangle, to an intermediate path that connects the plurality of mow paths.

17. The computer program product of claim 11, wherein the set of computer-executable instructions comprises instructions for:
  receiving data for a geometric shape defining a maintenance area in the plurality of spaced apart maintenance areas; and
  generating the set of mow paths, wherein generating the set of mow paths comprises edge following the geometric shape to generate position data for a plurality of mow path end nodes.

18. The computer program product of claim 17, wherein generating the set of mow paths comprises:
  starting with a start node of a first mow path polygon, iteratively generating mow path polygons, each mow path polygon following an adjacent larger mow path polygon and spaced from the adjacent larger mow path polygon based on a mow deck size and a specified percentage overlap; and
  defining a path from each mow path polygon to the adjacent larger mow path polygon.

19. A method comprising:
  accessing a memory configured to hold a set of path data for a maintenance plan associated with a plurality of spaced apart maintenance areas, each maintenance area in the plurality of spaced apart maintenance areas defined by a respective maintenance area definition, the set of path data comprising a set of node data for a set of nodes that represents path endpoints for a set of paths, wherein each path in the set of paths is defined by a respective pair of endpoints, the set of paths comprising:
    a set of mow paths generated using the maintenance area definitions to cover the plurality of spaced apart maintenance areas; and
    a plurality of transit paths, the plurality of transit paths comprising transit paths between the maintenance areas in the plurality of maintenance areas, wherein each of the plurality of spaced apart maintenance areas does not overlap the others of the plurality of spaced apart maintenance areas, wherein the set of node data comprises path costs, and wherein the set of node data comprises node data for a transit path endpoint node, the node data for the transit path endpoint node specifying a disabled cutting state for a respective transit path;
  using the set of path data, automatically determining:
    a plurality of candidate routes, wherein each route in the plurality of candidate routes uses mow paths from the set of mow paths and transit paths from the plurality of transit paths to serially and fully cover the plurality of spaced apart maintenance areas; and
    a total cost for each of the plurality of candidate routes;
  determining a least cost route from the plurality of candidate routes; and
  configuring an autonomous mower to follow the least cost route to traverse between and serially mow the plurality of spaced apart maintenance areas.

20. The method of claim 19, further comprising determining a total estimated energy draw for each candidate route from the plurality of candidate routes, wherein the least cost route has a lowest total estimated energy draw of the plurality of candidate routes, and wherein the set of path data includes an estimated energy draw for each path in the set of paths.

21. The method of claim 19, wherein the memory is configured to store a set of configuration data and wherein the set of instructions comprises instructions for:
  receiving a definition of a mow rectangle;
  using the set of configuration data, determining a number of mow paths to fully cover the mow rectangle;
  generating a plurality of mow paths based on the number of mow paths determined; and
  wherein the set of path data used to determine the plurality of candidate routes comprises path data defining the plurality of mow paths.

22. The method of claim 21, further comprising:
  based on a determination that the mow rectangle is designated as a single-ended rectangle, terminating the plurality of mow paths within the mow rectangle, and generating an intermediate path to connect the plurality of mow paths, wherein generating the intermediate path to connect the plurality of mow paths comprises generating a plurality of intermediate paths, the plurality of intermediate paths selected to cause the autonomous mower to reverse from a first of the plurality of mow paths and move forward to a second of the plurality of mow paths.

23. The method of claim 21, further comprising:
based on a determination that the mow rectangle is designated as an open-ended rectangle, extending the plurality of mow paths from a first side of the mow rectangle, through the mow rectangle, to an intermediate path that connects the plurality of mow paths.

24. The method of claim 19, further comprising:
receiving data for a geometric shape defining a maintenance area in the plurality of spaced apart maintenance areas; and
generating the set of mow paths, wherein generating the set of mow paths comprises:
  starting with a start node of a first mow path polygon, iteratively generating mow path polygons, each mow path polygon following an adjacent larger mow path polygon and spaced from the adjacent larger mow path polygon based on a mow deck size and a specified percentage overlap; and
  defining a path from each mow path polygon to the adjacent larger mow path polygon.

\* \* \* \* \*